US012579721B2

(12) United States Patent
Piramuthu et al.

(10) Patent No.: US 12,579,721 B2
(45) Date of Patent: Mar. 17, 2026

(54) GENERATING VIDEO CONTENT FROM USER INPUT DATA

(71) Applicant: Amazon Technologies, Inc., Seattle, WA (US)

(72) Inventors: Robinson Piramuthu, Oakland, CA (US); Sanqiang Zhao, Santa Clara, CA (US); Yadunandana Rao, Sunnyvale, CA (US); Zhiyuan Fang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 18/081,076

(22) Filed: Dec. 14, 2022

(65) Prior Publication Data

US 2024/0095987 A1     Mar. 21, 2024

Related U.S. Application Data

(60) Provisional application No. 63/407,944, filed on Sep. 19, 2022.

(51) Int. Cl.
*G06T 13/00*          (2011.01)
*G06F 40/166*         (2020.01)
(Continued)

(52) U.S. Cl.
CPC ............ *G06T 13/00* (2013.01); *G06F 40/166* (2020.01); *G06F 40/279* (2020.01); *G06F 40/40* (2020.01);
(Continued)

(58) Field of Classification Search
CPC ....... G06T 13/00; G06T 11/00; G06F 40/166; G06F 40/279; G06F 40/40; G06F 3/167;
(Continued)

(56) References Cited

U.S. PATENT DOCUMENTS 7,664,313 B1     2/2010 Sproat
10,922,049 B2 *  2/2021 Bolden ................. G06F 3/0484
(Continued)

OTHER PUBLICATIONS

Yao et al. (NPL—"Plan-And-Write: Towards Better Automatic Storytelling") Feb. 19, 2019 Association for the Advancement of AI 2019 (Year: 2019).*
(Continued)

*Primary Examiner* — Jialong He
(74) *Attorney, Agent, or Firm* — Pierce Atwood LLP

(57)          ABSTRACT

Techniques for generating content associated with a user input/system generated response are described. Natural language data associated with a user input may be generated. For each portion of the natural language data, ambiguous references to entities in the portion may be replaced with the corresponding entity. Entities included in the portion may be extracted, and image data representing the entity may be determined. Background image data associated with the entities and the portion may be determined, and attributes which modify the entities in the natural language sentence may be extracted. Spatial relationships between two or more of the entities may further be extracted. Image data representing the natural language data may be generated based on the background image data, the entities, the attributes, and the spatial relationships. Video data may be generated based on the image data, where the video data includes animations of the entities moving.

20 Claims, 15 Drawing Sheets

(51) Int. Cl.

| | | |
|---|---|---|
| *G06F 40/279* | (2020.01) |
| *G06F 40/40* | (2020.01) |
| *G06T 11/00* | (2006.01) |
| *G10L 13/02* | (2013.01) |
| *G10L 15/18* | (2013.01) |
| *G10L 15/22* | (2006.01) |

(52) U.S. Cl.
CPC .............. *G06T 11/00* (2013.01); *G10L 13/02* (2013.01); *G10L 15/18* (2013.01); *G10L 15/22* (2013.01)

(58) Field of Classification Search
CPC ......... G06F 40/56; G10L 13/02; G10L 15/18; G10L 15/22
See application file for complete search history.

(56) References Cited

U.S. PATENT DOCUMENTS

| | | | |
|---|---|---|---|
| 10,999,566 B1 | 5/2021 | Mahyar et al. | |
| 11,651,537 B2 * | 5/2023 | Duffy ................. | G06F 3/03545 |
| | | | 345/173 |
| 11,863,829 B2 | 1/2024 | Gao et al. | |
| 2006/0217979 A1 * | 9/2006 | Pahud .............. | H04N 21/23412 |
| | | | 375/E7.006 |
| 2007/0147654 A1 * | 6/2007 | Clatworthy .......... | G06F 40/242 |
| | | | 382/100 |
| 2015/0331941 A1 | 11/2015 | Defouw et al. | |
| 2019/0108219 A1 | 4/2019 | Barrett et al. | |
| 2019/0304104 A1 * | 10/2019 | Amer ...................... | G06T 13/80 |
| 2019/0304156 A1 * | 10/2019 | Amer ...................... | G06F 18/22 |
| 2024/0194193 A1 | 6/2024 | Rathnam et al. | |
| 2024/0331434 A1 | 10/2024 | Sabapathy et al. | |
| 2024/0420404 A1 | 12/2024 | Kasap et al. | |
| 2025/0021833 A1 | 1/2025 | Mukherjee et al. | |

OTHER PUBLICATIONS

Avrahami et al. (NPL—"Blended Diffusion for Text-driven Editing of Natural Images") Mar. 28, 2022 The Hebrew University of Jerusalem & Reichman University (Year: 2022).*

International Search Report and Written Opinion mailed Nov. 30, 2023 for International Patent Application No. PCT/US2023/073510.

Coyne et al., "WordsEye: an automatic text-to-scene conversion system", Proceedings of the 2001 International ACM SIGGroup Conference on Supporting Group Work, ACM, New York, NY, US, Aug. 1, 2002, pp. 487-496, XP059148196.

Yao, et al., "Plan-and-Write: Towards Better Automatic Storytelling", The Thirty-Third AAAI Conference on Artificial Intelligence (AAAI-19), 2019, 7378-7385, https://doi.org/10.1609/aaai.v33i01.33017378.

Ghazarian, et al. "Plot-guided Adversarial Example Construction for Evaluating Open-domain Story Generation", NAACL 2021, https://arxiv.org/abs/2104.05801.

Engel, et al. "GANSynth: Adversarial Neural Audio Synthesis", ICLR 2019, https://arxiv.org/abs/1902.08710.

Huang, et al., "Music Transformer: Generating Music With Long-Term Structure", Sep. 12, 2018, https://arxiv.org/abs/1809.04281.

Dhariwal, et al. "Jukebox: A Generative Model for Music", Apr. 30, 2020, https://arxiv.org/abs/2005.00341.

Turney, "Thumbs Up or Thumbs Down? Semantic Orientation Applied to Unsupervised Classification of Reviews", Proceedings of the 40th Annual Meeting of the Association for Computational Linguistics, 2002, 417-424, https://arxiv.org/abs/cs/0212032.

Pennington, et al. "GloVe: Global Vectors for Word Representation", 2014, https://nlp.stanford.edu/projects/glove/.

Waite, "Generating Long-Term Structure in Songs and Stories", Magenta, Jul. 15, 2016, https://magenta.tensorflow.org/2016/07/15/lookback-rnn-attention-rnn.

Rombach, et al. "High-Resolution Image Synthesis with Latent Diffusion Models", In Proceedings of the IEEE/CVF Conference on Computer Vision and Pattern Recognition, 2022, pp. 10684-10695, https://arxiv.org/abs/2112.10752.

Nichol, et al., "GLIDE: Towards Photorealistic Image Generation and Editing with Text-Guided Diffusion Models", Dec. 20, 2021, https://arxiv.org/abs/2112.10741.

Liu, et al., "Paint Transformer: Feed Forward Neural Painting with Stroke Prediction", In Proceedings of the IEEE/CVF international conference on computer vision, 2021, pp. 6598-6607, https://arxiv.org/abs/2108.03798.

"Text2Scene: GeneratingCompositional Scenes from Textual Descriptions", CVPR, Rice University, 2019, https://www.vislang.ai/text2scene.

Ramesh, et al. "Hierarchical Text-Conditional Image Generation with CLIP Latents", 2022, https://arxiv.org/abs/2204.06125.

Saharia, et al., "Photorealistic Text-to-Image Diffusion Models with Deep Language Understanding", 2022, https://arxiv.org/abs/2205.11487.

Lee, et al., "Higher-order Coreference Resolution with Coarse-to-fine Inference", NAACL-HLT, 2018, https://arxiv.org/abs/1804.05392.

Honnibal, et al., "A Non-Monotonic Arc-Eager Transition System for Dependency Parsing", Proceedings of the Seventeenth Conference on Computational Natural Language Learning, 2013, pp. 163-172, https://aclanthology.org/W13-3518/.

Khashabi, et al., "UnifiedQA: Crossing Format Boundaries with a Single QA System", EMNLP Findings, 2020, https://arxiv.org/abs/2005.00700.

FitzGerald, et al., "Alexa Teacher Model: Pretraining and Distilling Multi-Billion-Parameter Endcoders for Natural Language Understanding Systems", Proceedings of the 28th ACM SIGKDD Conference on Knowledge Discovery and Data Mining, Aug. 2022, pp. 2893-2902, https://doi.org/10.1145/3534678.3539173.

* cited by examiner

Figure 14:
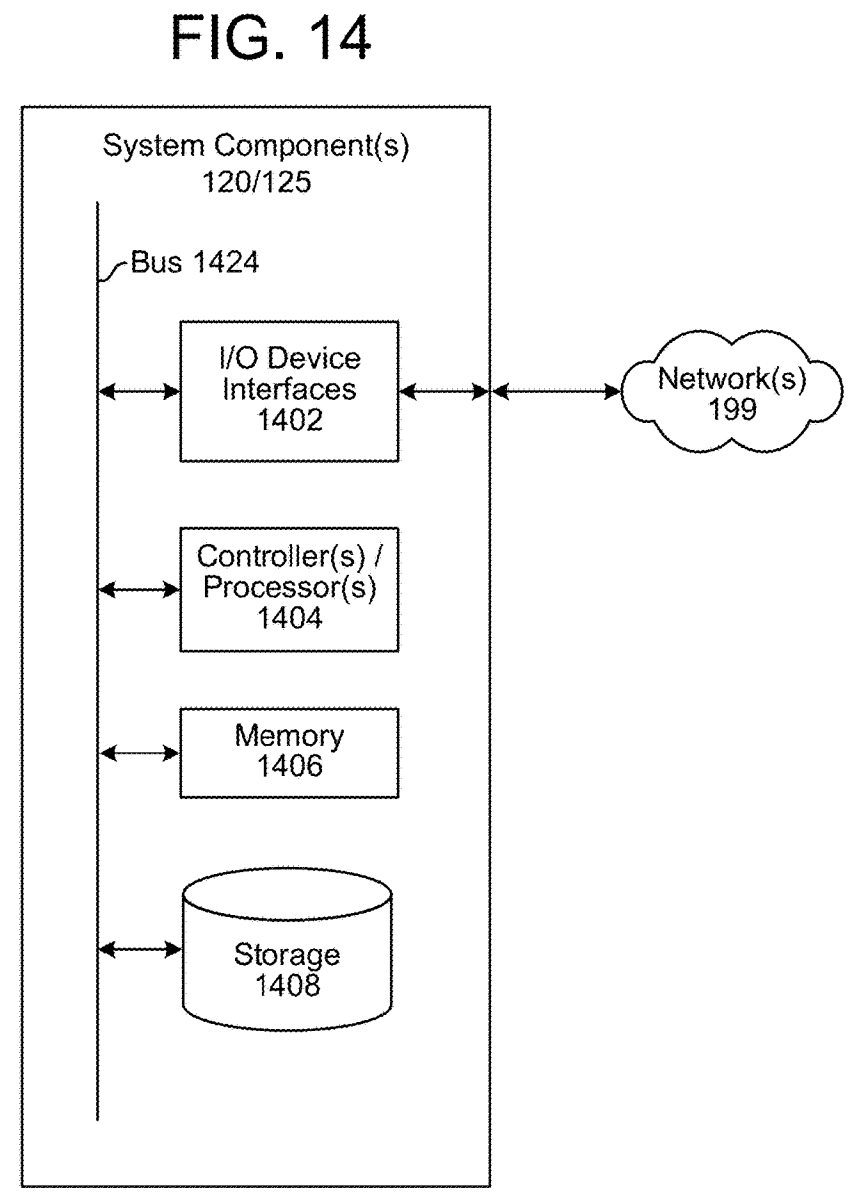

System Component(s)
120/125

Bus 1424

Network(s)
199

I/O Device
Interfaces
1402

Controller(s) /
Processor(s)
1404

Memory
1406

Storage
1408

GENERATING VIDEO CONTENT FROM USER INPUT DATA

CROSS-REFERENCE TO RELATED APPLICATION

This application claims benefit under 35 U.S.C. § 119(e) of U.S. Provisional Patent Application No. 63/407,944, filed Sep. 19, 2022, and titled "VIRTUAL COMPANION," the contents of which are incorporated herein by reference in their entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 10 is a conceptual diagram of an automatic speech recognition (ASR) component, according to embodiments of the present disclosure.

FIG. 14 is a block diagram conceptually illustrating example components of a system component(s), according to embodiments of the present disclosure.

DETAILED DESCRIPTION

Figure 1:
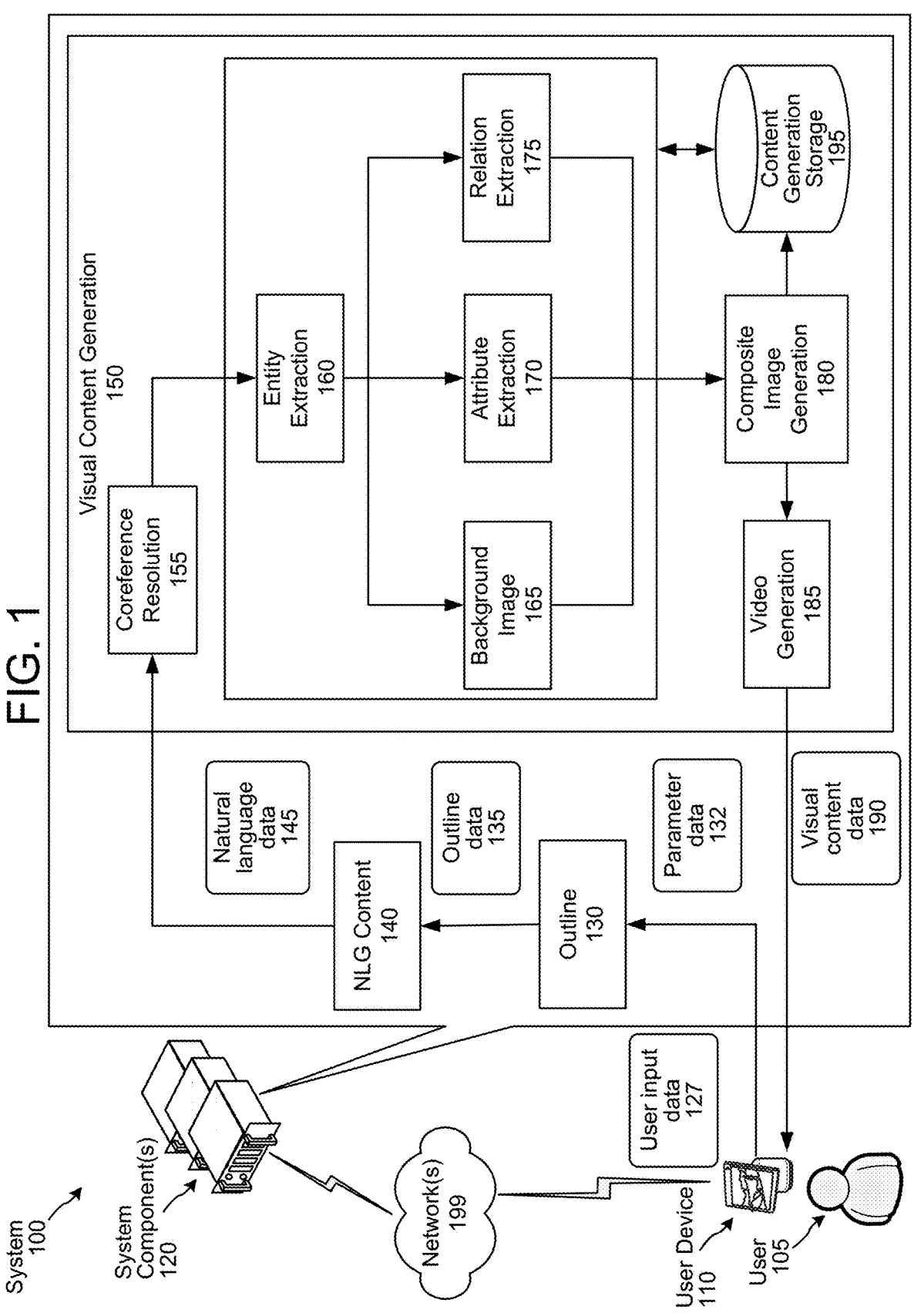
FIG. 1 is a conceptual diagram illustrating a system for generating content, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

A system may output a response, to a natural language input, as synthesized speech using TTS processing. For example, a system may output synthesized speech of weather information in response to the natural language input "what is the weather forecast for today?" As another example, a system may output synthesized speech of a joke in response to the natural language input "tell me a joke." As a further example, a system may output synthesized speech summarizing a news narrative in response to the natural language input "tell me my daily briefing." As a further example, a system may output synthesized speech summarizing the flow of traffic in response to the natural language input "how is the traffic for my commute to work?"

In some instances, a system may output a response, to a natural language input, as synthesized speech and displayed content. For example, a system may output synthesized speech representing the time remaining on a timer, and display the corresponding timer information, in response to the natural language input "how much time is left on my timer." As another example, a system may output synthesized speech indicating a door has been locked, and display a video of a lock actuating to a locked position, in response to the natural language input "lock the front door." As another example, a system may output synthesized speech indicating a garage door has been closed, and display a video of the garage door moving from an open position to a closed position, in response to the natural language input "close the garage door." As another example, a system may output synthesized speech indicating rain is forecast for the day, and display a video of rainfall, in response to the natural language input "tell me today's weather."

The present disclosure provides techniques for generating content for a system-generated response to a user-provided input. The system may generate natural language data responsive to a user input. For example, if the system receives a user input requesting the output of a narrative, and optionally receives one or more user inputs corresponding to parameters for the narrative (e.g., indicating a theme, a type of character, a plot, a mood, etc.), the system may generate a natural language narrative in the form of natural language data, and the natural language narrative may be based on any provided parameter(s).

The system-generated natural language data may include one or more portions. When the natural language data is a narrative, each portion of the natural language data may correspond to a different scene of the narrative, and each scene may correspond to one or more sentences of the natural language data.

The system may perform coreference resolution processing, across the various portions of the natural language data, to replace any ambiguous references to entities with the corresponding entity being referred to. The coreference resolution processing may result in the generation of updated natural language data, where the ambiguous references are replaced with the corresponding entities. For example, for the natural language data "This is sample, natural language text to help illustrate how natural language can be processed as an input by a coreference resolution component. It may be configured to resolve coreference ambiguities," the result of the coreference resolution processing may represent "This is sample, natural language text to help illustrate how natural language can be processed as an input by a coreference resolution component. The coreference resolution component may be configured to resolve coreference ambiguities," where the reference to "It" in the second sentence is replaced with "The coreference resolution component."

The system may also perform entity extraction processing to identify the entities included in the updated natural language data. Moreover, the entity extraction processing may include identifying a corresponding image for each identified entity.

The system may use the identified entities, the images of the entities, and/or the updated natural language data to identify a background image representing a background associated with the updated natural language data.

The system may perform attribute extraction processing using the identified entities, the images of the entities, and/or the updated natural language data to determine attributes included in the updated natural language data that modify entities included in the updated natural language data. In some embodiments, the attribute extraction processing may be used to determine attributes for altering presentation of an entity, such as size, color, shape, count, etc. from the entity's default presentation.

The system may perform relation extraction processing using the identified entities, the images of the entities, and/or the updated natural language data to determine spatial relationships between two or more entities included in the updated natural language data.

The system may use the identified entities, the images of the entities, the background image, the attributes, the spatial relationships, and/or the updated natural language data to generate a composite image representing the updated natural language data. The system may repeat this process for each portion of the updated natural language data, such that the system may generate a corresponding composite image for each portion of the updated natural language data. When processing for a given portion of the natural language data, the system may perform the foregoing entity extraction processing, background image identification processing, attribute extraction processing, and/or relation extraction processing with respect to the given portion of the natural language data.

The system may store a representation of the identified entities, the images of the entities, the background image, the attributes, the spatial relationships, and/or the updated natural language data to a content generation storage, to be associated with a content request identifier corresponding to the current request for content. This data may be used by one or more components of the system to determine/generate data responsive to the request for content, based on previously determined/generated data responsive to the request for content.

In some embodiments, the system may generate a video for a composite image, where the video includes animations of the entities included in the composite image data.

The system of the present disclosure may receive first input audio corresponding to a first spoken natural language input. The system may perform automatic speech recognition (ASR) processing on the first input audio to determine a first ASR output representing a transcript of the first spoken natural language input. The system may determine, using the first ASR output, that the first spoken natural language input requests that a narrative be output, and includes a first narrative parameter. The system may process, using a first trained machine learning (ML) component, the first narrative parameter to generate a natural language output corresponding to the narrative, where the natural language output comprises a first portion corresponding to a first scene of the narrative, and a second portion corresponding to a second scene of the narrative. The system may process, using a second trained ML component, the first portion of the natural language output to determine a first entity represented in the first portion of the natural language output. The system may determine, using the second trained ML component, a first image corresponding to the first entity. The system may process, using a third trained ML component, the first portion of the natural language output and the first entity to determine a first background image for the first scene of the narrative. The system may process, using a fourth trained ML component, the first portion of the natural language output and the first entity to determine an attribute corresponding to the first entity, where the attribute represents how the first entity is to be presented. The system may process, using a fifth trained ML component, the first image, the first background image, and the attribute to generate a first scene, where the first scene indicates how the first image is to be rendered with the first background image based on the attribute. The system may generate a first output image based on the first scene. The system may process, using the second trained ML component, the second portion the natural language data to determine the first entity is represented in the second portion of the natural language data. The system may determine, using the first scene the first image is to be used to render the first entity in the second scene of the narrative. The system may generate, using the first image, a second output image corresponding to the second scene of the narrative.

In some embodiments, the system may store a representation of the first entity, the first image, the first background image, and the attribute in association with a content request identifier corresponding to the first spoken natural language input. The system may retrieve the representation of the first entity. Based at least in part on determining that the first entity is represented in the second portion, the system may retrieve the first image. The system may process, using the second trained ML component, the second portion of the natural language output to determine a second entity represented in the second portion of the natural language output. The system may determine, using the second trained ML component, a second image corresponding to the second entity. The system may process, using the third trained ML component, the second portion of the natural language output, the first entity, and the second entity to determine a second background image for the second scene of the narrative. The system may process, using the fifth trained ML component, the first image, the second image, and the second background image to generate a second scene, where the second scene indicates how the first image and the second image are to be rendered with the second background image.

In some embodiments, the system may further process, using a sixth ML model, the natural language output to determine a third portion of the natural language output that corresponds to the first narrative parameter. The system may replace the third portion of the natural language narrative with the first narrative parameter.

In some embodiments, the system may further process, using a seventh ML model, the natural language output and the first entity to determine a portion of the first background image where the first image is to be located when it is rendered with the first background image, where the first scene indicates the portion of the first background image where the first image is to be located when it is rendered with the first background image, and where the second output image is generated to include the first image located with respect to the first background image as indicated in the first scene.

The system of the present disclosure may receive a first user input, and determine the first user input requests content be output and indicates a first parameter for configuration of the content. The system may, based on the first parameter, determine a natural language output corresponding to the content. The system may determine a first entity included in a first portion of the natural language output, the first entity associated with an attribute, and determine a first image corresponding to the first entity. The system may determine a background image representing the natural language output. The system may generate a first scene indicating how the first image is to be rendered with the attribute and with the first background image, and may generate a first output image based on the first scene. The system may determine the first entity is included in a second portion of the natural language output. Based on the first scene and the first entity being included in the second portion of the natural language data, the system may generate a second output image to represent the first entity using the first image.

In some embodiments, the system may further determine, in the first portion of the natural language data, an attribute corresponding to the first entity, where the attribute represents how the first entity is to be rendered. The system may generate the first scene to indicate how the first image is to be rendered using the attribute.

In some embodiments, the system may further determine a spatial relationship between the first entity and a second entity, where the spatial relationship represents how the first entity is to be rendered with the second entity.

In some embodiments, the system may further determine a second entity included in the second portion of the natural language output. The system may determine a second image corresponding to the second entity. The system may determine, using the first entity, the second entity, the first image data, and the second image data, a second background image. The system may generate a second scene indicating how the first image and the second image are to be rendered with the second background image.

In some embodiments, the system may further determine a third portion of the natural language output corresponding to a second entity. The system may determine the second entity corresponds to the first entity. Based on the second entity corresponding to the first entity, the system may replace the second entity with the first entity in the third portion of the natural language output.

In some embodiments, the system may further, perform text-to-speech (TTS) processing using the natural language output to generate first output audio comprising a first portion corresponding to the first portion of the natural language data, and a second portion corresponding to the second portion of the natural language data. The system may cause the first output audio to be presented. While the first portion of the first output audio is being presented, the system may cause the first output image to be presented. After the first portion of the first output audio is presented, and while the second portion of the first output audio is being presented, the system may cause the second output image to be presented.

In some embodiments, the system may further generate a third output image corresponding to the first output image, where the first entity is represented differently in the first output image than in the third output image. The system may further generate an output video using the first output image and the third output image.

In some embodiments, the first user input may request a narrative be output, the first output image may corresponding to a first portion of the narrative, and the second output image may correspond to a second portion of the narrative.

Teachings of the present disclosure provide, among other things, an improved user experience by generating and presenting content for output in response to a user input. For example, in response to a user requesting output of the day's forecast, the system can output audio representing the forecast, and may also visually present a system-generated image or video representing the forecast. The user may benefit from the visual representation of the forecast, in that the user may view, in addition to hear, the response to the user's request for forecast information. For further example, in response to the user requesting output of a narrative, the device can generate and present a representation of the narrative.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for generating content for output to a user 105. The system 100 may include a user device 110, local to the user 105, in communication with a system component(s) 120 via a network(s) 199. The network(s) 199 may include the Internet and/or any other wide- or local-area network, and may include wired, wireless, and/or cellular network hardware.

The system component(s) 120 may include various components. With reference to FIG. 1, the system component(s) 120 may include an outline component 130, a natural language generation (NLG) content component 140, and a visual content generation component 150.

The visual content generation component 150 may include various components. The visual content generation component 150 may include a coreference resolution component 155, an entity extraction component 160, a background image component 165, an attribute extraction component 170, a relation extraction component 175, a composite image generation component 180, a content generation storage 195, and a video generation component 185.

As illustrated in FIG. 1, the user device 110 may send user input data 127 to the system component(s) 120. In some embodiments, the user input data 127 may represent a user request to output content. For example, the user input data 127 may represent the user input "can you show me a story" or "what is today's weather." In other embodiments, the user input data 127 may represent one or more responses of the user 105 to system component(s) 120-prompts output by the user device 110. For example, in response to the user input "can you show me a story," the system component(s) 120 may cause the user device 110 to output one or more prompts such as "where would you like the story to take place," "what is the name of your hero," "what is the title of your story," "pick a color," "pick a descriptive word," or the like. The user input data 127 may include parameters responsive to one or more of these prompts, or other similar prompts, and which the system component(s) 120 may use to generate a narrative.

The user input data 127 may include input text data of a typed natural language user input, input audio data of a spoken natural language user input, etc. In the situation where the user input data 127 includes input audio data, the system component(s) 120 may perform ASR processing using the input audio data to generate ASR output data including a transcript of the input audio data, and may perform NLU processing using the ASR output data to generate NLU output data including at least an intent corresponding to the input audio data. Alternatively, the system component(s) 120 may perform SLU processing using the input audio data to generate the NLU output data, without first generating the ASR output data.

In some embodiments, the NLU output data may indicate the user input data 127 requests output of content corresponding to one or more entities, where the one or more entities may be used as one or more parameters for generating content for output to the user 105. For example, the user 105 may say "can you tell me a story with a knight in an enchanted forest." In this example, the NLU output data may include an "Output Narrative" intent indicator, and may indicate the user input includes a character type entity of "knight" and a narrative setting (e.g., a place, a time period, etc.) entity of "enchanted forest." The NLU output data may further indicate the user input includes parameters representing a preferred plot, a preferred mood, a character name or additional character details, and/or the like. For further example, the user 105 may say "what is the weather forecast for New York City." In this example, the NLU output data may include an "Output Weather" intent indicator, and may indicate the user input includes a weather location of "New York City." For further example, the user input data 127 may represent user responses to prompts from the user device 110, and, in this situation, the NLU output data may represent the user responses as entities to be used as parameters for generating content.

The system may generate parameter data 132 including the parameters included in the user input data 127. The system component(s) 120 may send the parameter data 132 to the outline component 130. The outline component 130 may process the parameter data 132 to generate outline data 135. In some embodiments, the outline component 130 may use NLG processing to generate the outline data 135. The outline data 135 may include text or tokenized data generated based on the parameter(s) included in the parameter data 132, where the outline data 135 may be used to generate a natural language output to the user (e.g., a narrative or other system component(s) 120-generated natural language output).

In some embodiments, the outline component 130 may generate the outline data 135 to include one or more additional parameters to that/those included in the parameter data 132. For example, if the parameter data 132 includes parameters such as "Mermaid" and "underwater," then the outline component 130 may include an additional parameter of "seaweed" in the outline data 135.

The outline component 130 may further be configured to arrange the parameters of the outline data 135 into a logical sequence. For example, in some embodiments, where the parameter data 132 includes parameters representing narrative preferences (e.g., a character description, a narrative theme, an emotion of the narrative, a color of the character, etc.), the outline data 135 may be an outline of a logically-sequenced narrative associated with the narrative preferences. For example, if the user input is "can you show me a story with an enchanted forest and a knight," then the outline data 135 may be logically-sequenced outline of a narrative including the parameters "knight," "entered," "enchanted forest," "owl," "perched," "tree," etc.

The outline component 130 may be configured to generate the outline data 135 using a trained machine learning (ML) model. For example, the ML model may be trained to take as input one or more parameters (e.g., narrative detail preferences), and output a string of content parameters (e.g., the outline data 135) in a logical sequence. In some embodiments, the ML model may be a language model (e.g., a bidirectional auto-regressive transformer (BART)). During training of the ML model, parameters may be extracted from training inputs (e.g., user inputs, stories, databases, etc.), and a subset of the parameters may be randomly sampled to generate training parameter pairs, where each training parameter pair includes or is associated with a title. A training parameter pair may be input to the ML model, which is tasked with generating a longer string of parameters, including the subset of parameters, and one or more additional parameters associated with the subset of parameters (e.g., additional content and/or actions that have/provide a logical connection with/between the subset of parameters), where the string of parameters are arranged in a logical sequence. In some embodiments, the ML model may output more than one string of parameters (e.g., one or more outlines), and may rank them according to their length and/or diversity (e.g., vocabulary and/or distinct-token ratios determined by the number of different words of an outline divided by the total number of words of the outline) to select a top-ranking string of parameters for output (e.g., as the outline data 135).

In some embodiments, the outline data 135 may include one or more portions corresponding to content that are to be generated in response to the request for content. For example, the outline data 135 may include one or more portions (e.g., sentences) which correspond to the one or more portions of content to be generated in response to the request for content. In some embodiments, the number of portions included in the outline data 135 may be a default number (e.g., 5). In some embodiments, the number of portions included in the outline data 135 may be modified/ specified by the user 105, and may be included as a parameter in the parameter data 132. In some embodiments, the number of portions included in the outline data 135 may be based on the request for content and/or the content to be generated in response to the user request. For example, if the request for content corresponds to generating content representing the weather, the outline component 130 may determine that the outline data 135 may include two portions which correspond to two portions of content to be generated in response to the request for content. For further example, if the request for content corresponds to generating content representing a narrative (e.g., a story), the outline component 130 may determine that the outline data 135 may include five portions which correspond to five portions of content to be generated in response to the request for content.

In some embodiments, the total number of words (or total presentment time of the resulting content) for each portion of the outline data 135 may be set to a default number (e.g., 10 words, 10 seconds, etc.).

The outline data 135, generated by the outline component 130, may be sent to the NLG content component 140.

The NLG content component 140 takes as input the outline data 135, and outputs natural language data 145. The natural language data 145 may represent an updated version of the outline data 135. In other words, the natural language data 145 may include the outline data 135 along with one or more additional words, thereby transforming the outline data 135 into natural language. The one or more additional words may provide logical connections to the parameters represented in the outline data 135. In other words, the natural language data 145 may represent a long-form description representing the requested content (e.g., as represented in the outline data 135). For example, in some embodiments, where the outline data 135 represents an outline of a narrative, the natural language data 145 may be a natural language version of the narrative including the one or more parameters and one or more additional words combined to create the natural language narrative. For example, if the outline data 135 includes "knight," "entered," "enchanted forest," "owl," "perched," and "tree," then the natural language data 145 may correspond to "the knight entered the enchanted forest, where an owl was perched on a tree."

In some embodiments, the NLG content component 140 may be configured to generate more than one instance of natural language data 145, and may rank them based on a determined coherence of the content (as discussed herein below).

In some embodiments, the system component(s) 120 may send the parameter data 132 to the NLG content component 140, without first sending the parameter data 132 to the outline component 130, or may send the parameter data to both the outline component 130 and the NLG content component 140. Thus, in some embodiments, the NLG content component 140 may generate the natural language data 145 based on the outline data 135, the parameter data 132, or both the outline data 135 and the parameter data 132.

The NLG content component 140 may be configured to generate the natural language data 145 using a trained ML model. For example, the ML model may be trained to take as input one or more parameters (e.g., outline data 135), and output natural language text or tokens (e.g., the natural language data 145) including the one or more parameters, and one or more additional words providing logical connections between the one or more parameters. In some embodiments, the ML model may be a language model (e.g., a BART model). During training, the ML model may take as input parameters extracted from training content (e.g., a narrative, content output by the system component(s) 120 and/or the user device 110, publicly available content, open-source datasets, or any other available content), a title of the content, and end-of-title ([EOT]) and end-of-keywords ([EOK]) tokens. The ML model may be tasked with generating natural language data including sentences using the extracted keywords and the content title. The ML model may output the generated content as further including end-of-sentence ([EOS]) tokens.

In some embodiments, the NLG content component 140 may use a second ML model for determining whether generated natural language is coherent. The second ML model may be capable of classifying generated natural language as coherent or not (e.g., a classifier). Generated natural language may be considered coherent if the natural language is logical, consistent, and/or complete, and would be considered as such by a human reader. The second ML model may be trained using positive examples of coherent natural language text or tokens (e.g., generated using human-written stories), and negative examples of non-coherent natural language text or tokens. In some embodiments, the negative examples may be generated by inserting perturbations (e.g., repetitions, contradictions, reordering, substitutions, etc.) into coherent natural language text or tokens. The output of the second ML model may be an indication (e.g., a score) of whether the generated natural language is coherent or is incoherent. For example, if the output of the second ML model is a value meeting or exceeding (i.e., satisfying) a threshold, then the generated natural language may be considered coherent, whereas, if the output of the second ML model is a value failing to satisfy the threshold, then the generated natural language may be considered incoherent. The output of the second ML model may further be used to rank generated natural language in order to include the most coherent generated natural language in the natural language data 145.

In further embodiments, the NLG content component 140 may use one or more additional ML models (e.g., classifiers) for determining whether generated natural language includes offensive content, bias, plagiarism, etc.

The natural language data 145, generated by the NLG content component 140, may be sent to the visual content generation component 150.

In some embodiments as described herein below with respect to FIGS. 8 and 9, a skill component 890/990, or skill system component(s) 125, may generate natural language data 145 responsive to a user input. For example, the user 105 may request output of the weather forecast, and the skill component 890/990, or skill system component(s) 125, may determine natural language data 145 representing the weather forecast (e.g., "the weather in New York City today is sunny with a bit of wind"). The system component(s) 120 may send the natural language data 145, generated by the skill component 890/990 or skill system component(s) 125, to the visual content generation component 150.

The visual content generation component 150 may be configured to send the natural language data 145 to the coreference resolution component.

In some embodiments, the visual content generation component 150 may include one or more neural networks. For example, one or more of the components included in the visual content generation component 150 may represent one or more nodes and/or hidden layer(s) of a neural network that is included in the visual content generation component 150.

Figure 2:
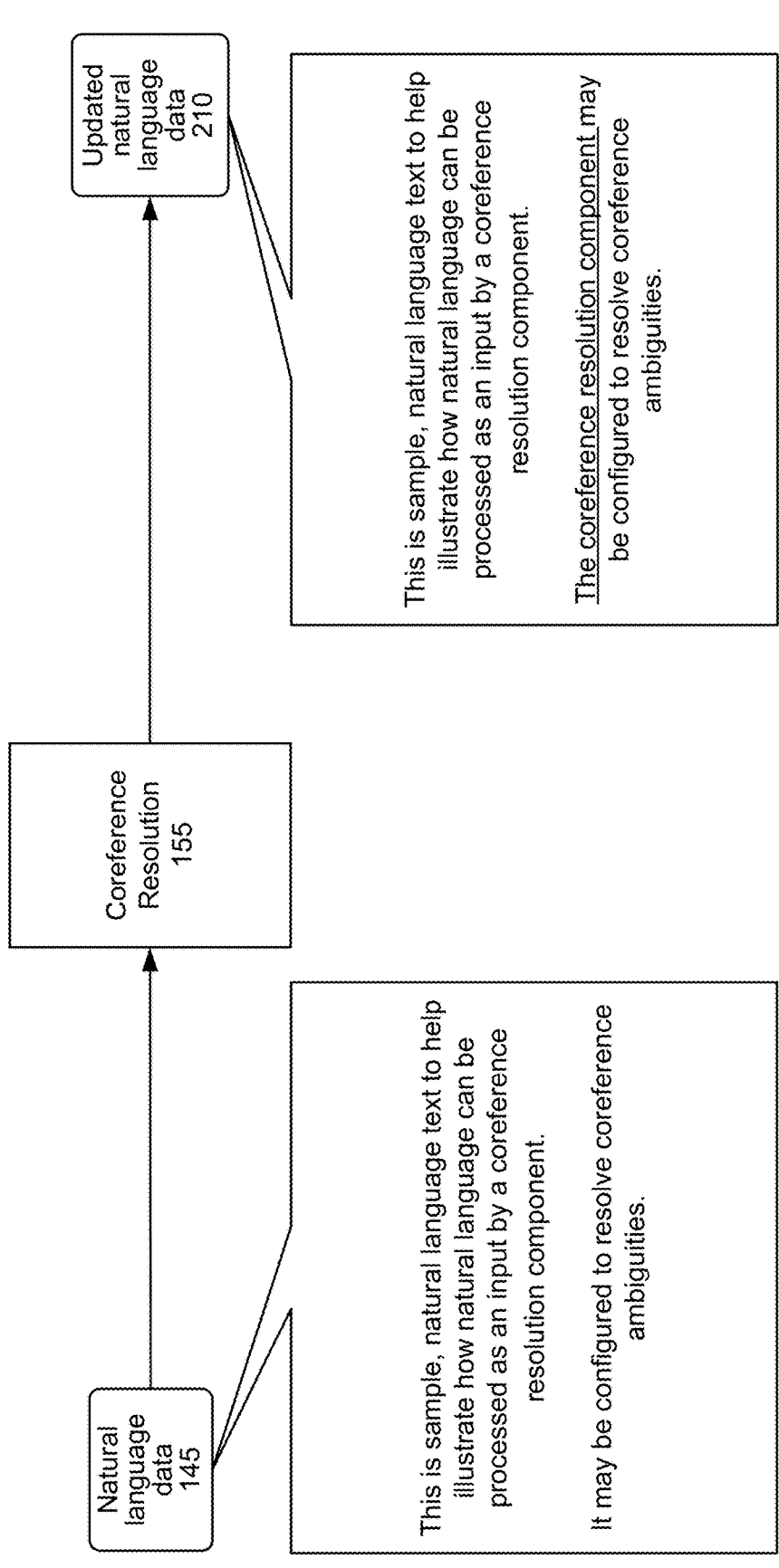
FIG. 2 is a conceptual diagram illustrating example components of and processing that may be performed by a coreference resolution component of the system, according to embodiments of the present disclosure.

The coreference resolution component 155 may be configured to take as input the natural language data 145 and perform coreference resolution processing to resolve ambiguous references to entities within the natural language data 145. A coreference may occur when two or more words/expressions refer to the same entity (e.g., they have the same referent, such as "Bob" and "he"). The coreference resolution component 155 may generate and output updated natural language data (e.g., updated natural language data 210, as shown in FIG. 2), where the updated natural language data 210 corresponds to the natural language data 145 with the ambiguous entity references replaced with the corresponding entities. In some embodiments, generation of the updated natural language data 210 may be beneficial for the processing of one or more downstream components (e.g., the entity extraction component 160). Processing of the coreference resolution component 155 is described in more detail herein below in connection with FIG. 2.

The updated natural language data 210, output by the coreference resolution component 155, may be sent to the entity extraction component 160. In situations where the updated natural language data 210 includes more than one portion (e.g., more than one sentence, more than one paragraph, more than one narrative scene, or more than one other segmentation that is to be output discretely), each portion of the updated natural language data 210 may be input separately to the entity extraction component 160, such that an instance of visual content data 190 may be generated for each portion of the updated natural language data 210.

The entity extraction component 160 may be configured to take as input the updated natural language data 210 (or portion thereof), and determine one or more entities represented in the updated natural language data 210 (or portion thereof). For example, if the updated natural language data 210 (or portion thereof) represents "while Sam the astronaut was flying through space on a rocket, Sam the astronaut looked for comets and in the sky to pass time," then the entity extraction component 160 may determine the entities "astronaut," "rocket," and "comets." For further example, if the updated natural language data 210 (or portion thereof) represents "snow is expected in New York," then the entity extraction component 160 may determine the entities "snow" and "New York."

Figure 3:
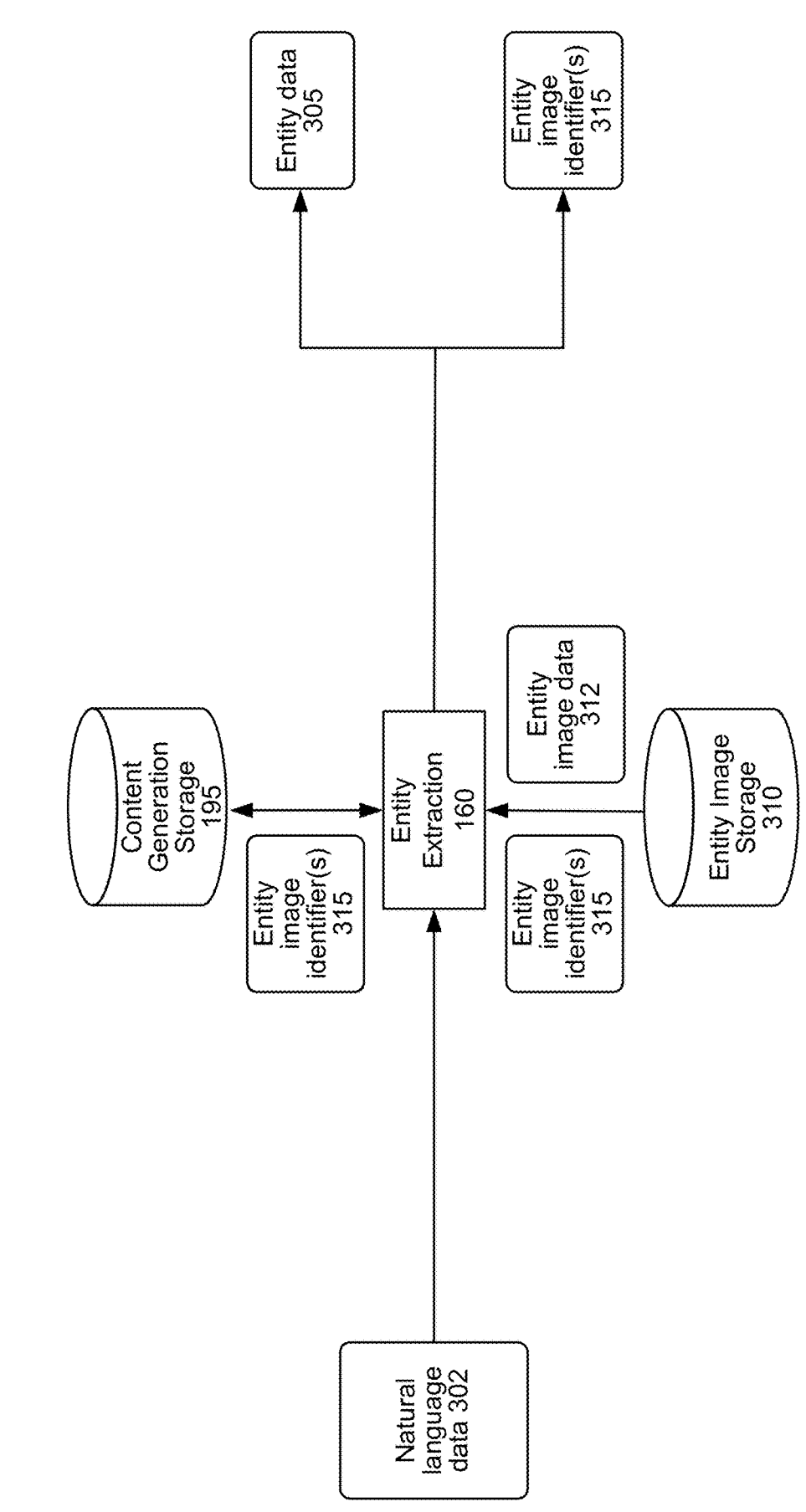
FIG. 3 is a conceptual diagram illustrating example components of and processing that may be performed by an entity extraction component of the system, according to embodiments of the present disclosure.

After determining an entity represented in the updated natural language data 210 (or portion thereof), the entity extraction component 160 may identify image data associated with the entity in storage (e.g., an entity image storage 310, as shown in FIG. 3). For example, for the entity "Princess," the entity extraction component 160 may identify image data representing a princess, whereas for the entity "snow," the entity extraction component 160 may identify image data representing snow. Within the storage (e.g., the entity image storage 310 illustrated in FIG. 3), image data may be associated with a single corresponding entity, but an entity may be associated with one or more instances of image data in the storage. The entity extraction component 160 may associate a determined entity with a corresponding identified image data in storage (e.g., the content generation storage 195, as shown in FIG. 3). The entity extraction component 160 may perform this process for each entity determined in the updated natural language data 210 (or portion thereof).

The entity extraction component 160 may send the determined one or more entities, more particularly one or more entity identifiers corresponding to the one or more entities, to the background image component 165, and optionally the attribute extraction component 170 and/or the relation extraction component 175. In some embodiments, the entity extraction component 160 may also send the associated one or more instances of image data to the background image component 165, and optionally the attribute extraction component 170 and/or the relation extraction component 175.

The background image component 165 may be configured to take as input the determined one or more entities, and more particularly the one or more entity identifiers corresponding to the one or more entities, and the updated natural language data 210 (or portion thereof), and determine background image data representing the updated natural language data 210 (or portion thereof). For example, for the updated natural language data 210 (or portion thereof) of "The knight entered the enchanted forest," and the corresponding entity information "knight" and "enchanted forest," the background image component 165 may determine background image data representing an "enchanted forest." For further example, for the updated natural language data 210 "Snow is expected in New York," and the corresponding entity information "Snow" or "New York City," the background image component 165 may determine background image data representing New York City or a snow covered location.

In some embodiments, the background image component 165 may be configured to take as input a graphical representation of the updated natural language data 210 (or portion thereof), rather than the updated natural language data 210 (or portion thereof), which represents dependencies between two or more words included in the updated natural language data 210 (or portion thereof). In other embodiments, the background image component 165 may be configured to take as input the updated natural language data 210 (or portion thereof), and generate the graphical representation of the updated natural language data 210 (or portion thereof). Processing of the background image component 165 is discussed in more detail below in connection with FIG. 4.

The background image component 165 may send the determined background image data to the composite image generation component 180.

The attribute extraction component 170 may be configured to receive the determined one or more entities and associated, more particularly the one or more entity identifiers, output by the entity extraction component 160, and the updated natural language data 210 (or portion thereof), and determine one or more attributes that are associated with and modify the one or more entities in the updated natural language data 210 (or portion thereof). In some embodiments, the one or more attributes may modify how the entity is to be presented (e.g., based on color, size, count, etc.). For example, for the updated natural language data 210 (or portion thereof) of "while Sam the astronaut was flying through space on a rocket, Sam the astronaut looked for blue comets and UFOs in the sky to pass time," the attribute extraction component 170 may determine an attribute of <Color: blue> for the entity "comet." For further example, for the updated natural language data 210 (or portion thereof) of "a large thunderstorm is forecast for later today,"

the attribute extraction component may determine an attribute of <Size: large> for the entity "thunderstorm."

In some embodiments, the attribute extraction component 170 may be configured to take as input a graphical representation of the updated natural language data 210 (or portion thereof), rather than the updated natural language data 210 (or portion thereof), where the graphical representation represents dependencies between two or more words included in the updated natural language data 210 (or portion thereof). In other embodiments, the attribute extraction component 170 may be configured to take as input the updated natural language data 210 (or portion thereof), and generate the graphical representation of the updated natural language data 210 (or portion thereof).

Processing of the attribute extraction component 170 is discussed in more detail below in connection with FIG. 5.

The attribute extraction component 170 may send one or more entity/attribute pairs to the composite image generation component 180.

The relation extraction component 175 may be configured to receive the determined one or more entities and associated one or more entity identifiers output by the entity extraction component 160, and the updated natural language data 210 (or portion thereof), and determine one or more spatial relationships (e.g., represented as one or more hierarchical relationships) between two or more of the entities. Thus, it will be appreciated that the relation extraction component 175 may only process when the entity extraction component 160 determines two or more entities in the updated natural language data 210 (or portion thereof). For example, for the updated natural language data 210 (or portion thereof) of "Pete the pirate sailed the ocean on a ship," the relation extraction component 175 may determine a spatial relationship between the entities "pirate" and "ship" representing that the entity "ship" contains the entity "pirate." For further example, for the updated natural language data 210 (or portion thereof) of "Pete the pirate reads a treasure map to find the treasure," the relation extraction component 175 may determine a spatial relationship between the entities "pirate" and "treasure map" representing that the entity "pirate" is to be holding the entity "treasure map." Other spatial relationships may include, for example, a "proximate" relationship to determine how close a first entity should be presented to a second entity.

In some embodiments, the relation extraction component 175 may be configured to take as input a graphical representation of the updated natural language data 210 (or portion thereof), rather than the updated natural language data 210 (or portion thereof), where the graphical representation represents dependencies between two or more words included in the updated natural language data 210 (or portion thereof). In other embodiments, the relation extraction component 175 may be configured to take as input the updated natural language data 210 (or portion thereof), and generate the graphical representation of the updated natural language data 210 (or portion thereof).

Processing of the relation extraction component 175 is discussed in more detail below in connection with FIG. 6.

In some embodiments, the entity extraction component 160 may send the entity information to only the background image component 165 and the attribute extraction component 170, and not the relation extraction component 175. For example, if the entity information includes only a single entity, then the entity extraction component 160 (or some other components of the visual content generation component 150) may determine to not send the entity information to the relation extraction component 175.

The relation extraction component 175 may send the determined relation data to the composite image generation component 180.

The composite image generation component 180 may be configured to process the updated natural language data 210 (or portion thereof), the entity data and associated image data output by the entity extraction component 160, the background image data output by the background image component 165, the attribute data output by the attribute extraction component 170, and/or the relation data output by the relation extraction component 175, and generate composite image data corresponding to the updated natural language data 210 (or portion thereof). For example, the composite image generation component 180 may alter one or more entity images (output from the entity extraction component 160) based on the attribute data output by the attribute extraction component 170 (e.g., change coloring within the image), and may compose the original or altered entity image(s) on the background image (output by the background image component 165) using the attribute data (e.g., indicating sizing of the entity) and/or the relation data (e.g., indicating positional relation of two or more entities).

In some embodiments, the composite image generation component 180 may be configured to determine where each entity is to be located with respect to the background image data when the image data is presented. For example, in the situation where the updated natural language data 210 (or portion thereof) is "Pete the pirate sailed the ocean on a ship," the composite image generation component 180 may determine that the "pirate" entity (e.g., the associated image data determined by the entity extraction component 160) is to be presented at a location of the image data that is above (e.g., on) the "ship" (e.g., based on the relation data), and that the "ship" entity (e.g., the associated image data determined by the entity extraction component 160) is to be presented at a location of the image data that is above (e.g., on) the portion of the background image data representing the "ocean." For further example, in the situation where the updated natural language data 210 (or portion thereof) is "a large thunderstorm is forecast in New York," the composite image generation component 180 may determine that the "thunderstorm" entity (e.g., the associated image data determined by the entity extraction component 160) is to be presented at a location of the image data that is above "New York." In some embodiments, placement of an entity with respect to the background image data may be based at least in part whether the particular entity has been included in previous image data, as discussed below in connection with FIG. 7.

In some embodiments, the composite image generation component 180 may be configured to include, in the generated composite image data, image data representing one or more additional entities not included in the updated natural language data 210 (or portion thereof), but which is/are associated with the updated natural language data 210 (or portion thereof), the one or more entities determined by the entity extraction component 160, and/or the background image data. For example, if the updated natural language data 210 (or portion thereof) represents a narrative taking place in the ocean, the background image data represents the "ocean", and the entity data indicates "fish, then the composite image generation component 180 may include image data representing "seaweed" in the generated composite image data based on "seaweed" being associated with "fish."

Processing of the composite image generation component 180 is discussed in more detail below in connection with FIG. 7.

In some embodiments, the composite image generation component 180 may send the generated composite image data to the video generation component 185.

The video generation component 185 may be configured to take as input the composite image data, and generate visual content data 190 representing an animated version of the composite image data. For example, in the situation where the composite image data represents a pirate on a brown ship sailing on an ocean, the video generation component 185 may generate visual content data 190 wherein the ship sways on the ocean and the pirate turns a steering wheel of the ship. For further example, in the situation where the composite image data represents New York City experiencing a thunderstorm, the video generation component 185 may generate visual content data 190 wherein lightning and/or rain emanates from dark clouds represented in the composite image data.

The system component(s) 120 may send the visual content data 190 to the user device 110, which may cause the visual content data 190 to be presented to the user 105. In some embodiments, the visual content data 190 may include text corresponding to the updated natural language data 210 (or portion thereof) to which the visual content data 190 corresponds. The system component(s) 120 may also send audio data (e.g., including synthesized speech of the updated natural language data 210 (or portion thereof)) to the user device 110, which may cause the audio data to be presented to the user 105 in coordination with presentation of the visual content data 190.

In some embodiments, the system component(s) may be configured to generate audio data (e.g., music) associated with the visual content data 190. For example, the system component(s) 120 may further include a component configured to take as input the natural language data 145 (or a portion thereof), and generate audio data (e.g., music) representing the natural language data 145 (or portion thereof).

Alternatively, instead of sending the composite image data to the video generation component 185, the visual content generation component 150 may cause the system component(s) 120 to send the composite image data to the user device 110 (as the visual content data 190), which may cause the user device 110 to present the composite image data to the user 105. In some embodiments, the composite image data may include text corresponding to the natural language data 145, updated natural language data 210, or portion thereof to which the composite image data corresponds.

In some embodiments, the updated natural language data 210 corresponding to the visual content data 190 (or the natural language data 302 corresponding to the composite image data) may be sent to a TTS component (e.g., the TTS component 880), which may generate output audio data corresponding to the updated natural language data 210 (or the natural language data 302). The output audio data may be output to the user 105 with the visual content data 190. In some embodiments, the updated natural language data 210 may be sent to the TTS component 880 one portion (e.g., the natural language data 302) at a time to generate corresponding output audio data.

In some embodiments, an instance of composite image data (e.g., included in the visual content data 190) may be output to the user 105 for a duration of time equal to the amount of time required for the output audio data corresponding to the instance of composite image data to be output to the user 105. For example, if a first instance of composite image data is being output to the user 105, and a first portion of output audio data (or first output audio data)

corresponding to the composite image data is also being output to the user 105, the first instance of composite image data will be output to the user 105 while the first portion of the output audio data (or first output audio data) has been output in its entirety. Thereafter, the second instance of composite image data may be output to the user 105 along with a second portion of the output audio data (or second output audio data).

In some embodiments, the video generation component 185 may be configured to generate visual content data 190 including one or more instances of composite image data, output audio data, corresponding to the visual content data 190, generated by the TTS component 880, and/or audio data (e.g., music) associated with the visual content data 190. In other embodiments, the system 100 may include a component configured to take as input (1) the visual content data 190, including one or more instances of composite image data; (2) output audio data, corresponding to the visual content data 190, generated by the TTS component 880; and/or (3) audio data (e.g., music) associated with the visual content data 190, and generate output data included the visual content data 190, the output audio data generated by the TTS component 880, and the audio data.

Processing of the visual content generation component 150 (e.g., the coreference resolution component 155, the entity extraction component 160, the background image component 165, the attribute extraction component 170, the relation extraction component 175, the composite image generation component 180, and/or the video generation component 185), may be performed for each portion (e.g., sentence, as indicated by a [EOS] token) of the natural language data 145, updated natural language data 210, or portion thereof.

In some embodiments, the output of the composite image generation component 180 may be sent to the content generation storage 195. The content generation storage 195 may include one or more instances of data determined/generated during one or more instances of content generation responsive to a request for content. As discussed herein below, with respect to FIG. 3, the content generation storage 195 may store the data in association with a content request identifier corresponding to the request for content during which the data was determined/generated.

In some embodiments, one or more of the abovementioned components may perform processing for a current instance/portion of natural language data 145/updated natural language data 210 based on one or more previous instances/portions of natural language data 145/updated natural language data 210 (and/or data determined/generated during processing thereof) for the current request for content. One or more of the abovementioned components may perform such processing by retrieving the data determined/generated from one or more previous instances of processing from the content generation storage 195. For example, the entity extraction component 160 may use the content generation storage 195 to determine an entity included in an instance of natural language data, based on the entity being included/represented in a previous instance of natural language data. For further example, the background image component 165 may use the content generation storage 195 to select background image data for a current instance of natural language data based on background image data selected for a previous instance of natural language data (e.g., to ensure consistency of background images). As another example, the attribute extraction component 170 may use the content generation storage 195 to determine an attribute included in an instance of natural language data, based on the attribute being included/represented in a previous instance of natural language data.

In some embodiments, the visual content generation component 150 may send the generated composite image data and/or the video data to the user device 110 as it is generated. In other embodiments, the visual content generation component 150 may concatenate or otherwise compile the various instances of composite image data and/or video data generated for the natural language data 145 or updated natural language data 210, and send the concatenated or otherwise compiled data to the user device 110 in a single data transmission.

FIG. 2 illustrates example processing that may be performed by the coreference resolution component 155. As illustrated in FIG. 2, and as described herein above, the coreference resolution component 155 may be configured to take as input the natural language data 145, and generate the updated natural language data 210, where ambiguous entity references in the natural language data 145 are replaced with the corresponding entity/entities in the updated natural language data 210. As such, the coreference resolution component 155 is configured to ensure consistency of entities/entity references within and/or across the one or more portions of the natural language data 145. For example, as illustrated in FIG. 2, the natural language data 145 may represent "This is sample, natural language text to help illustrate how natural language can be processed as an input by a coreference resolution component. It may be configured to resolve coreference ambiguities." The result of the coreference resolution component 155 processing the foregoing natural language data 145 may be the updated natural language data 210 including "The coreference resolution component may be configured to resolve coreference ambiguities," where the ambiguous entity reference of "It" is replaced with the corresponding entity of "The coreference resolution component." For further example, if the natural language data 145 represented "Snow is forecast in New York. It is expected to get up to 18 inches of snow," then the updated natural language data 210 may include "Snow is forecast in New York. New York is expected to get up to 18 inches of snow," where the ambiguous entity reference of "it" is replaced with the corresponding entity of "New York."

In some embodiments, the coreference resolution component 155 may be configured to resolve ambiguous entity references that correspond to a partial reference of the entity. For example, if the natural language data 145 represented "Sam the astronaut was flying through space on his shiny red spaceship. Sam the astronaut parked the spaceship on the Moon," then the updated natural language data 210 may include "Sam the astronaut was flying through space on his shiny red spaceship. Sam the astronaut parked the shiny red spaceship on the Moon," where the partial reference of "spaceship" is replaced with the entirety of the corresponding entity "shiny red spaceship." In another example, if the natural language data 145 represented "Sam the astronaut was flying through space on his shiny red spaceship. Sam the astronaut parked the spaceship on the Moon," may be identical to the natural language data 145, but may be associated with an indication that "spaceship" corresponds to "shiny red spaceship" such that the "shiny red spaceship" may be included in an image generate for the natural language data 145 including the word "spaceship" without the qualifying language "shiny red." In further embodiments the coreference resolution component 155 may be configured to resolve ambiguous entity references that correspond to entities that are similar to the intended entity. For example, if the natural language data 145 represented "Sam the astronaut was flying through space on his shiny red spaceship. Sam the astronaut parked the rocket on the Moon," then the updated natural language data 210 may include "Sam the astronaut was flying through space on his shiny red spaceship. Sam the astronaut parked the shiny red spaceship on the Moon," where the entity reference to the similar entity "rocket" is replaced with the intended entity "shiny red spaceship." In another example, if the natural language data 145 represented "Sam the astronaut was flying through space on his shiny red spaceship. Sam the astronaut parked the rocket on the Moon," then the updated natural language data 210 may be identical to the natural language data 145, but may be associated with an indication that "rocket" corresponds to "shiny red spaceship" such that the "shiny red spaceship" may be included in an image generate for the natural language data 145 including the word "rocket."

The coreference resolution component 155 may be configured to generate the updated natural language data 210 using a trained ML model (e.g., a coreference resolution model). For example, the ML model may be trained to take as input natural language text or tokens corresponding to content (e.g., a narrative, system-generated response, etc.), and output updated natural language text or tokens including the natural language text or tokens, where ambiguous entity references are replaced with the corresponding entity being referenced. The ML model may be trained using supervised training methods, in some embodiments. For example, during training, the ML model may be provided a set of training coreference clusters including entity coreferences and their corresponding antecedents (e.g., a training pair of "he" and "Bob," where "he" is the current coreference, and "Bob" is it's antecedent), where the ML model is tasked with properly predicting the antecedents for each entity coreference input. Based on whether the ML model properly predicts the corresponding antecedents, the ML model may be trained accordingly.

In some embodiments, the coreference resolution component 155 may be configured to generate the updated natural language data 210 using multiple portions of the natural language data 145. For example, the coreference resolution component 155 may determine a first portion of the updated natural language data 210 corresponding to a first portion of the natural language data 145 (e.g., a sentence). The coreference resolution component 155 may further be configured to determine a second portion of the updated natural language data 210 corresponding to a second portion of the natural language data 145 using the first portion of the updated natural language data 210. For example, the coreference resolution component 155 may determine to replace an ambiguous entity reference of "she" in a current portion of the natural language data 145 with the entity "Princess Pink" based at least in part on the entity extraction component 160 determining that a previous portion of the natural language data 145 included the entity "Princess Pink."

In some embodiments, the coreference resolution component 155 may be configured to process the natural language data 145 one portion at a time. For example, the input to the coreference resolution component 155 may be a portion of the natural language data 145, and the coreference resolution component 155 may send the resulting updated natural language data 210 (corresponding to the portion of the natural language data 145) to the entity extraction component.

FIG. 3 illustrates example processing that may be performed by the entity extraction component 160. As illustrated in FIG. 3, and as described herein above, the entity extraction component 160 may be configured to take as input natural language data 302. The natural language data 302 may correspond to the natural language data 145 (or portion thereof), the updated natural language data 210 (or portion thereof), or some combination thereof. The entity extraction component 160 may determine one or more entities (e.g., nouns) represented in the natural language data 302. In some embodiments, the output of the entity extraction component 160 may include entity data 305 representing one or more entities (e.g., "Princess") determined to be included in the natural language data 302, one or more instances of entity image data 312 each representing a different entity of the entities, and/or one or more entity image identifiers 315 corresponding to the one or more instances of entity image data 312 (e.g., "Princess_Pink_1"). The entity extraction component 160 may be configured to send the entity data 305, the entity image identifier(s) 315, and/or the entity image data 312 to the background image component 165 and, optionally, the attribute extraction component 170 and/or the relation extraction component 175. In some embodiments, the entity extraction component 160 may only output, and send, the entity data 305 and the entity image identifier(s) 315, and the downstream component(s) may use the entity image identifier(s) 315 to determine the corresponding entity image data 312.

The entity extraction component 160 may determine the entity image data 312 and the corresponding entity image identifier(s) 315 from the entity image storage 310. The entity image storage 310 may include one or more instances of entity image data 312 that represent various objects and/or entities (e.g., a tree, a bird, a princess, a king, rain, sun, snow, clouds, frog, etc.). An instance of entity image data 312, included in the entity image storage 310, may be stored in association with a corresponding entity identifier 315.

In some embodiments, during processing of the entity extraction component 160 with respect to a subsequent instance of natural language data 302 (e.g., corresponding to subsequent portion of the natural language data 145 or updated natural language data 210), the entity extraction component 160 may, after determining an entity represented in the natural language data 302, determine whether the entity has been previously determined during a previous iteration of processing of the entity extraction component 160. For example, the entity extraction component 160 may compare an entity identifier 315, associated with the determined entity in the presently processed instance of natural language data 302, with the entity image identifier(s) 315 stored in the content generation storage 195. For further example, the entity extraction component 160 may compare the determined entity with the entity data 305 stored in the content generation storage 195. The content generation storage 195 may include one or more entity image identifier (s) 315 (and optionally entity image data 312 and entity data 305) that were determined during a current request for content. The current request for content may correspond to the request represented in the user input data 127 (e.g., "show me the weather"), and the subsequent processing performed by the system component(s) 120 to generate content responsive to the user input data 127. If the entity extraction component 160 determines that the entity has been previously determined (e.g., determines an extracted noun corresponds to a noun represented in the content generation storage 195), then the entity extraction component 160 may associate the corresponding entity identifier (i.e., associated with the noun in the content generation storage 195) with the entity (i.e., extracted from the presently processed natural language data 302) once again. In some embodiments, the entity extraction component may compare the entity identifier 315/entity data 305 to entity image identifier(s) 315/entity data 305 stored in a identified entity storage (not illustrated) that includes one or more instances of entity data 305, entity image data 312, and entity image identifier(s) 315 determined for the current request for content.

The entity extraction component 160 may send the determined entity identifier(s) 315 (and optionally the entity image data 312 and the entity data 305), to the content generation storage 195 to be stored in association with the current request for content. In some embodiments, after output of the content responsive to the request for content, any entries, associated with the current request for content (e.g., associated with a content request identifier corresponding to the current request for content), may be deleted from the content generation storage 195. The content generation storage 195 is discussed further below in connection with FIG. 7.

In some embodiments, as discussed above, the entity extraction component 160 may be configured to alternatively send the determined entity image identifier(s) 315 (and optionally the entity image data 312 and the entity data 305) to an identified entity storage (not illustrated) including one or more instances of entity data determined for the current request for content.

The entity extraction component 160 may be configured to determine the one or more entities included in the natural language data 302 using a trained ML model. For example, the ML model may be trained to take as input natural language text or tokens representing content (e.g., a narrative, system-generated response, etc.). During training, the ML model may receive a training input corresponding to tagged/labeled natural language text or tokens from a corpus of training inputs, and may be tasked with determining entities included in the training input. The output of the ML model may be a representation of the determined one or more entities (e.g., the entity data 305).

The entity extraction component 160 may be configured to determine pre-stored (in the entity image storage 310) entity image data 312 that corresponds to an entity determined in the natural language data 302 (e.g., based on a tag/label associated with the entity image data 312 matching the determined entity, an entity identifier 315 associated with the entity image data 312 matching the determined entity, etc.)

Additionally, or alternatively, the entity extraction component 160 may be configured to determine the entity image data 312 using a second trained ML model. For example, the second ML model may be trained to take as input natural language text or tokens representing an entity, and output image data representing the entity. During training, the second ML model may receive a training cluster including an entity and image data representing the entity, and the second ML model may be tasked with predicting the image data.

In some embodiments, the entity extraction component 160 may be configured to determine one or more additional entities that are not represented in the natural language data 302. The entity extraction component 160 may determine the one or more additional entities based on the one or more additional entities being associated the one or more entities determined in the natural language data 302. For example, an additional "fish" entity may be determined based on it being associated with a determined "mermaid" entity represented in the natural language data 302. In some embodiments, the entity extraction component 160 may determine the additional entity using a knowledge graph of associated entities. For example, the knowledge graph may represent the entity "mermaid," as well as one or more entities associated with the entity "mermaid." Therefore, the entity extraction component 160 may use the knowledge graph to determine that, for the determined entity "mermaid," that an additional entity of "fish" could also be included in the generated content. The entity extraction component 160 may determine one or more instances of entity image data 312 representing the one or more additional entities.

In some embodiments, the visual content generation component 150 may include a component (e.g., a ML model) configured to generate entity image data 312. For example, the component may be configured to process the natural language data 302 and an entity determined to be included in the natural language data 302 (and/or an additional entity associated with an entity included in the natural language data 302), and generate entity image data representing the entity.

Figure 4:
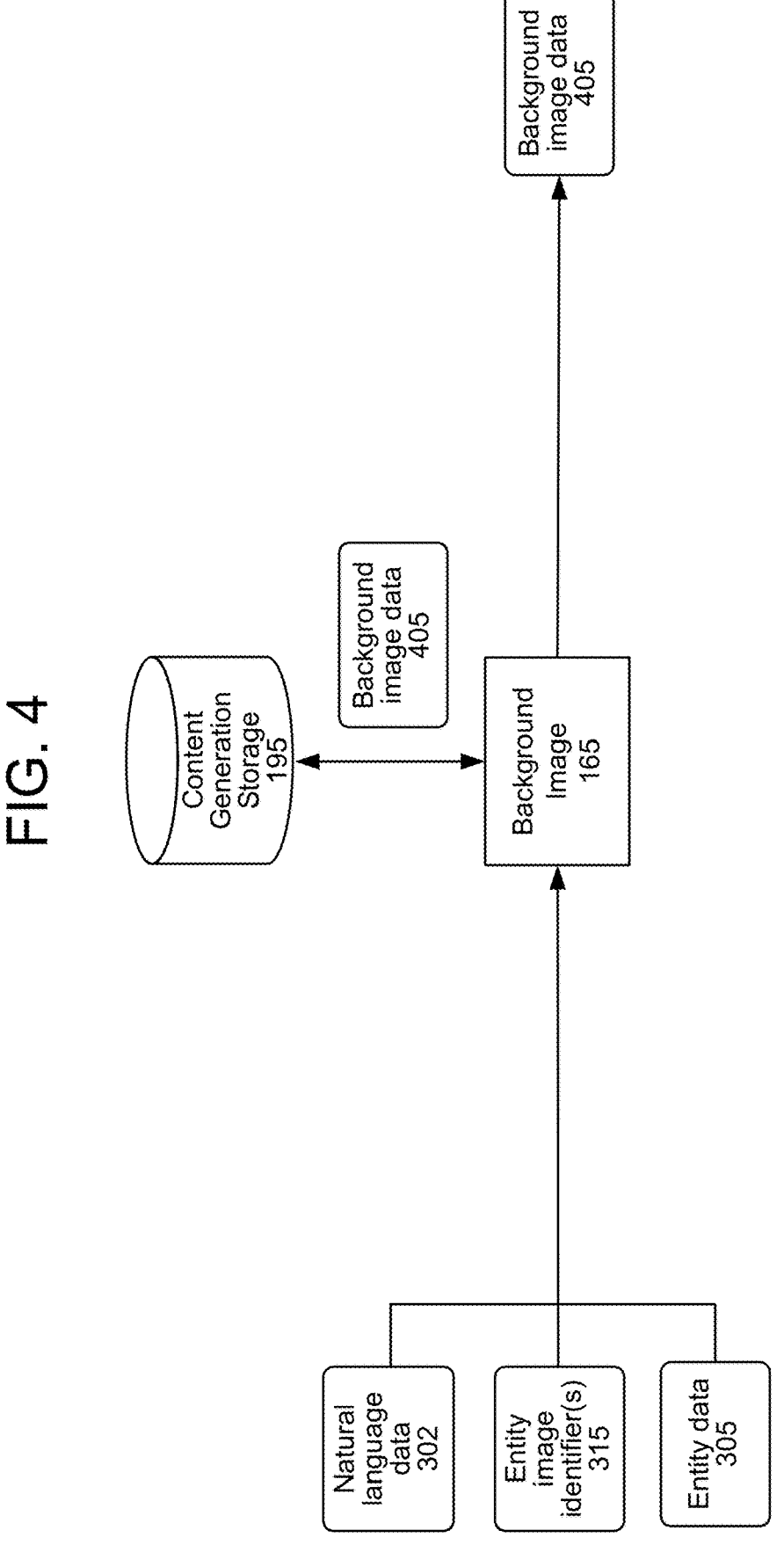
FIG. 4 is a conceptual diagram illustrating example components of and processing that may be performed by a background image component of the system, according to embodiments of the present disclosure.

FIG. 4 illustrates example processing that may be performed by the background image component 165. As illustrated in FIG. 4, and as described herein above, the background image component 165 may be configured to take as input the natural language data 302 (i.e., corresponding to the natural language data 145 (or portion thereof), the updated natural language data 210 (or portion thereof), or some combination thereof), the entity data 305 representing one more entities included in the natural language data 302, one or more entity identifier(s) 315 corresponding to entity image data representing the one or more entities, and, optionally, one or more instances of entity image data 312, and determine background image data 405 associated with the natural language data 302. As discussed herein above, in some embodiments, the background image component 165 may be configured to further take as input a graphical representation of the natural language data 302, which represents dependencies between two or more words included in the natural language data 302 (e.g., the output of a dependency parser, which may be included in the visual content generation component 150).

In some embodiments, the background image data 405 is determined from a plurality of instances of pre-generated background image data. For example, during offline operations (e.g., not during runtime), the background image component 165 may generate background image data 405 that may be selected during runtime in response to a request for content. In some embodiments, the background image component 165 may be configured to generate the background image data 405 during runtime.

The background image component 165 may be configured to generate background image data (e.g., the background image data 405) using a first trained ML model. For example, the ML model may be configured to take as input natural language text or tokens representing content (e.g., a narrative, system-generated response, etc.), and output image data representing the content. During training, the ML model may be provided natural language training inputs representing content (e.g., stories, system-generated response, etc.) and a seed image, representing a particular category (e.g., ocean, forest, castle, city, etc.), and may be tasked with generating image data that represents the training input. In some embodiments the ML model may be a generative model (e.g., a latent diffusion model). In some embodiments, the generated image data is processed by a second trained ML model (e.g., a style transferring model), which processes the generated image data and outputs non-photo-realistic image data representing the generated image data.

In some embodiments, where the processing of the first and second ML models of the background image component 165 are performed during offline operations, the background image component 165 may determine (e.g., select), at runtime, the background image data 405 from the plurality of instances of pre-generated background image data using a third ML model. The third ML model may be trained to take as input natural language text or tokens corresponding to at least a portion (e.g., a sentence) of content (e.g., a narrative, system-generated response, etc.) and an entity (e.g., a theme such as "city," "forest," "home," etc.), and determine a category classification associated with the input natural language text or tokens (e.g., "enchanted forest", "ocean", "city", "desert," etc.). During training, the ML model may be provided a training input pair including natural language text or tokens representing content and/or entities and a corresponding category classification corresponding to the natural language text or tokens, and may be tasked with correctly predicting the category classification for the natural language text or tokens. The output of the ML model may be a category classification corresponding to the input natural language text or tokens (e.g., "enchanted forest," "ocean," "city," "desert," etc.). The category classification may correspond to a plurality of image data associated with the category. The background image component 165 may select background image data 405 from the plurality of image data associated with the category. In some embodiments, the third ML model may be configured to select and output the background image data 405.

In some embodiments, during processing of the background image component 165 with respect to a subsequent instance of natural language data 302, the background image component 165 may determine the background image data 405 further using one or more instances of background image data 405 associated with one or more previous instances of natural language data 302. For example, the background image component 165 may compare the determined background image data 405 with background image data stored in the content generation storage 195 to determine if the background image data 405 is the same as one or more instances of the background image data previously determined for the current request for content.

In some embodiments, the background image component 165 may compare the background image data 405 with the one or more instances of background image data previously determined for the current request for content to maintain a consistency with respect to the background image data 405 for the request for content. For example, when determining the current background image data 405 for a current instance of natural language data 302, the background image component 165 may determine background image data 405 that is the same as that determined for a previous instance of natural language data 302. In some embodiments, the background image component 165 may compare the background image data 405 with the one or more instances of background image data previously determined for the current request for content to maintain a diversity with respect to the background image data for the request for content. For example, when determining the current background image data 405 for a current instance of natural language data 302, the background image component 165 may determine background image data 405 that is different from that determined for a previous instance of natural language data 302.

The background image component 165 may send the background image data 405 to the content generation storage 195 to be stored in association with the current request for content. In some embodiments, after output of the content responsive to the request for content, any entries, associated with the current request for content (e.g., associated with a content request identifier corresponding to the current request for content), may be deleted from the content generation storage 195. The content generation storage 195 is discussed further below in connection with FIG. 7.

Figure 5:
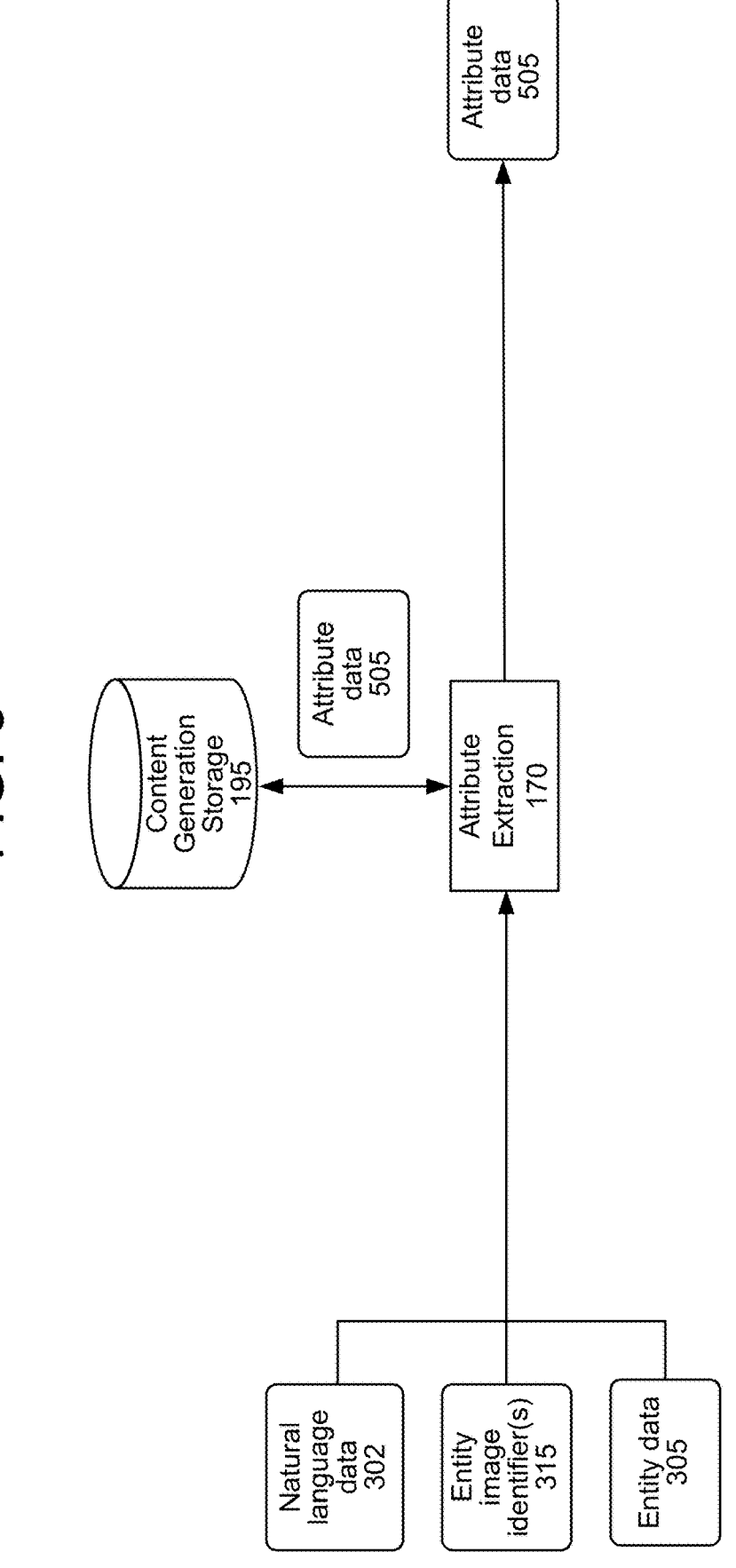
FIG. 5 is a conceptual diagram illustrating example components of and processing that may be performed by an attribute extraction component of the system, according to embodiments of the present disclosure.

FIG. 5 illustrates example processing that may be performed by the attribute extraction component 170. As illustrated in FIG. 5, and as described herein above, the attribute extraction component 170 may be configured to take as input the natural language data 302, the entity data 305 representing one more entities included in the natural language data 302, and one or more entity image identifier(s) 315 corresponding to entity image data representing the one or more entities, and determine attribute data 505 representing one or more attributes that are associated with and modify the one or more entities in the natural language data 302. In some embodiments, the attribute data 505 may represent both the attribute and the entity that the attribute modifies.

In the context of the attribute extraction component 170, an "attribute" refers to an indicator of how a corresponding entity is to be presented in image data. Example attributes include, but are not limited to, size, color, shape, count (e.g., how many of the corresponding entity are to be presented), etc.

In some embodiments, during processing of the attribute extraction component 170 with respect to a subsequent instance of natural language data 302, the attribute extraction component 170 may, after determining an attribute represented in the natural language data 302, determine whether the attribute has been determined during previous processing of the attribute extraction component 170. For example, the attribute extraction component 170 may compare the received entity data 305 with attribute data 505 stored in the content generation storage 195 as being associated with the current request for content. If the attribute extraction component 170 determines that an entity included in the entity data 305 is associated with a previously determined attribute, then the attribute extraction component 170 may associate the previously determined attribute with the entity once again. For example, if the attribute extraction component 170 previously determined that a "comet" entity was associated with the attribute "blue," and the current natural language data 302 does not include an additional attribute for the "comet" entity, then the attribute extraction component 170 may associate a current instance of the same "comet" entity with the attribute "blue" as well.

In some embodiments, the attribute extraction component 170 may be configured to change/update previously determined attribute data 505, based on the current natural language data 302 modifying the corresponding attribute. For example, if a previous instance of natural language data 302 was "the astronaut built a red spaceship," where the "spaceship" entity is associated with the attribute "red," and the current instance of natural language data 302 is "the astronaut decided to paint the spaceship white," then the attribute extraction component 170 may determine that the previously determined attribute "red" associated with the "spaceship" entity, is to be changed/updated to "white" for the current instance of natural language data 302.

In some embodiments, after determining the attribute data 505, the attribute extraction component 170 may send the attribute data 505 to the content generation storage 195 to be stored in association with the current request for content (e.g., using a content request identifier corresponding to the current request for content). In other embodiments, the attribute extraction component 170 may send the attribute data 505 to an attribute storage (not illustrated) including one or more instances of attribute data 505 determined for the current request for content.

The attribute extraction component 170 may be configured to determine the attribute data 505 using a trained ML model. For example, the ML model may be trained using training data pairs, where each pair includes natural language text or tokens corresponding to at least a portion (e.g., a sentence) of content (e.g., a narrative, system-generated response, etc.) and natural language text or tokens corresponding to one or more entities included in the portion of content, and output a representation of one or more dependencies included in the portion of content. In some embodiments, the representation may be a graphical representation. The attribute extraction component 170 may then be configured to determine dependencies (i.e., attributes) that modify the one or more entities (and, optionally, the entities that are modified by the dependencies). In some embodiments, the output of the ML model may be the dependencies (i.e., attributes).

In some embodiments, the attribute extraction component 170 may be configured to take as input, rather than generate, the representation of one or more dependencies included in the natural language data 302. For example, the visual content generation component 150 may include the ML model configured to generate the foregoing representation of one or more dependencies, and may send the output of the ML model to the attribute extraction component 170 for processing as described above.

Figure 6:
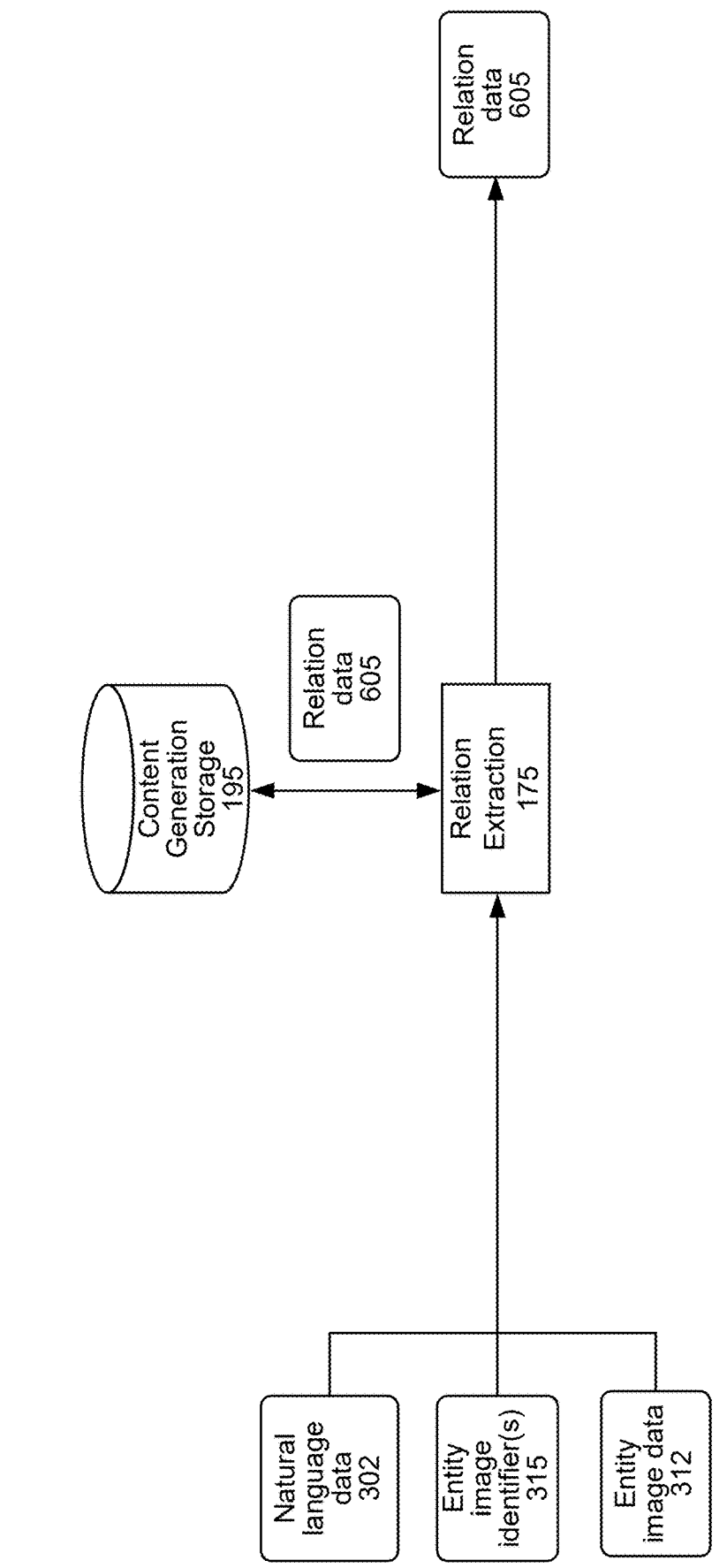
FIG. 6 is a conceptual diagram illustrating example components of and processing that may be performed by a relation extraction component of the system, according to embodiments of the present disclosure.

FIG. 6 illustrates example processing that may be performed by the relation extraction component 175. As illustrated in FIG. 6, and as described herein above, the relation extraction component 175 may be configured to take as input the natural language data 302, the entity data 305 representing one more entities included in the natural language data 302, one or more entity image identifier(s) 315 corresponding to entity image data representing the one or more entities, and, optionally, the one or more instances of entity image data 312 corresponding to the one or more entity image identifier(s) 315, and determine relation data 605 representing a hierarchical (e.g., spatial) relationship between two or more entities included in the natural language data 302. In some embodiments, the relation data 605 may represent both the relation (e.g., "contains," "holding," "left of," "behind," "within," etc.) and the entities that the relation corresponds to (e.g., "pirate" and "treasure map"). In some instances, the relation data 605 may correspond to a formatted representation of the relation (e.g., Javascript Object Notation (JSON)).

In some embodiments, during processing of the relation extraction component 175 with respect to a subsequent instance of natural language data 302, the relation extraction component 175 may, after determining a relation represented in the natural language data 302, determine whether the relation has been determined during previous processing of the relation extraction component 175. For example, the relation extraction component 175 may compare the determined relation with relation data 605 stored in the content generation storage 195, and associated with the current request for content. If the relation extraction component 175 determines that the relation has been previously determined, then the relation extraction component 175 may determine the relation data 605 for the current natural language data 302 to be the same as the relation data 605 stored in the content generation storage 195.

In some embodiments, the relation extraction component 175 may be configured to change/update previously determine relation data 605, based on the current natural language data 302 modifying the corresponding relation. For example, if a previous instance of natural language data 302 was "the pirate sailed the ocean on a pirate ship," where there is a relation of "contains" corresponding to the "pirate" entity and the "ship" entity, and the current instance of natural language data 302 is "the pirate decided to dock the ship and take a stroll on the beach," then the relation extraction component 175 may determine that the previously determined "contains" relation is to be changed/updated to no longer apply to the "pirate" and "spaceship" entities for the current instance of natural language data 302.

In some embodiments, after determining the relation data 605, the relation extraction component 175 may send the relation data 605 to the content generation storage 195 to be stored in association with the current request for content (e.g., using a request identifier corresponding to the current request for content). In other embodiments, the relation extraction component 175 may send the relation data 605 to a relation storage (not illustrated), which may include one or more instances of relation data 605 associated with the current request for content.

The relation extraction component 175 may be configured to generate the relation data 605 using a trained ML model. For example, the ML model may be trained using training data pairs, where each pair includes natural language text or tokens corresponding to at least a portion (e.g., a sentence) of content (e.g., a narrative, system-generated response, etc.) and natural language text or tokens corresponding to two or more entities included in the portion of content, and output a representation of one or more dependencies included in the content. In some embodiments, the representation may be a graphical representation. The relation extraction component 175 may then be configured to determine dependencies (i.e., spatial relations) which represent a relationship between the two or more entities. In some embodiments, the output of the ML model may the dependencies (i.e., the spatial relations).

In some embodiments, the relation extraction component 175 may be configured to take as input, rather than generate, the representation of one or more dependencies included in the natural language data 302. For example, the visual content generation component 150 may include the ML model configured to generate the foregoing representation of one or more dependencies, and may send the output of the ML model to the relation extraction component 175 for processing as described above.

Figure 7:
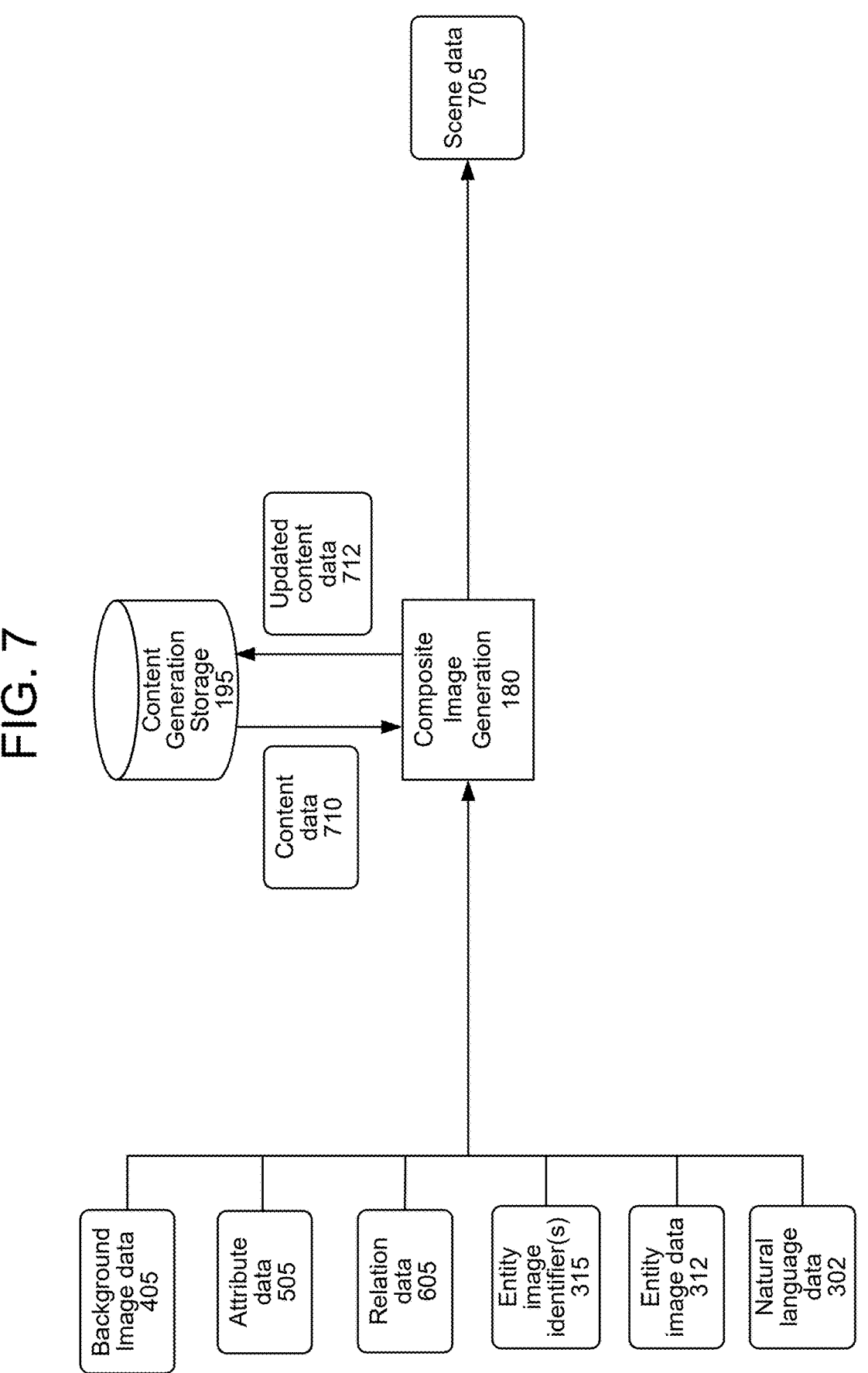
FIG. 7 is a conceptual diagram illustrating example components of and processing that may be performed by a composite image generation component of the system, according to embodiments of the present disclosure.

FIG. 7 illustrates example processing that may be performed by the composite image generation component 180. As illustrated in FIG. 7, and as discussed herein above, the composite image generation component 180 may be configured to take as input the background image data 405, the attribute data 505, the relation data 605, the entity image identifier(s) 315, the entity image data 312, and/or the natural language data 302, and may generate scene data 705 representing the natural language data 302. In some embodiments, the composite image generation component 180 may not receive the entity image data 312, in which case the composite image generation component 180 may be configured to use the entity image identifier(s) 315 to determine the entity image data 312 in the entity image storage 310.

The scene data 705 may correspond to and/or represent visual content that represents the natural language data 302. As such, the scene data 705 may represent and/or include the background image data 405, the attribute data 505, the relation data 605, the entity image identifier(s) 315, the entity image data 312, and/or the natural language data 302. For example, the scene data 705 may be image data including the background image data 405 and the entity image data 312, and optionally the natural language data 302, where an instance of entity image data 312 is positioned at a particular location of the scene data 705, with respect to the background image data 405 and other instance(s) entity image data 312, based on the relation data 605, and/or where the entity image data 312 is presented according to the attribute data 505 (e.g., a size, a color, etc.). For further example, the scene data 705 may be a formatted representation (e.g., JSON) representing how image data including the background image data 405 and the entity image data 312, and optionally the natural language data 302, is to be rendered, based on the relation data 605 and/or the attribute data 505 (as the relation data 605 and the attribute data 505 may not both be generated in every instance). In some embodiments, the composite image generation component 180 may generate scene data 705 to include the image data representing the natural language data 302, as well as data indicating how the image data is to be rendered.

In some embodiments, the composite image generation component 180 may be configured to generate scene data 705 which includes or represents image data representing one or more additional entities that were not explicitly referenced in the natural language data 302. The composite image generation component 180 may generate the scene data 705 to represent the additional entities based on, at least, the background image data 405 and/or the one or more entities represented by the entity data 305, the entity image data 312, and/or the entity image identifier(s) 315. The additional entities may correspond to entities that further represent the natural language data 302. For example, if the natural language data 302 is a (portion of a) narrative taking place in the ocean, then the composite image generation component 180 may determine a "fish" entity and associated image data, even if "fish" is not explicitly represented in the natural language data 302. For further example, similarly, if the background image data 405 represents an "ocean," then the composite image generation component 180 may determine the "fish" entity and associated image data. For further example, the additional "fish" entity of the above example may be determined based on it being associated with a determined "mermaid" entity represented in the natural language data 302. In some embodiments, the composite image generation component 180 may determine the additional entity using a knowledge graph of associated entities. For example, the knowledge graph may represent the entity "ocean," as well as one or more entities associated with the entity "ocean." Therefore, the entity extraction component 160 may use the knowledge graph to determine that, for the background image data representing an "ocean," or the entity "mermaid," that an additional entity of "fish" could also be included.

In some embodiments, generating the scene data 705 may include the composite image generation component 180 determining a placement for each instance of image data (e.g., the entity image data 312 and/or the image data representing the additional entities), with respect to the background image data 405, when the corresponding image data is rendered. The composite image generation component 180 may determine the place for an instance of entity image data 312 based on the relation data 605. For example, if the relation data 605 represents that the entity "ship" contains the entity "pirate," then the composite image generation component 180 may determine that the entity image data 312 representing the "pirate" is to be placed (e.g., located at when presented) above or on top of the entity image data 312 representing the "ship." Further, the composite image generation component 180 may be configured to determine the place for an instance of entity image data 312 based on the background image data 405. For example, if the background image data 405 represents a "forest," and an instance of entity image data 312 (or the image data representing the additional entities) represents a "bird," then the composite image generation component 180 may determine that the image data representing the "bird" is to be place on or above a portion of the background image data 405 that represents a tree (or at a location/height of the background image data 405 that a tree would be expected to be located, based on the background image data 405 representing a "forest").

The composite image generation component 180 may be configured to generate the scene data 705 using a trained ML model. The ML model may be trained using input natural language text or tokens corresponding to at least a portion (e.g., a sentence) of content (e.g., a narrative, system-generated response, etc.), image data representing a background image, image data representing one or more entities, one or more attributes which modify the one or more entities, and a representation of one or more hierarchical (or spatial) relationships between two or more entities, and be tasked with generating image data representing the background image data and the one or more entities, where the background image data and/or the one or more entities are located at a position(s), and displayed in such a way, based on the attribute(s) and relationship(s). In some embodiments, the ML model may be a Text2Scene model.

In some embodiments, the visual content generation component 150 may be configured to record data determined/generated during visual content generation. For example, the visual content generation component 150 may include the content generation storage 195, which may include content data 710 representing various data determined/generated during processing of the visual content generation component 150. For example, the content generation storage 195 may include background image data 405, attribute data 505, relation data 605, entity image identifier(s) 315, entity image data 312, and/or natural language data 302 associated with an instance of visual content generation. For further example, the content generation storage 195 may include a count representing the number of times a particular portion of the aforementioned data was represented in scene data 705 during the visual content generation. In such an example, the content generation storage 195 may include content data 710 that represents the entity "Princess Pink" has been represented in scene data 705 "3" times (e.g., <Princess_Pink>: 3, or the like).

In some embodiments, the composite image generation component 180 may be configured to determine the scene data 705 based on scene data 705 generated during a previous iteration of processing with respect to a previous portion of natural language data 302 corresponding to the instant request for content (e.g., the instant request to output a narrative). The composite image generation component 180 may receive the content data 710 from the content generation storage 195 prior to generating the scene data 705. For example, the composite image generation component 180 may query the content generation storage 195 for content data 710 associated with a unique content request identifier corresponding to the current request for content. The composite image generation component 180 may use the content data 710 to further determine a placement for an instance of entity image data 312 with respect to the background image data 405. For example, if the content data 710 represents that an entity represented by an instance of entity image data 312 has not previously been represented in scene data 705, then the composite image generation component 180 may determine that the placement of the instance of entity image data 312 should be such that focus will be provided to the entity image data 312 when the scene data 705 is rendered (e.g., the place of the entity image data 312 should be placed at the center of the background image data 405 when the scene data 705 is rendered, the entity image data 312 should be displayed as larger than other instances of entity image data in the same scene data 705, etc.). For further example, if the content data 710 represents that an entity represented by an instance of entity image data 312 has previously been represented in scene data 705, then the composite image generation component 180 may determine that the placement of the instance of entity image data 312 should be such that focus is not provided (or at least not entirely provided) to the entity image data 312 when the scene data 705 is rendered (e.g., the placement of the entity image data 312 should be off-centered with respect to the background image data 405 when the scene data 705 is rendered, the entity image data 312 should be displayed as smaller than other instances of entity image data in the same scene data 705, etc.).

After using the content data 710 to determine the scene data 705, the composite image generation component 180 may determine updated content data 712 representing the content data 710 with incremented counts corresponding to data included in the scene data 705. For example, if the content data 710 indicated that a "princess" entity had been represented in three instances of scene data 705, and the composite image generation component 180 generates new scene data 705 including the "princess" entity and a new "knight" entity, then the updated content data 712 may indicate the "princess" entity has been presented four times and the "knight" entity has been presented once. The composite image generation component 180 may send the updated content data 712 to the content generation storage 195 to be stored in association with the current request for content (e.g., using a content request identifier unique to the current request for content).

In some embodiments, the visual content generation component 150 may include/correspond to one or more neural networks. For example, one or more of the abovementioned components (e.g., entity extraction component 160, background image component 165, attribute extraction component 170, relation extraction component 175, and/or the composite image generation component 180) may correspond to one or more nodes or one or more hidden layers of the one or more neural networks. In other embodiments, one or more of the abovementioned components (e.g., entity extraction component 160, background image component 165, attribute extraction component 170, relation extraction component 175, and/or the composite image generation component 180) may implement one or more ML models, and may operate/process, as discussed herein, independent of one or more of the other abovementioned components. In either embodiment, the one or more abovementioned components may be auto-regressive, such that generation of a current instance of scene data 705 may be based on generation of a previous instance of scene data 705. As such, a component of the visual content generation component 150 (e.g., the background image component 165, the attribute extraction component 170, the relation extraction component 175, and/or the composite image generation component 180) may make a determination (e.g., determine/generate background image data, an attribute, spatial relation, image data, etc.) with respect to a current instance of natural language data 302, based on processing of the component (or another component of the visual content generation component 150) performed with respect to a previous instance of natural language data 302 corresponding to the same request for content.

In some embodiments, after output of at least one instance of visual content data 190 (e.g., corresponding to the output of the video generation component 185 or the composite image generation component 180), the system 100 may be configured to generate output audio data (e.g., using the TTS component 880) prompting the user 105 for additional input associated with the visual content data 190, where the additional input may be used to assist in generation of further visual content data 190. For example, if the visual content data 190 represents a knight entering a forest, the output audio data may represent "the knight comes across a fork in the path, should he go left or right?" The system 100 may use the additional input, responsive to the output audio data, to influence subsequent content generation. For example, if the additional input from the user 105 represents "left," the system 100 may process as described herein above to generate natural language data 145 based on the additional input. Further the visual content generation component 150 may process, as described herein above, to generate visual content data 190 based on the foregoing natural language data 145 and the previous visual content data 190 (or data associated with the processing performed to generate the previous visual content data 190).

In some embodiments as described herein below with respect to FIGS. 8 and 9, a skill component 890/990, or skill system component(s) 125, may generate natural language data 145 responsive to a user input. For example, the user 105 may request output of the weather forecast, and the skill component 890/990, or skill system component(s) 125, may determine natural language data 145 representing the weather forecast (e.g., "the weather in New York City today is sunny with a bit of wind"). The system component(s) 120 may send the natural language data 145, generated by the skill component 890/990 or skill system component(s) 125, to the visual content generation component 150, which may process as described herein above.

Figure 8:
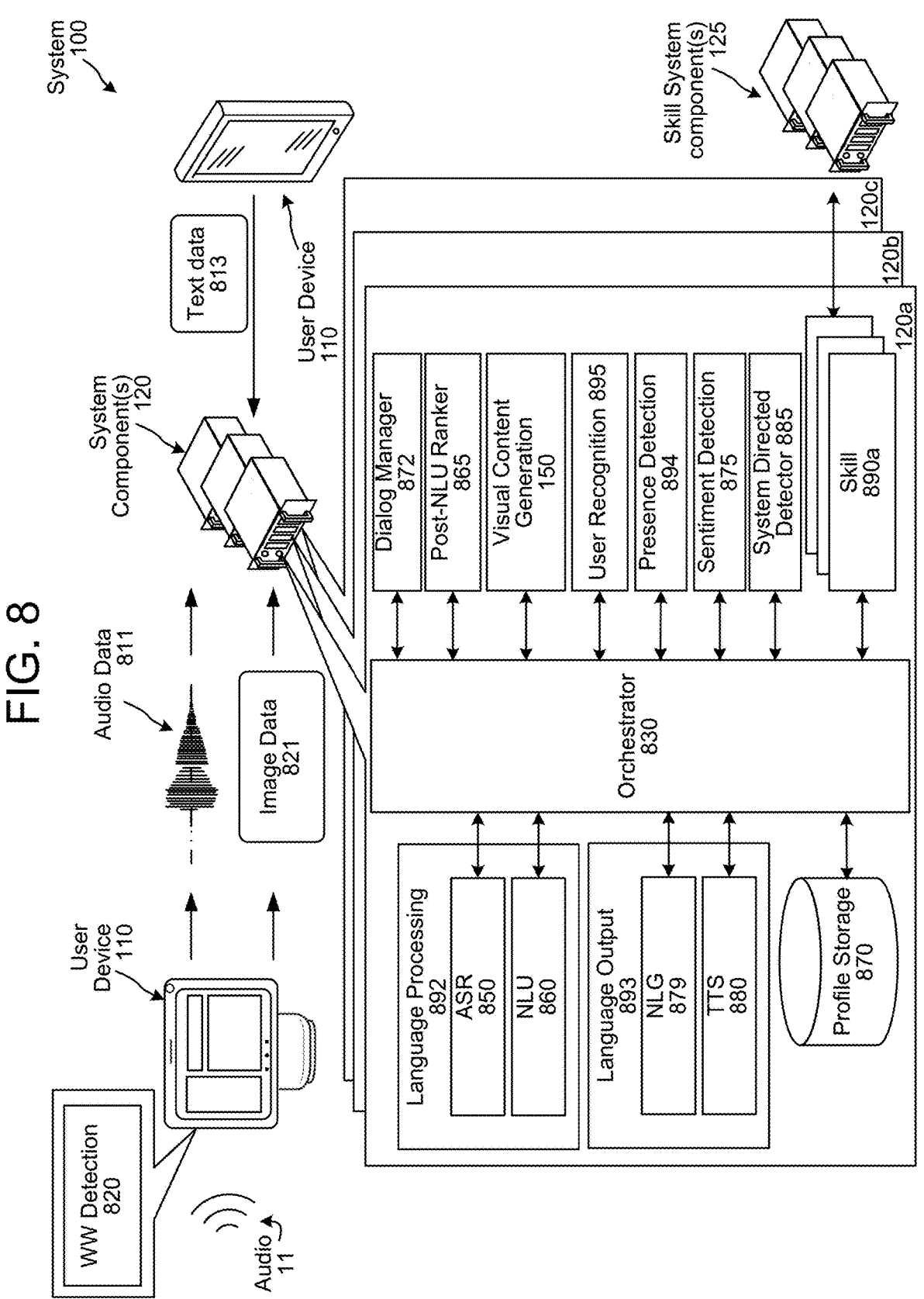
FIG. 8 is a conceptual diagram of components of the system, according to embodiments of the present disclosure.
Figure 9:
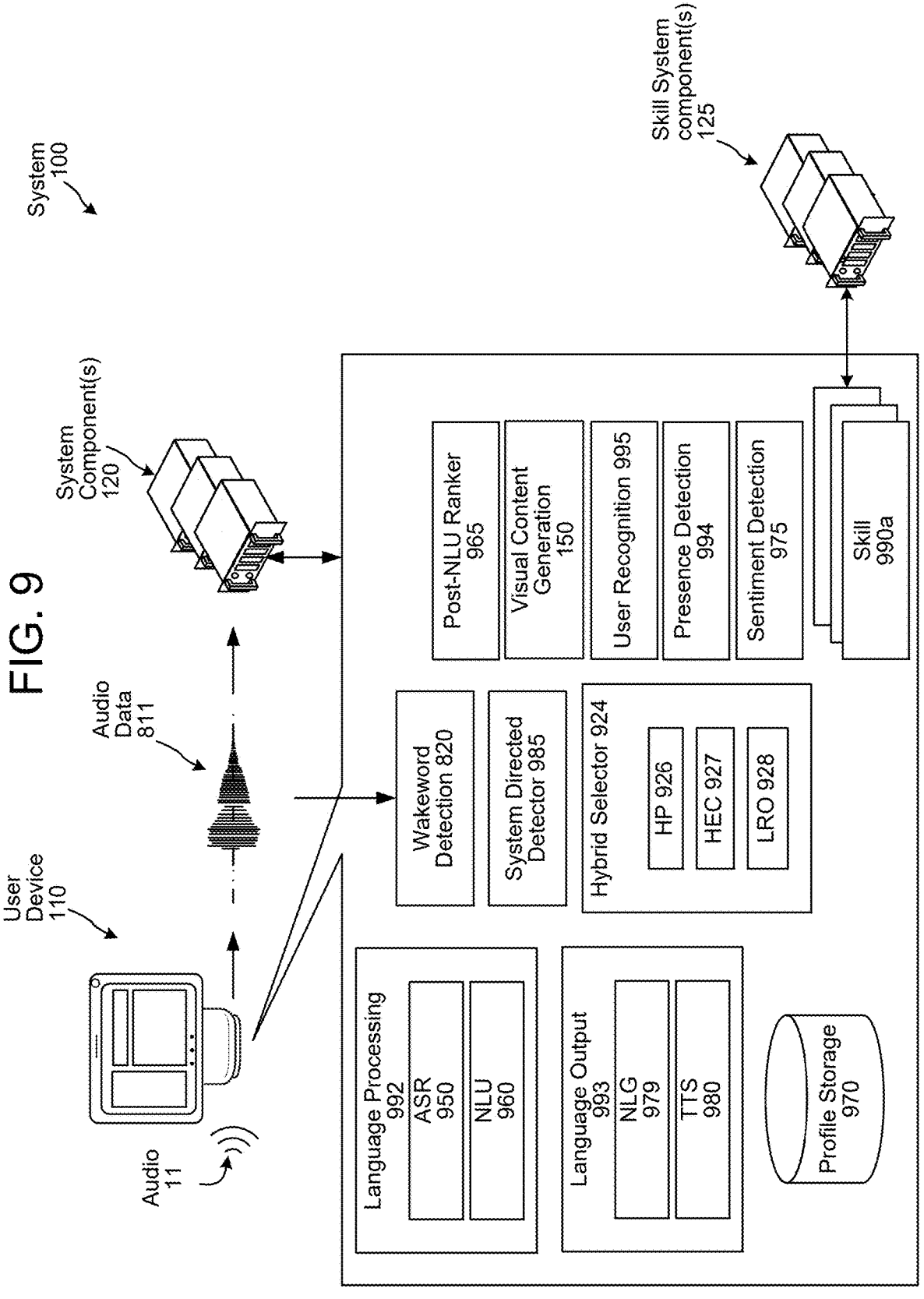
FIG. 9 is a conceptual diagram illustrating components that may be included in a device, according to embodiments of the present disclosure.

The system 100 may operate using various components as described in FIG. 8. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 820. The wakeword detection component 820 may be configured to detect various wakewords. In at least some examples, each wakeword may correspond to a name of a different digital assistant. An example wakeword/digital assistant name is "Alexa." In another example, input to the system may be in form of text data 813, for example as a result of a user typing an input into a user interface of user device 110. Other input forms may include indication that the user has pressed a physical or virtual button on user device 110, the user has made a gesture, etc. The user device 110 may also capture images using camera(s) 1318 of the user device 110 and may send image data 821 representing those image(s) to the system component(s) 120. The image data 821 may include raw image data or image data processed by the user device 110 before sending to the system component(s) 120. The image data 821 may be used in various manners by different components of the system to perform operations such as determining whether a user is directing an utterance to the system, interpreting a user command, responding to a user command, etc.

The wakeword detection component 820 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context data, either by stacking frames within a context window for DNN, or using RNN. Followon posterior threshold tuning or smoothing is applied for decision making. Other techniques for wakeword detection, such as those known in the art, may also be used.

Once the wakeword is detected by the wakeword detection component 820 and/or input is detected by an input detector, the user device 110 may "wake" and begin transmitting audio data 811, representing the audio 11, to the system component(s) 120. The audio data 811 may include data corresponding to the wakeword; in other embodiments, the portion of the audio corresponding to the wakeword is removed by the user device 110 prior to sending the audio data 811 to the system component(s) 120. In the case of touch input detection or gesture based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 820 may result in sending audio data to system component(s) 120*a* for processing while detection of the wakeword "Computer" by the wakeword detector may result in sending audio data to system component(s) 120*b* for processing. The system may have a separate wakeword and system for different skills/systems (e.g., "Dungeon Master" for a game play skill/system component(s) 120*c*) and/or such skills/systems may be coordinated by one or more skill(s) 890 of one or more system component(s) 120.

The user device 110 may also include a system directed input detector 985. (The system component(s) 120 may also include a system directed input detector 885 which may operate in a manner similar to system directed input detector 985.) The system directed input detector 985 may be configured to determine whether an input to the system (for example speech, a gesture, etc.) is directed to the system or not directed to the system (for example directed to another user, etc.). The system directed input detector 985 may work in conjunction with the wakeword detection component 820. If the system directed input detector 985 determines an input is directed to the system, the user device 110 may "wake" and begin sending captured data for further processing (for example, processing audio data using the language processing 892/992, processing captured image data using an image processing component or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 985 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 985 is determining whether an input is potentially device directed. For example, the system may output an orange indicator while considering an input, and may output a green indicator if a system directed input is detected. Other such configurations are possible.

Upon receipt by the system component(s) 120, the audio data 811 may be sent to an orchestrator component 830. The orchestrator component 830 may include memory and logic that enables the orchestrator component 830 to transmit various pieces and forms of data to various components of the system, as well as perform other operations as described herein.

The orchestrator component 830 may send the audio data 811 to a language processing component 892. The language processing component 892 (sometimes also referred to as a spoken language understanding (SLU) component) includes an automatic speech recognition (ASR) component 850 and a natural language understanding (NLU) component 860. The ASR component 850 may transcribe the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., acoustic units such as phonemes, senons, phones, etc.) and sequences of sounds to identify words that match the sequence of sounds of the speech represented in the audio data 811. The ASR component 850 sends the text data generated thereby to an NLU component 860, via, in some embodiments, the orchestrator component 830. The text data sent from the ASR component 850 to the NLU component 860 may include a single top-scoring ASR hypothesis or may include an N-best list including multiple top-scoring ASR hypotheses. An N-best list may additionally include a respective score associated with each ASR hypothesis represented therein. The ASR component 850 is described in greater detail below with regard to FIG. 10.

The language processing component 892 may further include a NLU component 860. The NLU component 860 may receive the text data from the ASR component. The NLU component 860 may attempts to make a semantic interpretation of the phrase(s) or statement(s) represented in the text data input therein by determining one or more meanings associated with the phrase(s) or statement(s) represented in the text data. The NLU component 860 may determine an intent representing an action that a user desires be performed and may determine information that allows a device (e.g., the user device 110, the system component(s) 120, a skill component 890, a skill system component(s) 125, etc.) to execute the intent. For example, if the text data corresponds to "play the 5th Symphony by Beethoven," the NLU component 860 may determine an intent that the system output music and may identify "Beethoven" as an artist/composer and "5th Symphony" as the piece of music to be played. For further example, if the text data corresponds to "what is the weather," the NLU component 860 may determine an intent that the system output weather information associated with a geographic location of the user device 110. In another example, if the text data corresponds to "turn off the lights," the NLU component 860 may determine an intent that the system turn off lights associated with the user device 110 or the user 5. However, if the NLU component 860 is unable to resolve the entity—for example, because the entity is referred to by anaphora such as "this song" or "my next appointment"—the language processing component 892 can send a decode request to another language processing component 892 for information regarding the entity mention and/or other context related to the utterance. The language processing component 892 may augment, correct, or base results data upon the audio data 811 as well as any data received from the other language processing component 892.

The NLU component 860 may return NLU output data 1285/1225 (which may include tagged text data, indicators of intent, etc.) back to the orchestrator component 830. The orchestrator component 830 may forward the NLU results data to a skill component(s) 890. If the NLU results data includes a single NLU hypothesis, the NLU component 860 and the orchestrator component 830 may direct the NLU results data to the skill component(s) 890 associated with the NLU hypothesis. If the NLU output data 1285/1225 includes an N-best list of NLU hypotheses, the NLU component 860 and the orchestrator component 830 may direct the top scoring NLU hypothesis to a skill component(s) 890 associated with the top scoring NLU hypothesis. The system may also include a post-NLU ranker 865 which may incorporate other information to rank potential interpretations determined by the NLU component 860. The local user device 110 may also include its own post-NLU ranker 965, which may operate similarly to the post-NLU ranker 865. The NLU component 860, post-NLU ranker 865 and other components are described in greater detail below with regard to FIGS. 11 and 12.

A skill component may be software running on the system component(s) 120 that is akin to a software application. That is, a skill component 890 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 890. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 890 may operate in conjunction between the system component(s) 120 and other devices, such as the user device 110, in order to complete certain functions. Inputs to a skill component 890 may come from speech processing interactions or through other interactions or input sources. A skill component 890 may include hardware, software, firmware, or the like that may be dedicated to a particular skill component 890 or shared among different skill components 890.

A skill support system(s) 125 may communicate with a skill component(s) 890 within the system component(s) 120 and/or directly with the orchestrator component 830 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 890 dedicated to interacting with the skill support system(s) 125. Unless expressly stated otherwise, reference to a skill, skill device, or skill component may include a skill component 890 operated by the system component(s) 120 and/or skill operated by the skill support system(s) 125. Moreover, the functionality described herein as a skill or skill may be referred to using many different terms, such as an action, bot, app, or the like. The skill component 890 and or skill support system(s) 125 may return output data to the orchestrator component 830.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 872 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 872 may associate a dialog session identifier with the dialog upon identifying that the user is engaging in a dialog with the user. The dialog manager component 872 may track a user input and the corresponding system generated response to the user input as a turn. The dialog session identifier may correspond to multiple turns of user input and corresponding system generated response. The dialog manager component 872 may transmit data identified by the dialog session identifier directly to the orchestrator component 830 or other component. Depending on system configuration the dialog manager component 872 may determine the appropriate system generated response to give to a particular utterance or user input of a turn. Or creation of the system generated response may be managed by another component of the system (e.g., the language output component 893, NLG 879, orchestrator component 830, etc.) while the dialog manager component 872 selects the appropriate responses. Alternatively, another component of the system component(s) 120 may select responses using techniques discussed herein. The text of a system generated response may be sent to a TTS component 880 for creation of audio data corresponding to the response. The audio data may then be sent to a device (e.g., user device 110) for ultimate output to the user. Alternatively (or in addition) a dialog response may be returned in text or some other form.

The dialog manager component 872 may receive the ASR hypothesis/hypotheses (i.e., text data) and make a semantic interpretation of the phrase(s) or statement(s) represented therein. That is, the dialog manager component 872 determines one or more meanings associated with the phrase(s) or statement(s) represented in the text data based on words represented in the text data. The dialog manager component 872 determines a goal corresponding to an action that a user desires be performed as well as pieces of the text data that allow a device (e.g., the user device 110, the system component(s) 120, a skill component 890, a skill system component(s) 125, etc.) to execute the intent. If, for example, the text data corresponds to "what is the weather," the dialog manager component 872 may determine that that the system component(s) 120 is to output weather information associated with a geographic location of the user device 110. In another example, if the text data corresponds to "turn off the lights," the dialog manager component 872 may determine that the system component(s) 120 is to turn off lights associated with the device(s) 110 or the user(s) 5.

The dialog manager component 872 may send the results data to one or more skill(s) 890. If the results data includes a single hypothesis, the orchestrator component 830 may send the results data to the skill(s) 890 associated with the hypothesis. If the results data includes an N-best list of hypotheses, the orchestrator component 830 may send the top scoring hypothesis to a skill(s) 890 associated with the top scoring hypothesis.

The system component(s) 120 includes a language output component 893. The language output component 893 includes a natural language generation (NLG) component 879 and a text-to-speech (TTS) component 880. The NLG component 879 can generate text for purposes of TTS output to a user. For example the NLG component 879 may generate text corresponding to instructions corresponding to a particular action for the user to perform. The NLG component 879 may generate appropriate text for various outputs as described herein. The NLG component 879 may include one or more trained models configured to output text appropriate for a particular input. The text output by the NLG component 879 may become input for the TTS component 880 (e.g., output text data discussed below). Alternatively or in addition, the TTS component 880 may receive text data from a skill component 890 or other system component for output.

The NLG component 879 may include a trained model. The NLG component 879 generates text data from dialog data received by the dialog manager component 872 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 880.

The TTS component 880 may generate audio data (e.g., synthesized speech) from text data using one or more different methods. Text data input to the TTS component 880 may come from a skill component 890, the orchestrator component 830, or another component of the system. In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 811 representing the commands to the system component(s) 120 for processing, after which the system component(s) 120 may return output data that can cause the user device 110 to engage its camera.

Upon receipt by the system component(s) 120, image data may be sent to the orchestrator component 830. The orchestrator component 830 may send the image data to an image processing component. The image processing component can perform computer vision functions such as object recognition, modeling, reconstruction, etc. For example, the image processing component may detect a person, face, etc. (which may then be identified using user recognition component 895). The device may also or alternatively include an image processing component which operates similarly to the image processing component of the system component(s) 120.

In some implementations, the image processing component can detect the presence of text in an image. In such implementations, the image processing component can recognize the presence of text, convert the image data to text data, and send the resulting text data via the orchestrator component 830 to the language processing component 892 for processing by the NLU component 860.

The system component(s) 120 may include a user recognition component 895 that recognizes one or more users using a variety of data. However, the disclosure is not limited thereto, and the user device 110 may include a user recognition component 995 instead of and/or in addition to user recognition component 895 of the system component(s) 120 without departing from the disclosure. User recognition component 995 operates similarly to user recognition component 895.

The user recognition component 895 may take as input the audio data 811 and/or text data output by the ASR component 850. The user recognition component 895 may perform user recognition by comparing audio characteristics in the audio data 811 to stored audio characteristics of users. The user recognition component 895 may also perform user recognition by comparing biometric data (e.g., fingerprint data, iris data, etc.), received by the system in correlation with the present user input, to stored biometric data of users assuming user permission and previous authorization. The user recognition component 895 may further perform user recognition by comparing image data (e.g., including a representation of at least a feature of a user), received by the system in correlation with the present user input, with stored image data including representations of features of different users. The user recognition component 895 may perform additional user recognition processes, including those known in the art.

The user recognition component 895 determines scores indicating whether user input originated from a particular user. For example, a first score may indicate a likelihood that the user input originated from a first user, a second score may indicate a likelihood that the user input originated from a second user, etc. The user recognition component 895 also determines an overall confidence regarding the accuracy of user recognition operations.

Output of the user recognition component 895 may include a single user identifier corresponding to the most likely user that originated the user input. Alternatively, output of the user recognition component 895 may include an N-best list of user identifiers with respective scores indicating likelihoods of respective users originating the user input. The output of the user recognition component 895 may be used to inform NLU processing as well as processing performed by other components of the system.

The system component(s) 120/user device 110 may include a presence detection component 894/994 that determines the presence and/or location of one or more users using a variety of data.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 870 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 875 that may be configured to detect a sentiment of a user from audio data representing speech/utterances from the user, image data representing an image of the user, and/or the like. The sentiment detection component 875 may be included in system component(s) 120, as illustrated in FIG. 8, although the disclosure is not limited thereto and the sentiment detection component 875 may be included in other components without departing from the disclosure. For example the sentiment detection component 975 may be included in the user device 110, as a separate component, etc. Sentiment detection component 975 may operate similarly to sentiment detection component 875. The system component(s) 120 may use the sentiment detection component 875 to, for example, customize a response for a user based on an indication that the user is happy or frustrated.

Although the components of FIG. 8 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 9 illustrates such a configured user device 110.

In at least some embodiments, the system component(s) 120 may receive the audio data 811 from the user device 110, to recognize speech corresponding to a spoken input in the received audio data 811, and to perform functions in response to the recognized speech. In at least some embodiments, these functions involve sending directives (e.g., commands), from the system component(s) 120 to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 980) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 8, the user device 110 may include a wakeword detection component 820 configured to compare the audio data 811 to stored models used to detect a wakeword (e.g., "Alexa") that indicates to the user device 110 that the audio data 811 is to be processed for determining NLU output data (e.g., slot data that corresponds to a named entity, label data, and/or intent data, etc.). In at least some embodiments, a hybrid selector 924, of the user device 110, may send the audio data 811 to the wakeword detection component 820. If the wakeword detection component 820 detects a wakeword in the audio data 811, the wakeword detection component 820 may send an indication of such detection to the hybrid selector 924. In response to receiving the indication, the hybrid selector 924 may send the audio data 811 to the system component(s) 120 and/or the ASR component 950. The wakeword detection component 820 may also send an indication, to the hybrid selector 924, representing a wakeword was not detected. In response to receiving such an indication, the hybrid selector 924 may refrain from sending the audio data 811 to the system component(s) 120, and may prevent the ASR component 950 from further processing the audio data 811. In this situation, the audio data 811 can be discarded.

The user device 110 may conduct its own speech processing using on-device language processing components, such as an SLU/language processing component 992 (which may include an ASR component 950 and an NLU component 960), similar to the manner discussed herein with respect to the SLU component 892 (or ASR component 850 and the NLU component 860) of the system component(s) 120. Language processing component 992 may operate similarly to language processing component 892, ASR component 950 may operate similarly to ASR component 850 and NLU component 960 may operate similarly to NLU component 860. The user device 110 may also internally include, or otherwise have access to, other components such as one or more skill components 990 capable of executing commands based on NLU output data or other results determined by the user device 110/system component(s) 120 (which may operate similarly to skill components 890), a user recognition component 995 (configured to process in a similar manner to that discussed herein with respect to the user recognition component 895 of the system component(s) 120), profile storage 970 (configured to store similar profile data to that discussed herein with respect to the profile storage 870 of the system component(s) 120), or other components. In at least some embodiments, the profile storage 970 may only store profile data for a user or group of users specifically associated with the user device 110. Similar to as described above with respect to skill component 890, a skill component 990 may communicate with a skill system component(s) 125. The user device 110 may also have its own language output component 993 which may include NLG component 979 and TTS component 980. Language output component 993 may operate similarly to language output component 893, NLG component 979 may operate similarly to NLG component 879 and TTS component 980 may operate similarly to TTS component 880.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 924, of the user device 110, may include a hybrid proxy (HP) 926 configured to proxy traffic to/from the system component(s) 120. For example, the HP 926 may be configured to send messages to/from a hybrid execution controller (HEC) 927 of the hybrid selector 924. For example, command/directive data received from the system component(s) 120 can be sent to the HEC 927 using the HP 926. The HP 926 may also be configured to allow the audio data 811 to pass to the system component(s) 120 while also receiving (e.g., intercepting) this audio data 811 and sending the audio data 811 to the HEC 927.

In at least some embodiments, the hybrid selector 924 may further include a local request orchestrator (LRO) 928 configured to notify the ASR component 950 about the availability of new audio data 811 that represents user speech, and to otherwise initiate the operations of local language processing when new audio data 811 becomes available. In general, the hybrid selector 924 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 811 is received, the HP 926 may allow the audio data 811 to pass through to the system component(s) 120 and the HP 926 may also input the audio data 811 to the on-device ASR component 950 by routing the audio data 811 through the HEC 927 of the hybrid selector 924, whereby the LRO 928 notifies the ASR component 950 of the audio data 811. At this point, the hybrid selector 924 may wait for response data from either or both of the system component(s) 120 or the local language processing components. However, the disclosure is not limited thereto, and in some examples the hybrid selector 924 may send the audio data 811 only to the local ASR component 950 without departing from the disclosure. For example, the user device 110 may process the audio data 811 locally without sending the audio data 811 to the system component(s) 120.

The local ASR component 950 is configured to receive the audio data 811 from the hybrid selector 924, and to recognize speech in the audio data 811, and the local NLU component 960 is configured to determine a user intent from the recognized speech, and to determine how to act on the user intent by generating NLU output data which may include directive data (e.g., instructing a component to perform an action). Such NLU output data may take a form similar to that as determined by the NLU component 860 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 960) may be selected as usable to respond to a natural language user input, and local response data may be sent (e.g., local NLU output data, local knowledge base information, internet search results, and/or local directive data) to the hybrid selector 924, such as a "ReadyToExecute" response. The hybrid selector 924 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 5.

The user device 110 and/or the system component(s) 120 may associate a unique identifier with each natural language user input. The user device 110 may include the unique identifier when sending the audio data 811 to the system component(s) 120, and the response data from the system component(s) 120 may include the unique identifier to identify which natural language user input the response data corresponds.

In at least some embodiments, the user device 110 may include, or be configured to use, one or more skill components 990 that may work similarly to the skill component(s) 890 implemented by the system component(s) 120. The skill component(s) 990 may correspond to one or more domains that are used in order to determine how to act on a spoken input in a particular way, such as by outputting a directive that corresponds to the determined intent, and which can be processed to implement the desired operation. The skill component(s) 990 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, skill system component(s) 125 may be located in a remote environment (e.g., separate location) such that the user device 110 may only communicate with the skill system component(s) 125 via the network(s) 199. However, the disclosure is not limited thereto. For example, in at least some embodiments, skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 990, skill system component(s) 125, or a combination of a skill component 990 and a corresponding skill system component(s) 125.

Similar to the manner discussed with regard to FIG. 8, the local user device 110 may be configured to recognize multiple different wakewords and/or perform different categories of tasks depending on the wakeword. Such different wakewords may invoke different processing components of local user device 110 (not illustrated in FIG. 9). For example, detection of the wakeword "Alexa" by the wakeword detection component 820 may result in sending audio data to certain language processing components 992/skill components 990 for processing while detection of the wakeword "Computer" by the wakeword detector may result in sending audio data different language processing components 992/skill components 990 for processing.

Figure 10:
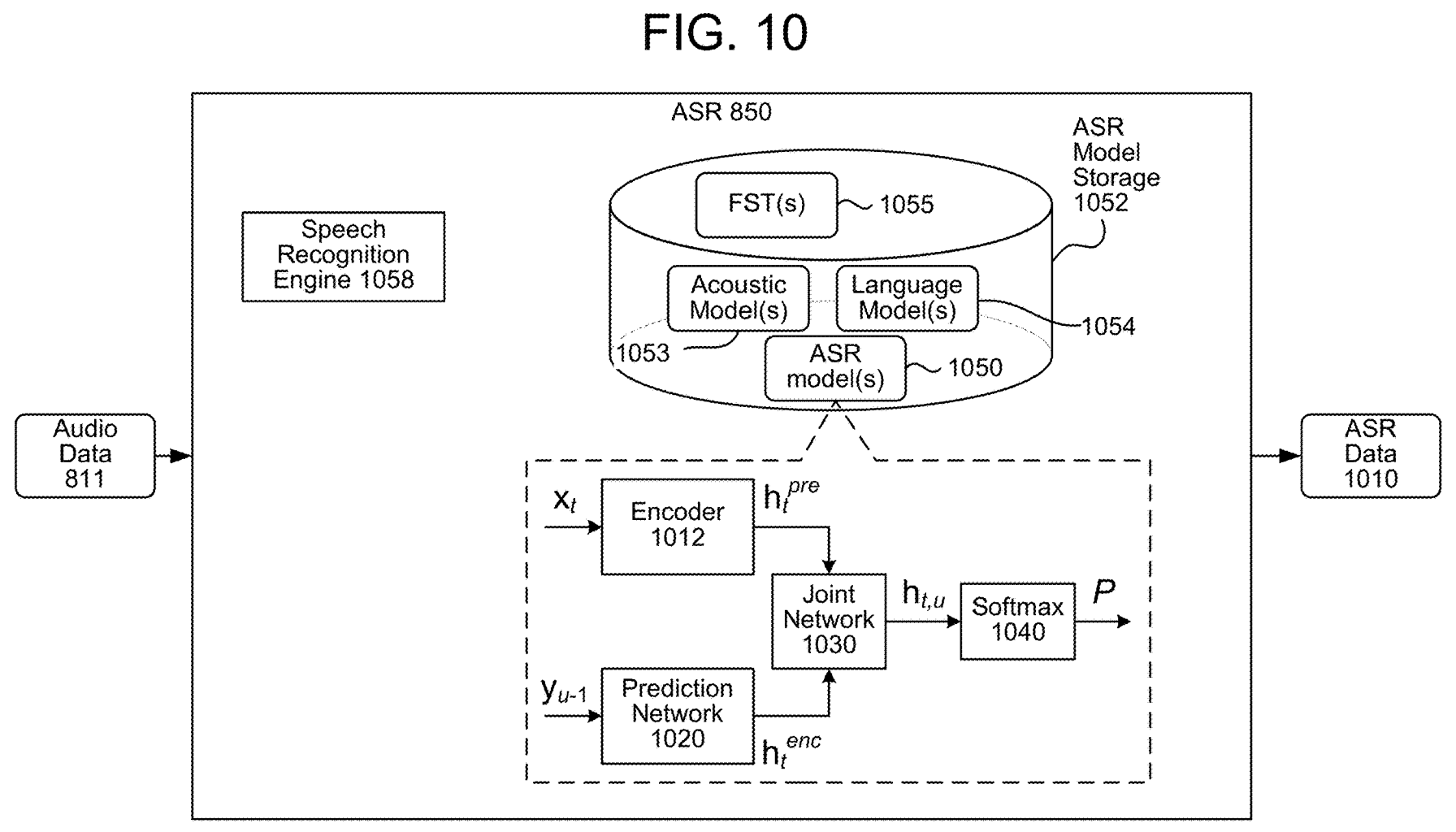

FIG. 10 is a conceptual diagram of an ASR component 850, according to embodiments of the present disclosure. The ASR component 850 may interpret a spoken natural language input based on the similarity between the spoken natural language input and pre-established language models 1054 stored in an ASR model storage 1052. For example, the ASR component 850 may compare the audio data with models for sounds (e.g., subword units or phonemes) and sequences of sounds to identify words that match the sequence of sounds spoken in the natural language input. Alternatively, the ASR component 850 may use a finite state transducer (FST) 1055 to implement the language model functions.

When the ASR component 850 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1053 stored in the ASR model storage 1052), and the likelihood that a particular word, which matches the sounds, would be included in the sentence at the specific location (e.g., using a language or grammar model 1054). Based on the considered factors and the assigned confidence score, the ASR component 850 may output an ASR hypothesis that most likely matches the spoken natural language input, or may output multiple ASR hypotheses in the form of a lattice or an N-best list, with each ASR hypothesis corresponding to a respective score.

The ASR component 850 may include a speech recognition engine 1058. The ASR component 850 receives audio data 811 (for example, received from a local user device 110 having processed audio detected by a microphone by an acoustic front end (AFE) or other component). The speech recognition engine 1058 compares the audio data 811 with acoustic models 1053, language models 1054, FST(s) 1055, and/or other data models and information for recognizing the speech conveyed in the audio data. The audio data 811 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the system component(s) 120 encoded, in which case they may be decoded by the speech recognition engine 1058 and/or prior to processing by the speech recognition engine 1058.

In some implementations, the ASR component 850 may process the audio data 811 using the ASR model 1050. The ASR model 1050 may be, for example, a recurrent neural network such as an RNN-T. An example RNN-T architecture is illustrated in FIG. 10. The ASR model 1050 may predict a probability (y|x) of labels y=(y1, . . . , yu) given acoustic features x=(x1, . . . , xt). During inference, the ASR model 1050 can generate an N-best list using, for example, a beam search decoding algorithm. The ASR model 1050 may include an encoder 1012, a prediction network 1020, a joint network 1030, and a softmax 1040. The encoder 1012 may be similar or analogous to an acoustic model (e.g., similar to the acoustic model 1053 described below), and may process a sequence of acoustic input features to generate encoded hidden representations. The prediction network 1020 may be similar or analogous to a language model (e.g., similar to the language model 1054 described below), and may process the previous output label predictions, and map them to corresponding hidden representations. The joint network 1030 may be, for example, a feed forward neural network (NN) that may process hidden representations from both the encoder 1012 and prediction network 1020, and predict output label probabilities. The softmax 1040 may be a function implemented (e.g., as a layer of the joint network 1030) to normalize the predicted output probabilities.

The speech recognition engine 1058 may process the audio data 811 with reference to information stored in the ASR model storage 1052. Feature vectors of the audio data 811 may arrive at the system component(s) 120 encoded, in which case they may be decoded prior to processing by the speech recognition engine 1058.

The speech recognition engine 1058 attempts to match received feature vectors to language acoustic units (e.g., phonemes) and words as known in the stored acoustic models 1053, language models 8B54, and FST(s) 1055. For example, audio data 811 may be processed by one or more acoustic model(s) 1053 to determine acoustic unit data. The acoustic unit data may include indicators of acoustic units detected in the audio data 811 by the ASR component 850. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 1054 (and/or using FST 1055) to determine ASR data 1010. The ASR data 1010 can include one or more hypotheses. One or more of the hypotheses represented in the ASR data 1010 may then be sent to further components (such as the NLU component 860) for further processing as discussed herein. The ASR data 1010 may include representations of text of an utterance, such as words, subword units, or the like.

The speech recognition engine 1058 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 850 will output ASR hypotheses that make sense grammatically. The specific models used may be general models or may be models corresponding to a particular domain, such as music, banking, etc.

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1058 may use the acoustic model(s) 1053 to attempt to match received audio feature vectors to words or subword acoustic units. An acoustic unit may be a senone, phoneme, phoneme in context, syllable, part of a syllable, syllable in context, or any other such portion of a word. The speech recognition engine 1058 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 850 outputs ASR hypotheses that make sense grammatically.

The speech recognition engine 1058 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1058, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1058 may also compute scores of branches of the paths based on language models or grammars. Language modeling involves determining scores for what words are likely to be used together to form coherent words and sentences. Application of a language model may improve the likelihood that the ASR component 850 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 11:
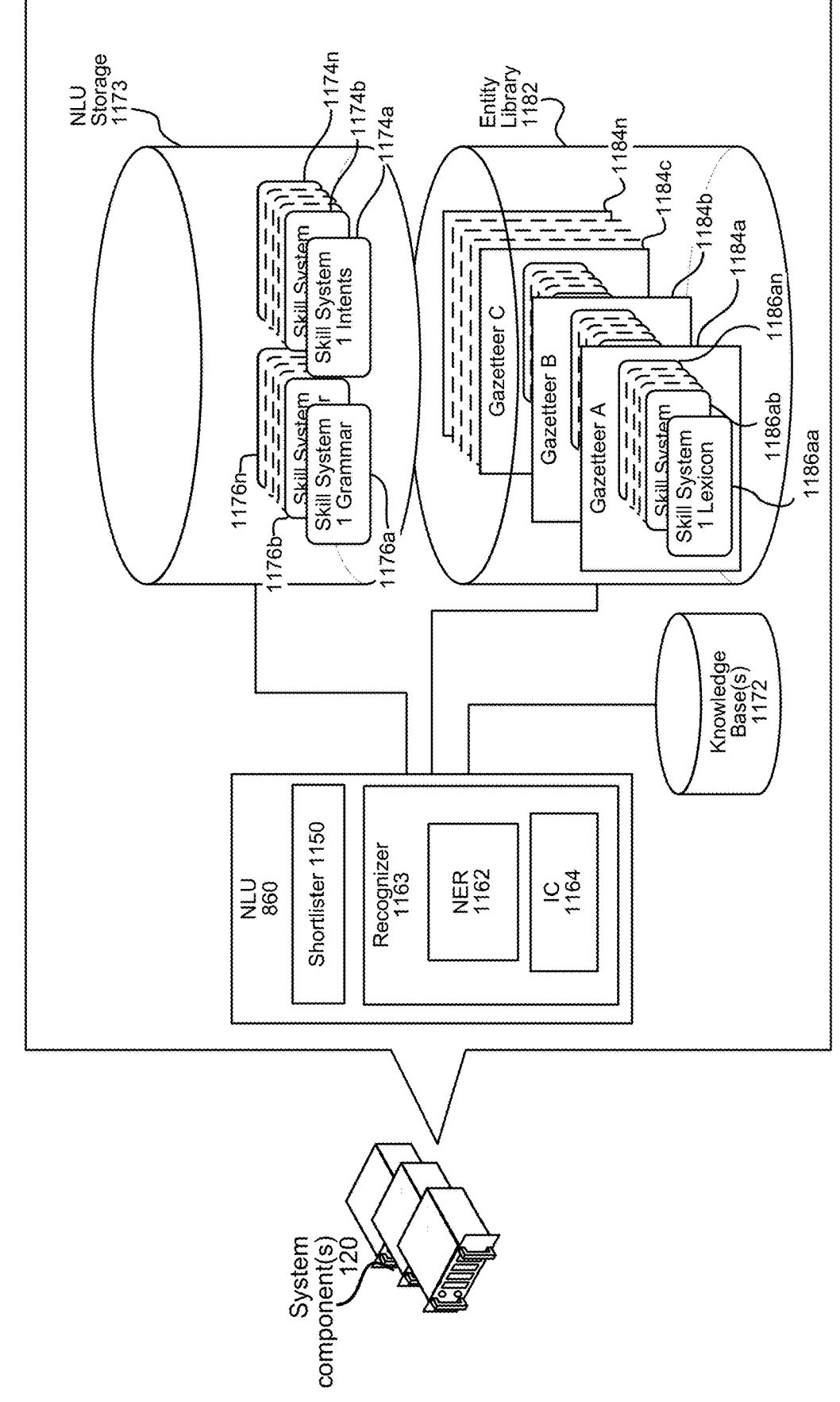
FIG. 11 is a conceptual diagram of how natural language processing is performed, according to embodiments of the present disclosure.
Figure 12:
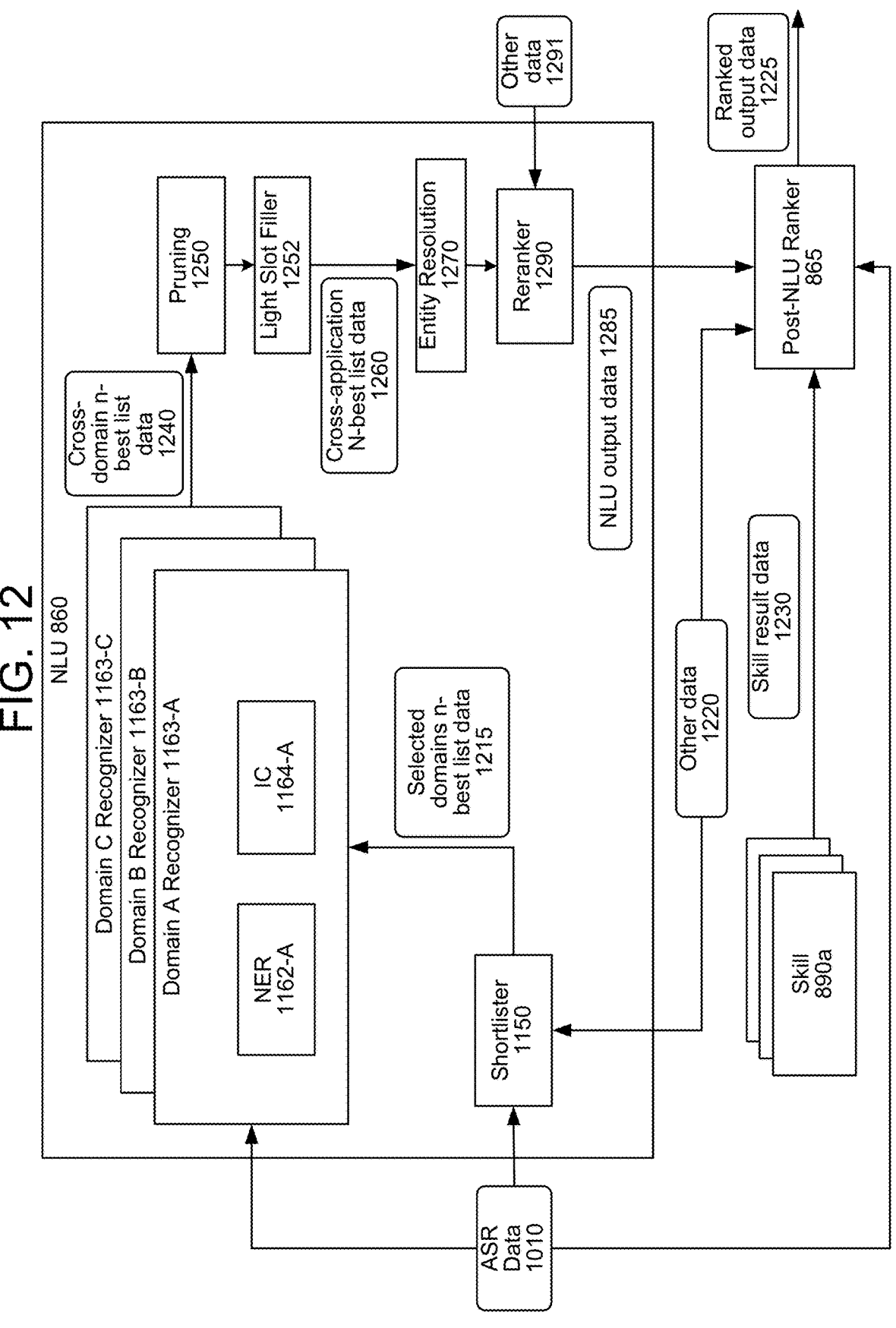
FIG. 12 is a conceptual diagram of how natural language processing is performed, according to embodiments of the present disclosure.

FIGS. 11 and 12 illustrates how the NLU component 860 may perform NLU processing. FIG. 11 is a conceptual diagram of how natural language processing is performed, according to embodiments of the present disclosure. And FIG. 12 is a conceptual diagram of how natural language processing is performed, according to embodiments of the present disclosure.

FIG. 11 illustrates how NLU processing is performed on text data. The NLU component 860 may process text data including several ASR hypotheses of a single user input. For example, if the ASR component 850 outputs text data including an n-best list of ASR hypotheses, the NLU component 860 may process the text data with respect to all (or a portion of) the ASR hypotheses represented therein.

The NLU component 860 may annotate text data by parsing and/or tagging the text data. For example, for the text data "tell me the weather for Seattle," the NLU component 860 may tag "tell me the weather for Seattle" as an <OutputWeather> intent as well as separately tag "Seattle" as a location for the weather information.

The NLU component 860 may include a shortlister component 1150. The shortlister component 1150 selects skills that may execute with respect to ASR output data 1010 input to the NLU component 860 (e.g., applications that may execute with respect to the user input). The ASR output data 1010 (which may also be referred to as ASR data 1010) may include representations of text of an utterance, such as words, subword units, or the like. The shortlister component 1150 thus limits downstream, more resource intensive NLU processes to being performed with respect to skills that may execute with respect to the user input.

Without a shortlister component 1150, the NLU component 860 may process ASR output data 1010 input thereto with respect to every skill of the system, either in parallel, in series, or using some combination thereof. By implementing a shortlister component 1150, the NLU component 860 may process ASR output data 1010 with respect to only the skills that may execute with respect to the user input. This reduces total compute power and latency attributed to NLU processing.

The shortlister component 1150 may include one or more trained models. The model(s) may be trained to recognize various forms of user inputs that may be received by the system component(s) 120. For example, during a training period skill system component(s) 125 associated with a skill may provide the system component(s) 120 with training text data representing sample user inputs that may be provided by a user to invoke the skill. For example, for a ride sharing skill, a skill system component(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 1150 may be trained, using the training text data representing sample user inputs, to determine other potentially related user input structures that users may try to use to invoke the particular skill. During training, the system component(s) 120 may solicit the skill system component(s) 125 associated with the skill regarding whether the determined other user input structures are permissible, from the perspective of the skill system component(s) 125, to be used to invoke the skill. The alternate user input structures may be derived by one or more trained models during model training and/or may be based on user input structures provided by different skills. The skill system component(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1150 may be trained with respect to a different skill. Alternatively, the shortlister component 1150 may use one trained model per domain, such as one trained model for skills associated with a weather domain, one trained model for skills associated with a ride sharing domain, etc.

The system component(s) 120 may use the sample user inputs provided by a skill system component(s) 125, and related sample user inputs potentially determined during training, as binary examples to train a model associated with a skill associated with the skill system component(s) 125. The model associated with the particular skill may then be operated at runtime by the shortlister component 1150. For example, some sample user inputs may be positive examples (e.g., user inputs that may be used to invoke the skill). Other sample user inputs may be negative examples (e.g., user inputs that may not be used to invoke the skill).

As described above, the shortlister component 1150 may include a different trained model for each skill of the system, a different trained model for each domain, or some other combination of trained model(s). For example, the shortlister component 1150 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1150 to output indications of only a portion of the skills that the ASR output data 1010 may relate to. For example, a user input may correspond to "tell me about Tom Collins." If the model is clustered based on domain, the shortlister component 1150 may determine the user input corresponds to a recipe skill (e.g., a drink recipe) even though the user input may also correspond to an information skill (e.g., including information about a person named Tom Collins).

The NLU component 860 may include one or more recognizers 1163. In at least some embodiments, a recognizer 1163 may be associated with skill system component(s) 125 (e.g., the recognizer may be configured to interpret text data to correspond to the skill system component(s) 125). In at least some other examples, a recognizer 1163 may be associated with a domain such as smart home, video, music, weather, custom, etc. (e.g., the recognizer may be configured to interpret text data to correspond to the domain).

If the shortlister component 1150 determines ASR output data 1010 is potentially associated with multiple domains, the recognizers 1163 associated with the domains may process the ASR output data 1010, while recognizers 1163 not indicated in the shortlister component 1150's output may not process the ASR output data 1010. The "shortlisted" recognizers 1163 may process the ASR output data 1010 in parallel, in series, partially in parallel, etc. For example, if ASR output data 1010 potentially relates to both a communications domain and a music domain, a recognizer associated with the communications domain may process the ASR output data 1010 in parallel, or partially in parallel, with a recognizer associated with the music domain processing the ASR output data 1010.

Each recognizer 1163 may include a named entity recognition (NER) component 1162. The NER component 1162 attempts to identify grammars and lexical information that may be used to construe meaning with respect to text data input therein. The NER component 1162 identifies portions of text data that correspond to a named entity associated with a domain, associated with the recognizer 1163 implementing the NER component 1162. The NER component 1162 (or other component of the NLU component 860) may also determine whether a word refers to an entity whose identity is not explicitly mentioned in the text data, for example "him," "her," "it" or other anaphora, exophora, or the like.

Each recognizer 1163, and more specifically each NER component 1162, may be associated with a particular grammar database 1176, a particular set of intents/actions 1174, and a particular personalized lexicon 1186. The grammar databases 1176, and intents/actions 1174 may be stored in an NLU storage 1173. Each gazetteer 1184 may include domain/skill-indexed lexical information associated with a particular user and/or user device 110. For example, a Gazetteer A (1184*a*) includes skill-indexed lexical information 1186*aa* to 1186*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1162 applies grammar information 1176 and lexical information 1186 associated with a domain (associated with the recognizer 1163 implementing the NER component 1162) to determine a mention of one or more entities in text data. In this manner, the NER component 1162 identifies "slots" (each corresponding to one or more particular words in text data) that may be useful for later processing. The NER component 1162 may also label each slot with a type (e.g., noun, place, city, artist name, song name, etc.).

Each grammar database 1176 includes the names of entities (i.e., nouns) commonly found in speech about the particular domain to which the grammar database 1176 relates, whereas the lexical information 1186 is personalized to the user and/or the user device 110 from which the user input originated. For example, a grammar database 1176 associated with a shopping domain may include a database of words commonly used when people discuss shopping.

A downstream process called entity resolution (discussed in detail elsewhere herein) links a slot of text data to a specific entity known to the system. To perform entity resolution, the NLU component 860 may utilize gazetteer information (1184a-1184n) stored in an entity library storage 1182. The gazetteer information 1184 may be used to match text data (representing a portion of the user input) with text data representing known entities, such as song titles, contact names, etc. Gazetteers 1184 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1163 may also include an intent classification (IC) component 1164. An IC component 1164 parses text data to determine an intent(s) (associated with the domain associated with the recognizer 1163 implementing the IC component 1164) that potentially represents the user input. An intent represents to an action a user desires be performed. An IC component 1164 may communicate with a database 1174 of words linked to intents. For example, a music intent database may link words and phrases such as "quiet," "volume off," and "mute" to a <Mute> intent. An IC component 1164 identifies potential intents by comparing words and phrases in text data (representing at least a portion of the user input) to the words and phrases in an intents database 1174 (associated with the domain that is associated with the recognizer 1163 implementing the IC component 1164).

The intents identifiable by a specific IC component 1164 are linked to domain-specific (i.e., the domain associated with the recognizer 1163 implementing the IC component 1164) grammar frameworks 1176 with "slots" to be filled. Each slot of a grammar framework 1176 corresponds to a portion of text data that the system believes corresponds to an entity. For example, a grammar framework 1176 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1176 may not be structured as sentences, but rather based on associating slots with grammatical tags.

For example, an NER component 1162 may parse text data to identify words as subject, object, verb, preposition, etc. based on grammar rules and/or models prior to recognizing named entities in the text data. An IC component 1164 (implemented by the same recognizer 1163 as the NER component 1162) may use the identified verb to identify an intent. The NER component 1162 may then determine a grammar model 1176 associated with the identified intent. For example, a grammar model 1176 for an intent corresponding to <PlayMusic> may specify a list of slots applicable to play the identified "object" and any object modifier (e.g., a prepositional phrase), such as {Artist Name}, {Album Name}, {Song name}, etc. The NER component

1162 may then search corresponding fields in a lexicon 1186 (associated with the domain associated with the recognizer 1163 implementing the NER component 1162), attempting to match words and phrases in text data the NER component 1162 previously tagged as a grammatical object or object modifier with those identified in the lexicon 1186.

An NER component 1162 may perform semantic tagging, which is the labeling of a word or combination of words according to their type/semantic meaning. An NER component 1162 may parse text data using heuristic grammar rules, or a model may be constructed using techniques such as Hidden Markov Models, maximum entropy models, log linear models, conditional random fields (CRF), and the like. For example, an NER component 1162 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1162 identifies "Play" as a verb based on a word database associated with the music domain, which an IC component 1164 (also implemented by the music domain recognizer) may determine corresponds to a <PlayMusic> intent. At this stage, no determination has been made as to the meaning of "mother's little helper" or "the rolling stones," but based on grammar rules and models, the NER component 1162 has determined the text of these phrases relates to the grammatical object (i.e., entity) of the user input represented in the text data.

An NER component 1162 may tag text data to attribute meaning thereto. For example, an NER component 1162 may tag "play mother's little helper by the rolling stones" as: {domain} Music, {intent}<PlayMusic>, {artist name} rolling stones, {media type} SONG, and {song title} mother's little helper. For further example, the NER component 1162 may tag "play songs by the rolling stones" as: {domain} Music, {intent}<PlayMusic>, {artist name} rolling stones, and {media type} SONG.

The shortlister component 1150 may receive ASR output data 1010 output from the ASR component 850 or output from the user device 110b (as illustrated in FIG. 12). The ASR component 850 may embed the ASR output data 1010 into a form processable by a trained model(s) using sentence embedding techniques as known in the art. Sentence embedding results in the ASR output data 1010 including text in a structure that enables the trained models of the shortlister component 1150 to operate on the ASR output data 1010. For example, an embedding of the ASR output data 1010 may be a vector representation of the ASR output data 1010.

The shortlister component 1150 may make binary determinations (e.g., yes or no) regarding which domains relate to the ASR output data 1010. The shortlister component 1150 may make such determinations using the one or more trained models described herein above. If the shortlister component 1150 implements a single trained model for each domain, the shortlister component 1150 may simply run the models that are associated with enabled domains as indicated in a user profile associated with the user device 110 and/or user that originated the user input.

The shortlister component 1150 may generate n-best list data 1215 representing domains that may execute with respect to the user input represented in the ASR output data 1010. The size of the n-best list represented in the n-best list data 1215 is configurable. In an example, the n-best list data 1215 may indicate every domain of the system as well as contain an indication, for each domain, regarding whether the domain is likely capable to execute the user input represented in the ASR output data 1010. In another example, instead of indicating every domain of the system, the n-best list data 1215 may only indicate the domains that are likely to be able to execute the user input represented in the ASR output data 1010. In yet another example, the shortlister component 1150 may implement thresholding such that the n-best list data 1215 may indicate no more than a maximum number of domains that may execute the user input represented in the ASR output data 1010. In an example, the threshold number of domains that may be represented in the n-best list data 1215 is ten. In another example, the domains included in the n-best list data 1215 may be limited by a threshold a score, where only domains indicating a likelihood to handle the user input is above a certain score (as determined by processing the ASR output data 1010 by the shortlister component 1150 relative to such domains) are included in the n-best list data 1215.

The ASR output data 1010 may correspond to more than one ASR hypothesis. When this occurs, the shortlister component 1150 may output a different n-best list (represented in the n-best list data 1215) for each ASR hypothesis. Alternatively, the shortlister component 1150 may output a single n-best list representing the domains that are related to the multiple ASR hypotheses represented in the ASR output data 1010.

As indicated above, the shortlister component 1150 may implement thresholding such that an n-best list output therefrom may include no more than a threshold number of entries. If the ASR output data 1010 includes more than one ASR hypothesis, the n-best list output by the shortlister component 1150 may include no more than a threshold number of entries irrespective of the number of ASR hypotheses output by the ASR component 850. Alternatively or in addition, the n-best list output by the shortlister component 1150 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1010, the shortlister component 1150 may generate confidence scores representing likelihoods that domains relate to the ASR output data 1010. If the shortlister component 1150 implements a different trained model for each domain, the shortlister component 1150 may generate a different confidence score for each individual domain trained model that is run. If the shortlister component 1150 runs the models of every domain when ASR output data 1010 is received, the shortlister component 1150 may generate a different confidence score for each domain of the system. If the shortlister component 1150 runs the models of only the domains that are associated with skills indicated as enabled in a user profile associated with the user device 110 and/or user that originated the user input, the shortlister component 1150 may only generate a different confidence score for each domain associated with at least one enabled skill. If the shortlister component 1150 implements a single trained model with domain specifically trained portions, the shortlister component 1150 may generate a different confidence score for each domain who's specifically trained portion is run. The shortlister component 1150 may perform matrix vector modification to obtain confidence scores for all domains of the system in a single instance of processing of the ASR output data 1010.

N-best list data 1215 including confidence scores that may be output by the shortlister component 1150 may be represented as, for example:

Search domain, 0.67
Recipe domain, 0.62
Information domain, 0.57
Shopping domain, 0.42

As indicated, the confidence scores output by the shortlister component 1150 may be numeric values. The confidence scores output by the shortlister component 1150 may alternatively be binned values (e.g., high, medium, low).

The n-best list may only include entries for domains having a confidence score satisfying (e.g., equaling or exceeding) a minimum threshold confidence score. Alternatively, the shortlister component 1150 may include entries for all domains associated with user enabled skills, even if one or more of the domains are associated with confidence scores that do not satisfy the minimum threshold confidence score.

The shortlister component 1150 may consider other data 1220 when determining which domains may relate to the user input represented in the ASR output data 1010 as well as respective confidence scores. The other data 1220 may include usage history data associated with the user device 110 and/or user that originated the user input. For example, a confidence score of a domain may be increased if user inputs originated by the user device 110 and/or user routinely invoke the domain. Conversely, a confidence score of a domain may be decreased if user inputs originated by the user device 110 and/or user rarely invoke the domain. Thus, the other data 1220 may include an indicator of the user associated with the ASR output data 1010, for example as determined by the user recognition component 895.

The other data 1220 may be character embedded prior to being input to the shortlister component 1150. The other data 1220 may alternatively be embedded using other techniques known in the art prior to being input to the shortlister component 1150.

The other data 1220 may also include data indicating the domains associated with skills that are enabled with respect to the user device 110 and/or user that originated the user input. The shortlister component 1150 may use such data to determine which domain-specific trained models to run. That is, the shortlister component 1150 may determine to only run the trained models associated with domains that are associated with user-enabled skills. The shortlister component 1150 may alternatively use such data to alter confidence scores of domains.

As an example, considering two domains, a first domain associated with at least one enabled skill and a second domain not associated with any user-enabled skills of the user that originated the user input, the shortlister component 1150 may run a first model specific to the first domain as well as a second model specific to the second domain. Alternatively, the shortlister component 1150 may run a model configured to determine a score for each of the first and second domains. The shortlister component 1150 may determine a same confidence score for each of the first and second domains in the first instance. The shortlister component 1150 may then alter those confidence scores based on which domains is associated with at least one skill enabled by the present user. For example, the shortlister component 1150 may increase the confidence score associated with the domain associated with at least one enabled skill while leaving the confidence score associated with the other domain the same. Alternatively, the shortlister component 1150 may leave the confidence score associated with the domain associated with at least one enabled skill the same while decreasing the confidence score associated with the other domain. Moreover, the shortlister component 1150 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 870. When the shortlister component 1150 receives the ASR output data 1010, the shortlister component 1150 may determine whether profile data associated with the user and/or user device 110 that originated the command includes an indication of enabled skills.

The other data 1220 may also include data indicating the type of the user device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1150 may use such data to determine which domain-specific trained models to run. For example, if the user device 110 corresponds to a displayless type device, the shortlister component 1150 may determine not to run trained models specific to domains that output video data. The shortlister component 1150 may alternatively use such data to alter confidence scores of domains.

As an example, considering two domains, one that outputs audio data and another that outputs video data, the shortlister component 1150 may run a first model specific to the domain that generates audio data as well as a second model specific to the domain that generates video data. Alternatively the shortlister component 1150 may run a model configured to determine a score for each domain. The shortlister component 1150 may determine a same confidence score for each of the domains in the first instance. The shortlister component 1150 may then alter the original confidence scores based on the type of the user device 110 that originated the user input corresponding to the ASR output data 1010. For example, if the user device 110 is a displayless device, the shortlister component 1150 may increase the confidence score associated with the domain that generates audio data while leaving the confidence score associated with the domain that generates video data the same. Alternatively, if the user device 110 is a displayless device, the shortlister component 1150 may leave the confidence score associated with the domain that generates audio data the same while decreasing the confidence score associated with the domain that generates video data. Moreover, if the user device 110 is a displayless device, the shortlister component 1150 may increase the confidence score associated with the domain that generates audio data as well as decrease the confidence score associated with the domain that generates video data.

The type of device information represented in the other data 1220 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1220 may represent the smart TV of other display device, and not the displayless device that captured the spoken user input.

The other data 1220 may also include data indicating the user input originating device's speed, location, or other mobility information. For example, the device may correspond to a vehicle including a display. If the vehicle is moving, the shortlister component 1150 may decrease the confidence score associated with a domain that generates video data as it may be undesirable to output video content to a user while the user is driving. The device may output data to the system component(s) 120 indicating when the device is moving.

The other data 1220 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1150 may use such data to alter confidence scores of domains. For example, the shortlister component 1150 may run a first model specific to a first domain as well as a second model specific to a second domain. Alternatively, the shortlister component 1150 may run a model configured to determine a score for each domain. The shortlister component 1150 may also determine a same confidence score for each of the domains in the first instance. The shortlister component 1150 may then alter the original confidence scores based on the first domain being invoked to cause the system to output content while the current user input was received. Based on the first domain being invoked, the shortlister component 1150 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1215 generated by the shortlister component 1150 as well as the different types of other data 1220 considered by the shortlister component 1150 are configurable. For example, the shortlister component 1150 may update confidence scores as more other data 1220 is considered. For further example, the n-best list data 1215 may exclude relevant domains if thresholding is implemented. Thus, for example, the shortlister component 1150 may include an indication of a domain in the n-best list data 1215 unless the shortlister component 1150 is one hundred percent confident that the domain may not execute the user input represented in the ASR output data 1010 (e.g., the shortlister component 1150 determines a confidence score of zero for the domain).

The shortlister component 1150 may send the ASR output data 1010 to recognizers 1163 associated with domains represented in the n-best list data 1215. Alternatively, the shortlister component 1150 may send the n-best list data 1215 or some other indicator of the selected subset of domains to another component (such as the orchestrator component 830) which may in turn send the ASR output data 1010 to the recognizers 1163 corresponding to the domains included in the n-best list data 1215 or otherwise indicated in the indicator. If the shortlister component 1150 generates an n-best list representing domains without any associated confidence scores, the shortlister component 1150/orchestrator component 830 may send the ASR output data 1010 to recognizers 1163 associated with domains that the shortlister component 1150 determines may execute the user input. If the shortlister component 1150 generates an n-best list representing domains with associated confidence scores, the shortlister component 1150/orchestrator component 830 may send the ASR output data 1010 to recognizers 1163 associated with domains associated with confidence scores satisfying (e.g., meeting or exceeding) a threshold minimum confidence score.

A recognizer 1163 may output tagged text data generated by an NER component 1162 and an IC component 1164, as described herein above. The NLU component 860 may compile the output tagged text data of the recognizers 1163 into a single cross-domain n-best list 1240 and may send the cross-domain n-best list 1240 to a pruning component 1250. Each entry of tagged text (e.g., each NLU hypothesis) represented in the cross-domain n-best list data 1240 may be associated with a respective score indicating a likelihood that the NLU hypothesis corresponds to the domain associated with the recognizer 1163 from which the NLU hypothesis was output. For example, the cross-domain n-best list data 1240 may be represented as (with each line corresponding to a different NLU hypothesis):

[0.95] Intent: <PlayMusic> ArtistName: Beethoven Song-Name: Waldstein Sonata

[0.70] Intent: <PlayVideo> ArtistName: Beethoven Vide-oName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1250 may sort the NLU hypotheses represented in the cross-domain n-best list data 1240 according to their respective scores. The pruning component 1250 may perform score thresholding with respect to the cross-domain NLU hypotheses. For example, the pruning component 1250 may select NLU hypotheses associated with scores satisfying (e.g., meeting and/or exceeding) a threshold score. The pruning component 1250 may also or alternatively perform number of NLU hypothesis thresholding. For example, the pruning component 1250 may select the top scoring NLU hypothesis(es). The pruning component 1250 may output a portion of the NLU hypotheses input thereto. The purpose of the pruning component 1250 is to create a reduced list of NLU hypotheses so that downstream, more resource intensive, processes may only operate on the NLU hypotheses that most likely represent the user's intent.

The NLU component 860 may include a light slot filler component 1252. The light slot filler component 1252 can take text from slots represented in the NLU hypotheses output by the pruning component 1250 and alter them to make the text more easily processed by downstream components. The light slot filler component 1252 may perform low latency operations that do not involve heavy operations such as reference to a knowledge base (e.g., 1172. The purpose of the light slot filler component 1252 is to replace words with other words or values that may be more easily understood by downstream components. For example, if a NLU hypothesis includes the word "tomorrow," the light slot filler component 1252 may replace the word "tomorrow" with an actual date for purposes of downstream processing. Similarly, the light slot filler component 1252 may replace the word "CD" with "album" or the words "compact disc." The replaced words are then included in the cross-domain n-best list data 1260.

The cross-domain n-best list data 1260 may be input to an entity resolution component 1270. The entity resolution component 1270 can apply rules or other instructions to standardize labels or tokens from previous stages into an intent/slot representation. The precise transformation may depend on the domain. For example, for a travel domain, the entity resolution component 1270 may transform text corresponding to "Boston airport" to the standard BOS three-letter code referring to the airport. The entity resolution component 1270 can refer to a knowledge base (e.g., 1172) that is used to specifically identify the precise entity referred to in each slot of each NLU hypothesis represented in the cross-domain n-best list data 1260. Specific intent/slot combinations may also be tied to a particular source, which may then be used to resolve the text. In the example "play songs by the stones," the entity resolution component 1270 may reference a personal music catalog, Amazon Music account, a user profile, or the like. The entity resolution component 1270 may output an altered n-best list that is based on the cross-domain n-best list data 1260 but that includes more detailed information (e.g., entity IDs) about the specific entities mentioned in the slots and/or more detailed slot data that can eventually be used by a skill. The NLU component 860 may include multiple entity resolution components 1270 and each entity resolution component 1270 may be specific to one or more domains.

The NLU component 860 may include a reranker 1290. The reranker 1290 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1270.

The reranker 1290 may apply re-scoring, biasing, or other techniques. The reranker 1290 may consider not only the data output by the entity resolution component 1270, but may also consider other data 1291. The other data 1291 may include a variety of information. For example, the other data 1291 may include skill rating or popularity data. For example, if one skill has a high rating, the reranker 1290 may increase the score of a NLU hypothesis that may be processed by the skill. The other data 1291 may also include information about skills that have been enabled by the user that originated the user input. For example, the reranker 1290 may assign higher scores to NLU hypothesis that may be processed by enabled skills than NLU hypothesis that may be processed by non-enabled skills. The other data 1291 may also include data indicating user usage history, such as if the user that originated the user input regularly uses a particular skill or does so at particular times of day. The other data 1291 may additionally include data indicating date, time, location, weather, type of user device 110, user identifier, context, as well as other information. For example, the reranker 1290 may consider when any particular skill is currently active (e.g., music being played, a game being played, etc.).

As illustrated and described, the entity resolution component 1270 is implemented prior to the reranker 1290. The entity resolution component 1270 may alternatively be implemented after the reranker 1290. Implementing the entity resolution component 1270 after the reranker 1290 limits the NLU hypotheses processed by the entity resolution component 1270 to only those hypotheses that successfully pass through the reranker 1290.

The reranker 1290 may be a global reranker (e.g., one that is not specific to any particular domain). Alternatively, the NLU component 860 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 860 may perform NLU processing described above with respect to domains associated with skills wholly implemented as part of the system component(s) 120 (e.g., designated 890 in FIG. 8). The NLU component 860 may separately perform NLU processing described above with respect to domains associated with skills that are at least partially implemented as part of the skill system component(s) 125. In an example, the shortlister component 1150 may only process with respect to these latter domains. Results of these two NLU processing paths may be merged into NLU output data 1285, which may be sent to a post-NLU ranker 865, which may be implemented by the system component(s) 120.

The post-NLU ranker 865 may include a statistical component that produces a ranked list of intent/skill pairs with associated confidence scores. Each confidence score may indicate an adequacy of the skill's execution of the intent with respect to NLU results data associated with the skill. The post-NLU ranker 865 may operate one or more trained models configured to process the NLU output data 1285, skill result data 1230, and the other data 1220 in order to output ranked output data 1225. The ranked output data 1225 may include an n-best list where the NLU hypotheses in the NLU output data 1285 are reordered such that the n-best list in the ranked output data 1225 represents a prioritized list of skills to respond to a user input as determined by the post-NLU ranker 865. The ranked output data 1225 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 865 enables the system to better determine the best skill to execute the user input. For example, first and second NLU hypotheses in the NLU output data 1285 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 865 (or other scheduling component such as orchestrator component 830) may solicit the first skill and the second skill to provide potential result data 1230 based on the first NLU hypothesis and the second NLU hypothesis, respectively. For example, the post-NLU ranker 865 may send the first NLU hypothesis to the first skill component 890a along with a request for the first skill component 890a to at least partially execute with respect to the first NLU hypothesis. The post-NLU ranker 865 may also send the second NLU hypothesis to the second skill component 890b along with a request for the second skill component 890b to at least partially execute with respect to the second NLU hypothesis. The post-NLU ranker 865 receives, from the first skill component 890a, first result data 1230a generated from the first skill component 890a's execution with respect to the first NLU hypothesis. The post-NLU ranker 865 also receives, from the second skill component 890b, second result data 1230b generated from the second skill component 890b's execution with respect to the second NLU hypothesis.

The result data 1230 may include various portions. For example, the result data 1230 may include content (e.g., audio data, text data, and/or video data) to be output to a user. The result data 1230 may also include a unique identifier used by the system component(s) 120 and/or the skill system component(s) 125 to locate the data to be output to a user. The result data 1230 may also include an instruction. For example, if the user input corresponds to "turn on the light," the result data 1230 may include an instruction causing the system to turn on a light associated with a profile of the device (110a/110b) and/or user.

The post-NLU ranker 865 may consider the first result data 1230a and the second result data 1230b to alter the first confidence score and the second confidence score of the first NLU hypothesis and the second NLU hypothesis, respectively. That is, the post-NLU ranker 865 may generate a third confidence score based on the first result data 1230a and the first confidence score. The third confidence score may correspond to how likely the post-NLU ranker 865 determines the first skill will correctly respond to the user input. The post-NLU ranker 865 may also generate a fourth confidence score based on the second result data 1230b and the second confidence score. One skilled in the art will appreciate that a first difference between the third confidence score and the fourth confidence score may be greater than a second difference between the first confidence score and the second confidence score. The post-NLU ranker 865 may also consider the other data 1220 to generate the third confidence score and the fourth confidence score. While it has been described that the post-NLU ranker 865 may alter the confidence scores associated with first and second NLU hypotheses, one skilled in the art will appreciate that the post-NLU ranker 865 may alter the confidence scores of more than two NLU hypotheses. The post-NLU ranker 865 may select the result data 1230 associated with the skill component 890 with the highest altered confidence score to be the data output in response to the current user input. The post-NLU ranker 865 may also consider the ASR output data 1010 to alter the NLU hypotheses confidence scores.

The orchestrator component 830 may, prior to sending the NLU output data 1285 to the post-NLU ranker 865, associate intents in the NLU hypotheses with skill components 890. For example, if a NLU hypothesis includes a <PlayMusic> intent, the orchestrator component 830 may associate the NLU hypothesis with one or more skill components 890 that can execute the <PlayMusic> intent. Thus, the orchestrator component 830 may send the NLU output data 1285, including NLU hypotheses paired with skill components 890, to the post-NLU ranker 865. In response to ASR output data 1010 corresponding to "what should I do for dinner today," the orchestrator component 830 may generates pairs of skill components 890 with associated NLU hypotheses corresponding to:

Skill 1/NLU hypothesis including <Help> intent
    Skill 2/NLU hypothesis including <Order> intent
    Skill 3/NLU hypothesis including <DishType> intent The post-NLU ranker 865 queries each skill component 890, paired with a NLU hypothesis in the NLU output data 1285, to provide result data 1230 based on the NLU hypothesis with which it is associated. That is, with respect to each skill, the post-NLU ranker 865 colloquially asks the each skill "if given this NLU hypothesis, what would you do with it." According to the above example, the post-NLU ranker 865 may send skill components 890 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 865 may query each of the skill components 890 in parallel or substantially in parallel.

A skill component 890 may provide the post-NLU ranker 865 with various data and indications in response to the post-NLU ranker 865 soliciting the skill component 890 for result data 1230. A skill component 890 may simply provide the post-NLU ranker 865 with an indication of whether or not the skill can execute with respect to the NLU hypothesis it received. A skill component 890 may also or alternatively provide the post-NLU ranker 865 with output data generated based on the NLU hypothesis it received. In some situations, a skill component 890 may need further information in addition to what is represented in the received NLU hypothesis to provide output data responsive to the user input. In these situations, the skill component 890 may provide the post-NLU ranker 865 with result data 1230 indicating slots of a framework that the skill component 890 further needs filled or entities that the skill component 890 further needs resolved prior to the skill component 890 being able to provided result data 1230 responsive to the user input. The skill component 890 may also provide the post-NLU ranker 865 with an instruction and/or computer-generated speech indicating how the skill component 890 recommends the system solicit further information needed by the skill component 890. The skill component 890 may further provide the post-NLU ranker 865 with an indication of whether the skill component 890 will have all needed information after the user provides additional information a single time, or whether the skill component 890 will need the user to provide various kinds of additional information prior to the skill component 890 having all needed information. According to the above example, skill components 890 may provide the post-NLU ranker 865 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1230 includes an indication provided by a skill component 890 indicating whether or not the skill component 890 can execute with respect to a NLU hypothesis; data generated by a skill component 890 based on a NLU hypothesis; as well as an indication provided by a skill component 890 indicating the skill component 890 needs further information in addition to what is represented in the received NLU hypothesis.

The post-NLU ranker 865 uses the result data 1230 provided by the skill components 890 to alter the NLU processing confidence scores generated by the reranker 1290. That is, the post-NLU ranker 865 uses the result data 1230 provided by the queried skill components 890 to create larger differences between the NLU processing confidence scores generated by the reranker 1290. Without the post-NLU ranker 865, the system may not be confident enough to determine an output in response to a user input, for example when the NLU hypotheses associated with multiple skills are too close for the system to confidently determine a single skill component 890 to invoke to respond to the user input. For example, if the system does not implement the post-NLU ranker 865, the system may not be able to determine whether to obtain output data from a general reference information skill or a medical information skill in response to a user input corresponding to "what is acne."

The post-NLU ranker 865 may prefer skill components 890 that provide result data 1230 responsive to NLU hypotheses over skill components 890 that provide result data 1230 corresponding to an indication that further information is needed, as well as skill components 890 that provide result data 1230 indicating they can provide multiple responses to received NLU hypotheses. For example, the post-NLU ranker 865 may generate a first score for a first skill component 890*a* that is greater than the first skill's NLU confidence score based on the first skill component 890*a* providing first result data 1230*a* including a response to a NLU hypothesis. For further example, the post-NLU ranker 865 may generate a second score for a second skill component 890*b* that is less than the second skill's NLU confidence score based on the second skill component 890*b* providing second result data 1230*b* indicating further information is needed for the second skill component 890*b* to provide a response to a NLU hypothesis. Yet further, for example, the post-NLU ranker 865 may generate a third score for a third skill component 890*c* that is less than the third skill's NLU confidence score based on the third skill component 890*c* providing result data 1230*c* indicating the third skill component 890*c* can provide multiple responses to a NLU hypothesis.

The post-NLU ranker 865 may consider other data 1220 in determining scores. The other data 1220 may include rankings associated with the queried skill components 890. A ranking may be a system ranking or a user-specific ranking. A ranking may indicate a veracity of a skill from the perspective of one or more users of the system. For example, the post-NLU ranker 865 may generate a first score for a first skill component 890*a* that is greater than the first skill's NLU processing confidence score based on the first skill component 890*a* being associated with a high ranking. For further example, the post-NLU ranker 865 may generate a second score for a second skill component 890*b* that is less than the second skill's NLU processing confidence score based on the second skill component 890*b* being associated with a low ranking.

The other data 1220 may include information indicating whether or not the user that originated the user input has enabled one or more of the queried skill components 890. For example, the post-NLU ranker 865 may generate a first score for a first skill component 890*a* that is greater than the first skill's NLU processing confidence score based on the first skill component 890*a* being enabled by the user that originated the user input. For further example, the post-NLU ranker 865 may generate a second score for a second skill component 890*b* that is less than the second skill's NLU processing confidence score based on the second skill component 890*b* not being enabled by the user that originated the user input. When the post-NLU ranker 865 receives the NLU output data 1285, the post-NLU ranker 865 may determine whether profile data, associated with the user and/or device that originated the user input, includes indications of enabled skills.

The other data 1220 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 865 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 865 may increase the NLU processing confidence score associated with a first skill configured to output visual data and/or decrease the NLU processing confidence score associated with a second skill configured to output audio data.

The other data 1220 may include information indicating the veracity of the result data 1230 provided by a skill component 890. For example, if a user says "tell me a recipe for pasta sauce," a first skill component 890*a* may provide the post-NLU ranker 865 with first result data 1230*a* corresponding to a first recipe associated with a five star rating and a second skill component 890*b* may provide the post-NLU ranker 865 with second result data 1230*b* corresponding to a second recipe associated with a one star rating. In this situation, the post-NLU ranker 865 may increase the NLU processing confidence score associated with the first skill component 890*a* based on the first skill component 890*a* providing the first result data 1230*a* associated with the five star rating and/or decrease the NLU processing confidence score associated with the second skill component 890*b* based on the second skill component 890*b* providing the second result data 1230*b* associated with the one star rating.

The other data 1220 may include information indicating the type of device that originated the user input. For example, the device may correspond to a "hotel room" type if the device is located in a hotel room. If a user inputs a command corresponding to "order me food" to the device located in the hotel room, the post-NLU ranker 865 may increase the NLU processing confidence score associated with a first skill component 890*a* corresponding to a room service skill associated with the hotel and/or decrease the NLU processing confidence score associated with a second skill component 890*b* corresponding to a food skill not associated with the hotel.

The other data 1220 may include information indicating a location of the device and/or user that originated the user input. The system may be configured with skill components 890 that may only operate with respect to certain geographic locations. For example, a user may provide a user input corresponding to "when is the next train to Portland." A first skill component 890*a* may operate with respect to trains that arrive at, depart from, and pass through Portland, Oregon. A second skill component 890*b* may operate with respect to trains that arrive at, depart from, and pass through Portland, Maine. If the device and/or user that originated the user input is located in Seattle, Washington, the post-NLU ranker 865 may increase the NLU processing confidence score associated with the first skill component 890*a* and/or decrease the NLU processing confidence score associated with the second skill component 890*b*. Likewise, if the device and/or user that originated the user input is located in Boston, Massachusetts, the post-NLU ranker 865 may increase the NLU processing confidence score associated with the second skill component 890*b* and/or decrease the NLU processing confidence score associated with the first skill component 890*a*.

The other data 1220 may include information indicating a time of day. The system may be configured with skill components 890 that operate with respect to certain times of day. For example, a user may provide a user input corresponding to "order me food." A first skill component 890*a* may generate first result data 1230*a* corresponding to breakfast. A second skill component 890*b* may generate second result data 1230*b* corresponding to dinner. If the system component(s) 120 receives the user input in the morning, the post-NLU ranker 865 may increase the NLU processing confidence score associated with the first skill component 890*a* and/or decrease the NLU processing score associated with the second skill component 890*b*. If the system component(s) 120 receives the user input in the afternoon or evening, the post-NLU ranker 865 may increase the NLU processing confidence score associated with the second skill component 890*b* and/or decrease the NLU processing confidence score associated with the first skill component 890*a*.

The other data 1220 may include information indicating user preferences. The system may include multiple skill components 890 configured to execute in substantially the same manner. For example, a first skill component 890*a* and a second skill component 890*b* may both be configured to order food from respective restaurants. The system may store a user preference (e.g., in the profile storage 870) that is associated with the user that provided the user input to the system component(s) 120 as well as indicates the user prefers the first skill component 890*a* over the second skill component 890*b*. Thus, when the user provides a user input that may be executed by both the first skill component 890*a* and the second skill component 890*b*, the post-NLU ranker 865 may increase the NLU processing confidence score associated with the first skill component 890*a* and/or decrease the NLU processing confidence score associated with the second skill component 890*b*.

The other data 1220 may include information indicating system usage history associated with the user that originated the user input. For example, the system usage history may indicate the user originates user inputs that invoke a first skill component 890*a* more often than the user originates user inputs that invoke a second skill component 890*b*. Based on this, if the present user input may be executed by both the first skill component 890*a* and the second skill component 890*b*, the post-NLU ranker 865 may increase the NLU processing confidence score associated with the first skill component 890*a* and/or decrease the NLU processing confidence score associated with the second skill component 890*b*.

The other data 1220 may include information indicating a speed at which the user device 110 that originated the user input is traveling. For example, the user device 110 may be located in a moving vehicle, or may be a moving vehicle. When a user device 110 is in motion, the system may prefer audio outputs rather than visual outputs to decrease the likelihood of distracting the user (e.g., a driver of a vehicle). Thus, for example, if the user device 110 that originated the user input is moving at or above a threshold speed (e.g., a speed above an average user's walking speed), the post-NLU ranker 865 may increase the NLU processing confidence score associated with a first skill component 890*a* that generates audio data. The post-NLU ranker 865 may also or alternatively decrease the NLU processing confidence score associated with a second skill component 890*b* that generates image data or video data.

The other data 1220 may include information indicating how long it took a skill component 890 to provide result data 1230 to the post-NLU ranker 865. When the post-NLU ranker 865 multiple skill components 890 for result data 1230, the skill components 890 may respond to the queries at different speeds. The post-NLU ranker 865 may implement a latency budget. For example, if the post-NLU ranker 865 determines a skill component 890 responds to the post-NLU ranker 865 within a threshold amount of time from receiving a query from the post-NLU ranker 865, the post-NLU ranker 865 may increase the NLU processing confidence score associated with the skill component 890. Conversely, if the post-NLU ranker 865 determines a skill component 890 does not respond to the post-NLU ranker 865 within a threshold amount of time from receiving a query from the post-NLU ranker 865, the post-NLU ranker 865 may decrease the NLU processing confidence score associated with the skill component 890.

It has been described that the post-NLU ranker 865 uses the other data 1220 to increase and decrease NLU processing confidence scores associated with various skill components 890 that the post-NLU ranker 865 has already requested result data from. Alternatively, the post-NLU ranker 865 may use the other data 1220 to determine which skill components 890 to request result data from. For example, the post-NLU ranker 865 may use the other data 1220 to increase and/or decrease NLU processing confidence scores associated with skill components 890 associated with the NLU output data 1285 output by the NLU component 860. The post-NLU ranker 865 may select n-number of top scoring altered NLU processing confidence scores. The post-NLU ranker 865 may then request result data 1230 from only the skill components 890 associated with the selected n-number of NLU processing confidence scores.

As described, the post-NLU ranker 865 may request result data 1230 from all skill components 890 associated with the NLU output data 1285 output by the NLU component 860. Alternatively, the system component(s) 120 may prefer result data 1230 from skills implemented entirely by the system component(s) 120 rather than skills at least partially implemented by the skill system component(s) 125. Therefore, in the first instance, the post-NLU ranker 865 may request result data 1230 from only skills associated with the NLU output data 1285 and entirely implemented by the system component(s) 120. The post-NLU ranker 865 may only request result data 1230 from skills associated with the NLU output data 1285, and at least partially implemented by the skill system component(s) 125, if none of the skills, wholly implemented by the system component(s) 120, provide the post-NLU ranker 865 with result data 1230 indicating either data response to the NLU output data 1285, an indication that the skill can execute the user input, or an indication that further information is needed.

As indicated above, the post-NLU ranker 865 may request result data 1230 from multiple skill components 890. If one of the skill components 890 provides result data 1230 indicating a response to a NLU hypothesis and the other skills provide result data 1230 indicating either they cannot execute or they need further information, the post-NLU ranker 865 may select the result data 1230 including the response to the NLU hypothesis as the data to be output to the user. If more than one of the skill components 890 provides result data 1230 indicating responses to NLU hypotheses, the post-NLU ranker 865 may consider the other data 1220 to generate altered NLU processing confidence scores, and select the result data 1230 of the skill associated with the greatest score as the data to be output to the user.

A system that does not implement the post-NLU ranker 865 may select the highest scored NLU hypothesis in the NLU output data 1285. The system may send the NLU hypothesis to a skill component 890 associated therewith along with a request for output data. In some situations, the skill component 890 may not be able to provide the system with output data. This results in the system indicating to the user that the user input could not be processed even though another skill associated with lower ranked NLU hypothesis could have provided output data responsive to the user input.

The post-NLU ranker 865 reduces instances of the aforementioned situation. As described, the post-NLU ranker 865 queries multiple skills associated with the NLU output data 1285 to provide result data 1230 to the post-NLU ranker 865 prior to the post-NLU ranker 865 ultimately determining the skill component 890 to be invoked to respond to the user input. Some of the skill components 890 may provide result data 1230 indicating responses to NLU hypotheses while other skill components 890 may providing result data 1230 indicating the skills cannot provide responsive data. Whereas a system not implementing the post-NLU ranker 865 may select one of the skill components 890 that could not provide a response, the post-NLU ranker 865 only selects a skill component 890 that provides the post-NLU ranker 865 with result data corresponding to a response, indicating further information is needed, or indicating multiple responses can be generated.

The post-NLU ranker 865 may select result data 1230, associated with the skill component 890 associated with the highest score, for output to the user. Alternatively, the post-NLU ranker 865 may output ranked output data 1225 indicating skill components 890 and their respective post-NLU ranker rankings. Since the post-NLU ranker 865 receives result data 1230, potentially corresponding to a response to the user input, from the skill components 890 prior to post-NLU ranker 865 selecting one of the skills or outputting the ranked output data 1225, little to no latency occurs from the time skills provide result data 1230 and the time the system outputs responds to the user.

If the post-NLU ranker 865 selects result audio data to be output to a user and the system determines content should be output audibly, the post-NLU ranker 865 (or another component of the system component(s) 120) may cause the user device 110*a* and/or the user device 110*b* to output audio corresponding to the result audio data. If the post-NLU ranker 865 selects result text data to output to a user and the system determines content should be output visually, the post-NLU ranker 865 (or another component of the system component(s) 120) may cause the user device 110*b* to display text corresponding to the result text data. If the post-NLU ranker 865 selects result audio data to output to a user and the system determines content should be output visually, the post-NLU ranker 865 (or another component of the system component(s) 120) may send the result audio data to the ASR component 850. The ASR component 850 may generate output text data corresponding to the result audio data. The system component(s) 120 may then cause the user device 110*b* to display text corresponding to the output text data. If the post-NLU ranker 865 selects result text data to output to a user and the system determines content should be output audibly, the post-NLU ranker 865 (or another component of the system component(s) 120) may send the result text data to the TTS component 880. The TTS component 880 may generate output audio data (corresponding to computer-generated speech) based on the result text data. The system component(s) 120 may then cause the user device 110a and/or the user device 110b to output audio corresponding to the output audio data.

As described, a skill component 890 may provide result data 1230 either indicating a response to the user input, indicating more information is needed for the skill component 890 to provide a response to the user input, or indicating the skill component 890 cannot provide a response to the user input. If the skill component 890 associated with the highest post-NLU ranker score provides the post-NLU ranker 865 with result data 1230 indicating a response to the user input, the post-NLU ranker 865 (or another component of the system component(s) 120, such as the orchestrator component 830) may simply cause content corresponding to the result data 1230 to be output to the user. For example, the post-NLU ranker 865 may send the result data 1230 to the orchestrator component 830. The orchestrator component 830 may cause the result data 1230 to be sent to the device (110a/110b), which may output audio and/or display text corresponding to the result data 1230. The orchestrator component 830 may send the result data 1230 to the ASR component 850 to generate output text data and/or may send the result data 1230 to the TTS component 880 to generate output audio data, depending on the situation.

The skill component 890 associated with the highest post-NLU ranker score may provide the post-NLU ranker 865 with result data 1230 indicating more information is needed as well as instruction data. The instruction data may indicate how the skill component 890 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 865 may simply cause the received instruction data be output by the device (110a/110b). Alternatively, the instruction data may be in a format that is not capable of being output by the device (110a/110b). When this occurs, the post-NLU ranker 865 may cause the ASR component 850 or the TTS component 880 to process the instruction data, depending on the situation, to generate instruction data that may be output by the device (110a/110b). Once the user provides the system with all further information needed by the skill component 890, the skill component 890 may provide the system with result data 1230 indicating a response to the user input, which may be output by the system as detailed above.

The system may include "informational" skill components 890 that simply provide the system with information, which the system outputs to the user. The system may also include "transactional" skill components 890 that require a system instruction to execute the user input. Transactional skill components 890 include ride sharing skills, flight booking skills, etc. A transactional skill component 890 may simply provide the post-NLU ranker 865 with result data 1230 indicating the transactional skill component 890 can execute the user input. The post-NLU ranker 865 may then cause the system to solicit the user for an indication that the system is permitted to cause the transactional skill component 890 to execute the user input. The user-provided indication may be an audible indication or a tactile indication (e.g., activation of a virtual button or input of text via a virtual keyboard). In response to receiving the user-provided indication, the system may provide the transactional skill component 890 with data corresponding to the indication. In response, the transactional skill component 890 may execute the command (e.g., book a flight, book a train ticket, etc.). Thus, while the system may not further engage an informational skill component 890 after the informational skill component 890 provides the post-NLU ranker 865 with result data 1230, the system may further engage a transactional skill component 890 after the transactional skill component 890 provides the post-NLU ranker 865 with result data 1230 indicating the transactional skill component 890 may execute the user input.

In some instances, the post-NLU ranker 865 may generate respective scores for first and second skills that are too close (e.g., are not different by at least a threshold difference) for the post-NLU ranker 865 to make a confident determination regarding which skill should execute the user input. When this occurs, the system may request the user indicate which skill the user prefers to execute the user input. The system may output TTS-generated speech to the user to solicit which skill the user wants to execute the user input.

Figure 13:
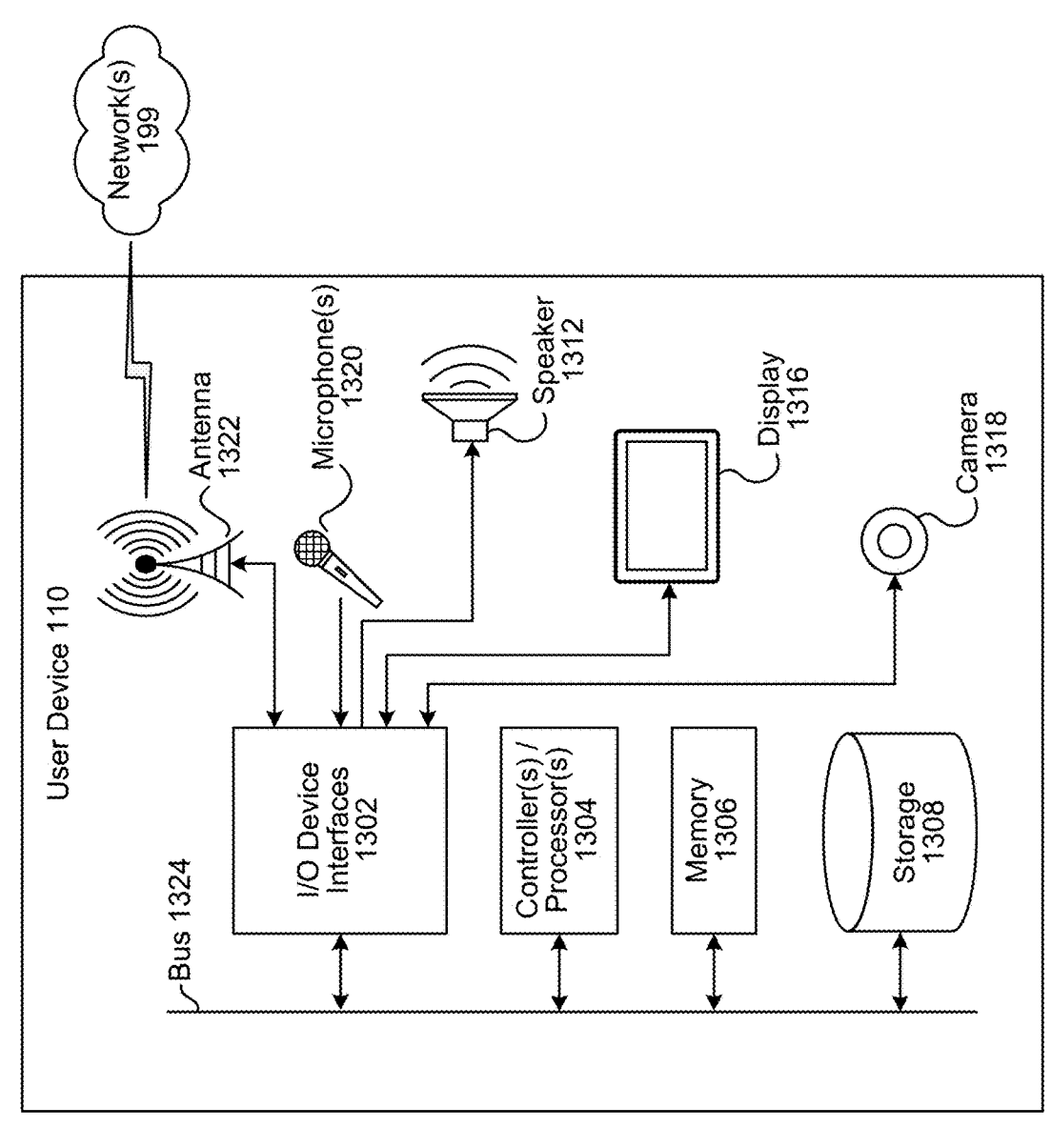
FIG. 13 is a block diagram conceptually illustrating example components of a device, according to embodiments of the present disclosure.

FIG. 13 is a block diagram conceptually illustrating a user device 110 that may be used with the system. FIG. 14 is a block diagram conceptually illustrating example components of a remote device, such as the natural language command processing system component(s) 120, which may assist with ASR processing, NLU processing, etc., and skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component 120 may also be a version of a user device 110 that includes different (e.g., more) processing capabilities than other device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1302/1402).

Computer instructions for operating each device (110/120/125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/125) includes input/output device interfaces (1302/1402). A variety of components may be connected through the input/output device interfaces (1302/1402), as will be discussed further below. Additionally, each device (110/120/125) may include an address/data bus (1324/1424) for conveying data among components of the respective device. Each component within a device (110/120/125) may also be directly connected to other components in addition to (or instead of) being connected to other components across the bus (1324/1424).

Referring to FIG. 13, the user device 110 may include input/output device interfaces 1302 that connect to a variety of components such as an audio output component such as a speaker 1312, a wired headset or a wireless headset (not illustrated), or other component capable of outputting audio. The user device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 1316 for displaying content. The user device 110 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the natural language command processing system component(s) 120, or skill system component(s) 125 may include their own dedicated processors, memory, and/or storage. Alternatively, one or more of the components of the device(s) 110, the natural language command processing system component(s) 120, or skill system component(s) 125 may utilize the I/O interfaces (1302/1402), processor(s) (1304/1404), memory (1306/1406), and/or storage (1308/1408) of the device(s) 110, natural language command processing system component(s) 120, or the skill system component(s) 125, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 892/992 (which may include ASR 850/950), language output 893/993 (which may include NLG 879/979 and TTS 880/980), etc., for example as illustrated in FIGS. 8 and 9. Unless expressly noted otherwise, the system version of such components may operate similarly to the device version of such components and thus the description of one version (e.g., the system version or the local version) applies to the description of the other version (e.g., the local version or system version) and vice-versa.

Figure 15:
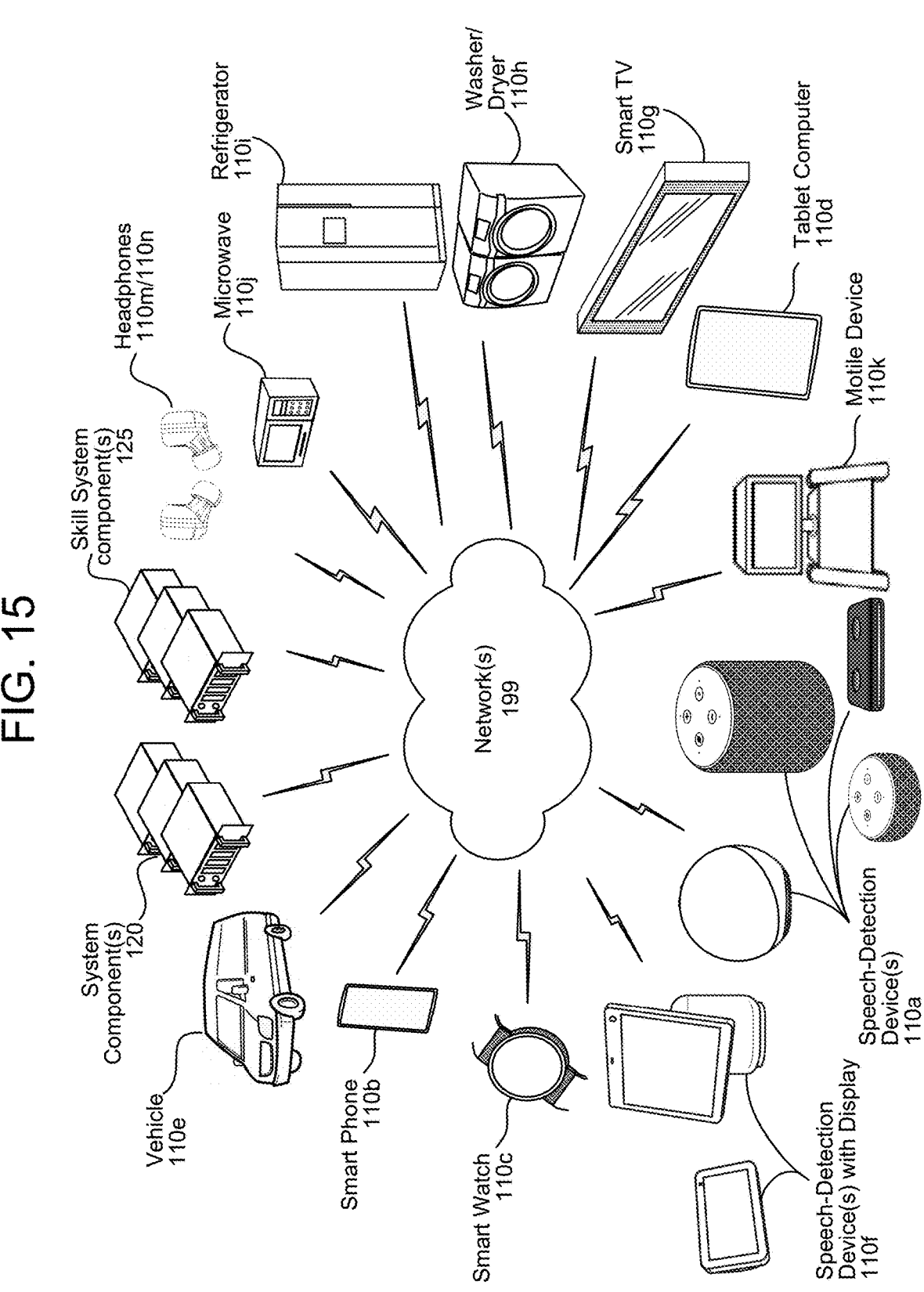
FIG. 15 illustrates an example of a computer network for use with the system, according to embodiments of the present disclosure.

As illustrated in FIG. 15, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first input audio data corresponding to a first spoken natural language input requesting a narrative be output, the first spoken natural language input indicating a first narrative parameter;

generating parameter data including the first narrative parameter included in the first spoken natural language input;

generating outline data based on the parameter data, wherein the outline data includes the first narrative parameter and a second narrative parameter not included in the parameter data;

processing, using a first trained machine learning (ML) component, the outline data to generate natural language data corresponding to the narrative requested in the first spoken natural language input, wherein the natural language data includes more words than the outline data, and the natural language data comprises:

a first portion corresponding to a first scene of the narrative, and a second portion corresponding to a second scene of the narrative;

processing, using a second trained ML component, the first portion of the natural language data to determine a first entity represented in the first portion of the natural language data;

determining, using the second trained ML component, first image data corresponding to the first entity;

processing, using a third trained ML component, the first portion of the natural language data to determine first background image data corresponding to the first scene of the narrative;

processing, using a fourth trained ML component, the first portion of the natural language data and the first entity to determine an attribute corresponding to the first entity, wherein the attribute represents how the first entity is to be presented;

processing, using a fifth trained ML component, the first image data, the first background image data, and the attribute to generate first scene data, wherein the first scene data indicates how the first image data is to be rendered with the first background image data based on the attribute;

based on the first scene data, generating first output image data including the first image data and the first background image data, the first output image data corresponding to the first scene of the narrative;

processing, using the second trained ML component, the second portion of the natural language data to determine the first entity is represented in the second portion of the natural language data;

determining the first image data is to be used to render the first entity in the second scene of the narrative based on the first image data being used to represent the first entity in the first scene data;

generating second output image data including the first image data, the second output image data corresponding to the second scene of the narrative;

causing presentation of the first output image data; and causing presentation of the second output image data.

2. The computer-implemented method of claim 1, further comprising:

storing a representation of the first entity, the first image data, the first background image data, and the attribute in association with a content request identifier corresponding to the first spoken natural language input;

retrieving the representation of the first entity;

based at least in part on determining that the first entity is represented in the second portion, retrieving the first image data;

processing, using the second trained ML component, the second portion of the natural language data to determine a second entity represented in the second portion of the natural language data;

determining, using the second trained ML component, second image data corresponding to the second entity;

processing, using the third trained ML component, the second portion of the natural language data to determine second background image data for the second scene of the narrative; and processing, using the fifth trained ML component, the first image data, the second image data, and the second background image data to generate second scene data, wherein the second scene data indicates how the first image data and the second image data are to be rendered with the second background image data.

3. The computer-implemented method of claim 1, further comprising:

processing, using a sixth ML component, the natural language data to determine a third portion of the natural language data that corresponds to the first narrative parameter; and replacing the third portion of the natural language data with the first narrative parameter.

4. The computer-implemented method of claim 1, further comprising:

processing, using a sixth ML component, the natural language data and the first entity to determine a portion of the first background image data where the first image data is to be located when it is rendered with the first background image data, wherein the first scene data indicates the portion of the first background image data where the first image data is to be located when it is rendered with the first background image data, and wherein the second output image data is generated to include the first image data located with respect to the first background image data as indicated in the first scene data.

5. A computer-implemented method comprising:

receiving first input data requesting content be output, the first input data indicating a first parameter;

generating outline data based on the first parameter, wherein the outline data includes the first parameter and a second parameter not included in the first input data;

based on the outline data, generating natural language data corresponding to the content requested in the first input data, wherein the natural language data includes more words than the outline data;

processing, using a trained machine learning (ML) component, a first portion of the natural language data to determine a first entity included in the first portion of the natural language data;

determining, using the trained ML component, first image data corresponding to the first entity;

determining first background image data representing the natural language data;

generating first scene data indicating how the first image data is to be rendered with the first background image data;

based on the first scene data, generating first output image data including the first image data and the first background image data, the first output image data representing at least the first portion of the natural language data;

determining, by the trained ML component, the first entity is included in a second portion of the natural language data;

based on the first entity being included in the second portion of the natural language data and the first image data being used to represent the first entity in the first scene data, generating second output image data including the first image data, the second output image data representing at least the second portion of the natural language data;

causing presentation of the first output image data; and causing presentation of the second output image data.

6. The computer-implemented method of claim 5, further comprising:

determining, in the first portion of the natural language data, an attribute corresponding to the first entity, wherein the attribute represents how the first entity is to be presented; and generating the first scene data to indicate how the first image data is to be rendered using the attribute.

7. The computer-implemented method of claim 5, further comprising:

determining a spatial relationship between the first entity and a second entity included in the first portion of the natural language data, wherein the spatial relationship represents how the first entity is to be rendered with the second entity.

8. The computer-implemented method of claim 5, further comprising:

determining a second entity included in the second portion of the natural language data;

determining second image data corresponding to the second entity;

determining second background image data representing the second portion of the natural language data; and generating second scene data indicating how the first image data and the second image data are to be rendered with the second background image data.

9. The computer-implemented method of claim 5, further comprising:

determining a third portion of the natural language data corresponding to a second entity;

determining the second entity corresponds to the first entity; and based on the second entity corresponding to the first entity, replacing the second entity with the first entity in the third portion of the natural language data.

10. The computer-implemented method of claim 5, further comprising:

performing text-to-speech (TTS) processing using the natural language data to generate first output audio data comprising:

a first portion corresponding to the first portion of the natural language data, and a second portion corresponding to the second portion of the natural language data;

causing the first output audio data to be presented;

while the first portion of the first output audio data is being presented, causing the first output image data to be presented; and after the first portion of the first output audio data is presented, and while the second portion of the first output audio data is being presented, causing the second output image data to be presented.

11. The computer-implemented method of claim 5, further comprising:

generating third output image data corresponding to the first output image data, wherein the first entity is represented differently in the first output image data than in the third output image data; and generating output video data using the first output image data and the third output image data.

12. The computer-implemented method of claim 5, wherein:

the first input data requests a narrative be output, the first output image data corresponds to a first portion of the narrative, and the second output image data corresponds to a second portion of the narrative.

13. A computing system comprising:

at least one processor; and at least one memory comprising instructions that, when executed by the at least one processor, cause the computing system to:

receive first input data requesting content be output, the first input data indicating a first parameter;

generate outline data based on the first parameter, wherein the outline data includes the first parameter and a second parameter not included in the first input data;

based on the outline data, generate natural language data corresponding to the content requested in the first input data, wherein the natural language data includes more words than the outline data;

process, using a trained machine learning (ML) component, a first portion of the natural language data to determine a first entity included in the first portion of the natural language data;

determine, using the trained ML component, first image data corresponding to the first entity;

determine first background image data representing the natural language data;

generate first scene data indicating how the first image data is to be rendered with the first background image data;

based on the first scene data, generate first output image data including the first image data and the first background image data, the first output image data representing at least the first portion of the natural language data;

determine, by the trained ML component, the first entity is included in a second portion of the natural language data;

based on the first entity being included in the second portion of the natural language data and the first image data being used to represent the first entity in the first scene data, generate second output image data including the first image data, the second output image data representing at least the second portion of the natural language data;

cause presentation of the first output image data; and cause presentation of the second output image data.

14. The computing system of claim 13, wherein the at least one memory further comprises instructions that, when executed by the at least one processor, further cause the computing system to:

determine, in the first portion of the natural language data, an attribute corresponding to the first entity, wherein the attribute represents how the first entity is to be presented; and generate the first scene data to indicate how the first image data is to be rendered using the attribute.

15. The computing system of claim 13, wherein the at least one memory further comprises instructions that, when executed by the at least one processor, further cause the computing system to:

determine a spatial relationship between the first entity and a second entity included in the first portion of the natural language data, wherein the spatial relationship represents how the first entity is to be rendered with the second entity.

16. The computing system of claim 13, wherein the at least one memory further comprises instructions that, when executed by the at least one processor, further cause the computing system to:

determine a second entity included in the second portion of the natural language data;

determine second image data corresponding to the second entity;

determine second background image data representing the second portion of the natural language data; and generate second scene data indicating how the first image data and the second image data are to be rendered with the second background image data.

17. The computing system of claim 13, wherein the at least one memory further comprises instructions that, when executed by the at least one processor, further cause the computing system to:

determine a third portion of the natural language data corresponding to a second entity;

determine the second entity corresponds to the first entity; and based on the second entity corresponding to the first entity, replace the second entity with the first entity in the third portion of the natural language data.

18. The computing system of claim 13, wherein the at least one memory further comprises instructions that, when executed by the at least one processor, further cause the computing system to:

perform text-to-speech (TTS) processing using the natural language data to generate first output audio data comprising:

a first portion corresponding to the first portion of the natural language data, and a second portion corresponding to the second portion of the natural language data;

cause the first output audio data to be presented;

while the first portion of the first output audio data is being presented, cause the first output image data to be presented; and after the first portion of the first output audio data is presented, and while the second portion of the first output audio data is being presented, cause the second output image data to be presented.

19. The computing system of claim 13, wherein the at least one memory further comprises instructions that, when executed by the at least one processor, further cause the computing system to:

generate third output image data corresponding to the first output image data, wherein the first entity is represented differently in the first output image data than in the third output image data; and generate output video data using the first output image data and the third output image data.

20. The computing system of claim 13, wherein:

the first input data requests a narrative be output, the first output image data corresponds to a first portion of the narrative, and the second output image data corresponds to a second portion of the narrative.

* * * * *